(12) United States Patent
Hogg

(10) Patent No.: US 11,676,087 B2
(45) Date of Patent: Jun. 13, 2023

(54) SYSTEMS AND METHODS FOR VULNERABILITY ASSESSMENT AND REMEDY IDENTIFICATION

(71) Applicant: Aon Risk Consultants, Inc., Chicago, IL (US)

(72) Inventor: Jason Hogg, Bedford, NY (US)

(73) Assignee: Aon Risk Consultants, Inc., Chicago, IL (US)

(*) Notice: Subject to any disclaimer, the term of this patent is extended or adjusted under 35 U.S.C. 154(b) by 428 days.

(21) Appl. No.: 16/776,192

(22) Filed: Jan. 29, 2020

(65) Prior Publication Data

US 2020/0252423 A1  Aug. 6, 2020

Related U.S. Application Data

(60) Provisional application No. 62/799,559, filed on Jan. 31, 2019.

(51) Int. Cl.
*G06Q 10/00* (2023.01)
*G06Q 10/0635* (2023.01)
(Continued)

(52) U.S. Cl.
CPC ......... *G06Q 10/0635* (2013.01); *G06Q 40/08* (2013.01); *G06N 5/01* (2023.01); *G06Q 30/0203* (2013.01); *H04L 63/1433* (2013.01)

(58) Field of Classification Search
CPC ... G06Q 10/063; G06Q 10/0635; G06Q 40/08
See application file for complete search history.

(56) References Cited

U.S. PATENT DOCUMENTS 7,584,508 B1   9/2009  Kashchenko et al.
8,571,900 B2  10/2013  Belhe et al.
(Continued)

FOREIGN PATENT DOCUMENTS

CN   111971658   11/2020
EP     3746891   12/2020
(Continued)

OTHER PUBLICATIONS

Eling, M., & Schnell, W. (2016). What do we know about cyber risk and cyber risk insurance? The Journal of Risk Finance, 17(5), 474-491. (Year: 2016).*
(Continued)

*Primary Examiner* — William S Brockington, III
(74) *Attorney, Agent, or Firm* — Gardella Grace P.A.

(57) ABSTRACT

In an illustrative embodiment, systems and methods by which a computerized platform accesses a data set pertaining to system characteristics and delivers the data to models to assist a user in identifying and remedying cyber vulnerabilities may include models for identifying vulnerabilities based on system characteristics and for identifying remedial actions and services to mitigate the vulnerabilities. Models may be created for quantifying composite risk exhibited by the system and may quantify risk on a domain-by-domain basis. The influence that performance of one or more remedial actions may have on the quantified risk profile of the system may be automatically projected. The response of an insurance marketplace as it pertains to offering policies to cover losses arising from cyber vulnerabilities exhibited by the system, either in its status quo or as altered via by enacting one or more remedial actions, may be automatically projected.

22 Claims, 25 Drawing Sheets

(51) Int. Cl.
*G06Q 40/08* (2012.01)
*H04L 9/40* (2022.01)
*G06Q 30/0203* (2023.01)
*G06N 5/01* (2023.01)

(56) References Cited

U.S. PATENT DOCUMENTS

| | | | |
|---|---|---|---|
| 9,294,498 | B1 | 3/2016 | Yampolskiy et al. |
| 9,648,036 | B2 | 5/2017 | Seiver et al. |
| 10,592,938 | B2 | 3/2020 | Hogg et al. |
| 2004/0006704 | A1 | 1/2004 | Dahlstrom et al. |
| 2004/0230506 | A1 | 11/2004 | Casco-Arias et al. |
| 2005/0065807 | A1 | 3/2005 | DeAngelis et al. |
| 2007/0067846 | A1 | 3/2007 | McFarlane et al. |
| 2008/0183506 | A1* | 7/2008 | Mamorsky ............. G06Q 40/08 705/37 |
| 2009/0024663 | A1* | 1/2009 | McGovern ............ G06F 21/577 |
| 2011/0138471 | A1 | 6/2011 | Van de Weyer et al. |
| 2013/0144659 | A1* | 6/2013 | McLaughlin ........ G06Q 10/087 705/4 |
| 2013/0227697 | A1 | 8/2013 | Zandani |
| 2014/0137257 | A1 | 5/2014 | Martinez et al. |
| 2014/0173739 | A1 | 6/2014 | Ahuja et al. |
| 2015/0356477 | A1* | 12/2015 | Milkman ........... G06Q 10/0633 705/7.27 |
| 2015/0381649 | A1* | 12/2015 | Schultz .............. G06Q 10/0635 726/25 |
| 2016/0234247 | A1 | 8/2016 | Ng et al. |
| 2016/0248800 | A1 | 8/2016 | Ng et al. |
| 2016/0373478 | A1 | 12/2016 | Doubleday et al. |
| 2017/0046519 | A1 | 2/2017 | Cam |
| 2017/0279843 | A1 | 9/2017 | Schultz et al. |
| 2018/0124091 | A1 | 5/2018 | Sweeney et al. |
| 2018/0124114 | A1 | 5/2018 | Woods et al. |
| 2018/0146004 | A1 | 5/2018 | Belfiore, Jr. et al. |
| 2018/0270265 | A1 | 9/2018 | Sage |
| 2019/0138512 | A1 | 5/2019 | Pourmohammad et al. |
| 2019/0236661 | A1 | 8/2019 | Hogg et al. |
| 2020/0106801 | A1* | 4/2020 | Evans ................. H04L 63/1433 |
| 2021/0004878 | A1 | 1/2021 | Hogg et al. |

FOREIGN PATENT DOCUMENTS

| | | |
|---|---|---|
| WO | 2019152710 | 8/2019 |
| WO | 2020160166 | 8/2020 |

OTHER PUBLICATIONS

International Search Report and Written Opinion issued in International Application No. PCT/US2020/015705 dated Apr. 27, 2020.
International Search Report and Written Opinion issued in International Application No. PCT/US2019/016147 dated Apr. 25, 2019.
International Preliminary Report on Patentability issued in PCT Application No. PCT/US2019/016147 dated Aug. 13, 2020.
Supplementary European Search Report issued in European application No. 19747325.9 dated Nov. 20, 2020, 8 pages.
International Preliminary Report on Patentability issued in PCT Application No. PCT/US2020/015705 dated Jul. 27, 2021, 7 pages.

* cited by examiner

Answer Data: (1xn) $\quad\swarrow 200$ $$\begin{bmatrix} A_1 & A_2 & A_3 & A_4 & \ldots & A_n \end{bmatrix}$$

FIG. 2A

Security Domain Sensitivity: (nxm) $\quad\swarrow 202$ $$\begin{bmatrix} S_{1,1} & S_{1,2} & S_{1,3} & S_{1,4} & \ldots & S_{1,m} \\ S_{2,1} & S_{2,2} & S_{2,3} & S_{2,4} & \ldots & S_{2,m} \\ S_{3,1} & S_{3,2} & S_{3,3} & S_{3,4} & \ldots & S_{3,m} \\ \vdots & & & & & \\ S_{n,1} & S_{n,2} & S_{n,3} & S_{n,4} & \ldots & S_{n,m} \end{bmatrix}$$

FIG. 2B

Baseline Answer Data: (1xn) $\quad\swarrow 204$ $$\begin{bmatrix} BA_1 & BA_2 & BA_3 & BA_4 & \ldots & BA_n \end{bmatrix}$$

FIG. 2C

Security Domain Scores: (1xm) ↙ 206

$$\begin{bmatrix} D_1 & D_2 & D_3 & D_4 & \ldots & D_m \end{bmatrix}$$

FIG. 2D

Composite Vulnerability Sensitivity: (mx1) ↙ 208

$$\begin{bmatrix} VS_1 \\ VS_2 \\ VS_3 \\ \vdots \\ VS_m \end{bmatrix}$$

FIG. 2E

Service Indicator Data: (nxp) ⟵ 1600

Service Scores: (1xp) ⟵ 1602

Service Thresholds: (1xp) ⟵ 1604

SYSTEMS AND METHODS FOR VULNERABILITY ASSESSMENT AND REMEDY IDENTIFICATION

RELATED APPLICATIONS

This application is related to the following prior patent application directed to automated cyber security assessment: U.S. patent application Ser. No. 16/263,607 entitled "System and Methods for Vulnerability Assessment and Provisioning of Related Services and Products for Efficient Risk Suppression" and filed Jan. 31, 2019. This application claims priority to U.S. Provisional Patent Application Ser. No. 62/799,559, entitled "Systems and Methods for Vulnerability Assessment and Remedy Identification," filed Jan. 31, 2019. All above identified applications are hereby incorporated by reference in their entireties.

BACKGROUND

Increasingly, enterprises find their various computer, data and network systems under attack from malicious actors, such as criminals that would steal data, money and other digital assets (e.g., code bases, cryptocurrencies, and the like). These risks arise out of the necessity of exposing the various systems to networks such as the Internet, which is necessary in order to permit proper communication and interoperation between an enterprise's various systems and also to permit proper communication and interoperation between the enterprise's various systems and third-party systems.

To address these risks, it is necessary for an enterprise to assess its security posture, in order to understand the various risks that may present themselves to the enterprise, given the choices it has made with regard to its policies, practices, security measures, and the like. It is necessary for the enterprise to understand various remedial services and systems that may be employed to mitigate its risks, and to understand the impact of employing one or more of these remedial services or systems. No such system presently exists for enterprises.

As a further matter, there is a growing need to insure enterprises against losses that arise out of the necessary condition of exposing their various systems to networks such as the Internet. There currently is no available solution by which an enterprise can understand its ability to obtain various policies, limits and enhancements from various carriers.

SUMMARY OF ILLUSTRATIVE EMBODIMENTS

In one aspect, the present disclosure relates to a platform for performing vulnerability assessment for computer systems and network environments of various entities and for identifying relevant vulnerability remediation services. The platform may provide such services in a manner that is responsive to a system or network administrator's intended course of action.

In one aspect, the present disclosure relates to a system including a processor and a non-transitory computer-readable media storing instructions for analyzing insurance needs of a client system based on a vulnerability assessment of computer, data, and network systems of the client system. In some embodiments, when the instructions are executed by the processor, the instructions cause a set of data describing system vulnerability to be delivered to at least one ensemble of decision trees. The ensemble may include a number of decision trees constructed to produce a projection of whether an insurance policy covering losses to the client system is likely to be offered if the insurance policy falls within a category. Each projection from each decision tree may be delivered to a voting unit. The voting unit may determine whether the policy falling within the category is likely to be offered based upon the projections from the decision trees. The insurance policy may be presented to a user along with an option to apply for the policy using application data including at least a portion of the set of data describing the client system vulnerability, if the voting unit determines that the policy is likely to be offered.

In some embodiments, systems and methods for automatically detecting vulnerabilities to a computing infrastructure and identifying and implementing remedies to mitigate the effects of the vulnerabilities include receiving, from a remote computing device via a network, responses questions in a questionnaire where the responses describe features of a computing infrastructure of an enterprise. In some implementations, for each of the plurality of features, the system can calculate, based on application of a risk model for the respective vulnerability to the respective feature, an amount of risk to the respective feature associated with the respective vulnerability. One or more remedies for mitigating an impact of the respective vulnerability can be determined based on the amount of risk to the respective feature in which the one or more remedies include purchase of an insurance product of a plurality of insurance products for covering the amount of risk to the respective feature. The insurance product can include one or more coverage tiers. In some embodiments, the system can generate, based on responses to questions in a plurality of questionnaires associated with a plurality of computing infrastructures for a plurality of enterprises, a decision tree indicating a likelihood that the respective feature is eligible for coverage by the one or more coverage tiers of the insurance product. The system can determine, based on applying the respective feature associated with the respective vulnerability to the decision tree, eligibility for the respective feature to be covered by the one or more coverage tiers of the insurance product. In some examples, the eligibility of the plurality of features for coverage by the one or more coverage tiers of the plurality of insurance products can be presented to the remote computing device via a user interface.

The forgoing general description of the illustrative implementations and the following detailed description thereof are merely exemplary aspects of the teachings of this disclosure and are not restrictive.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings:

FIG. 2A depicts an embodiment of an answer data set;

FIG. 2B depicts an embodiment of a security domain sensitivity data set;

FIG. 2C depicts an embodiment of a baseline answer data set;

FIG. 2D depicts an embodiment of a security domain scores data set;

FIG. 2E depicts an example composite vulnerability sensitivity data set;

DETAILED DESCRIPTION OF ILLUSTRATIVE EMBODIMENTS

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

Figure 1:
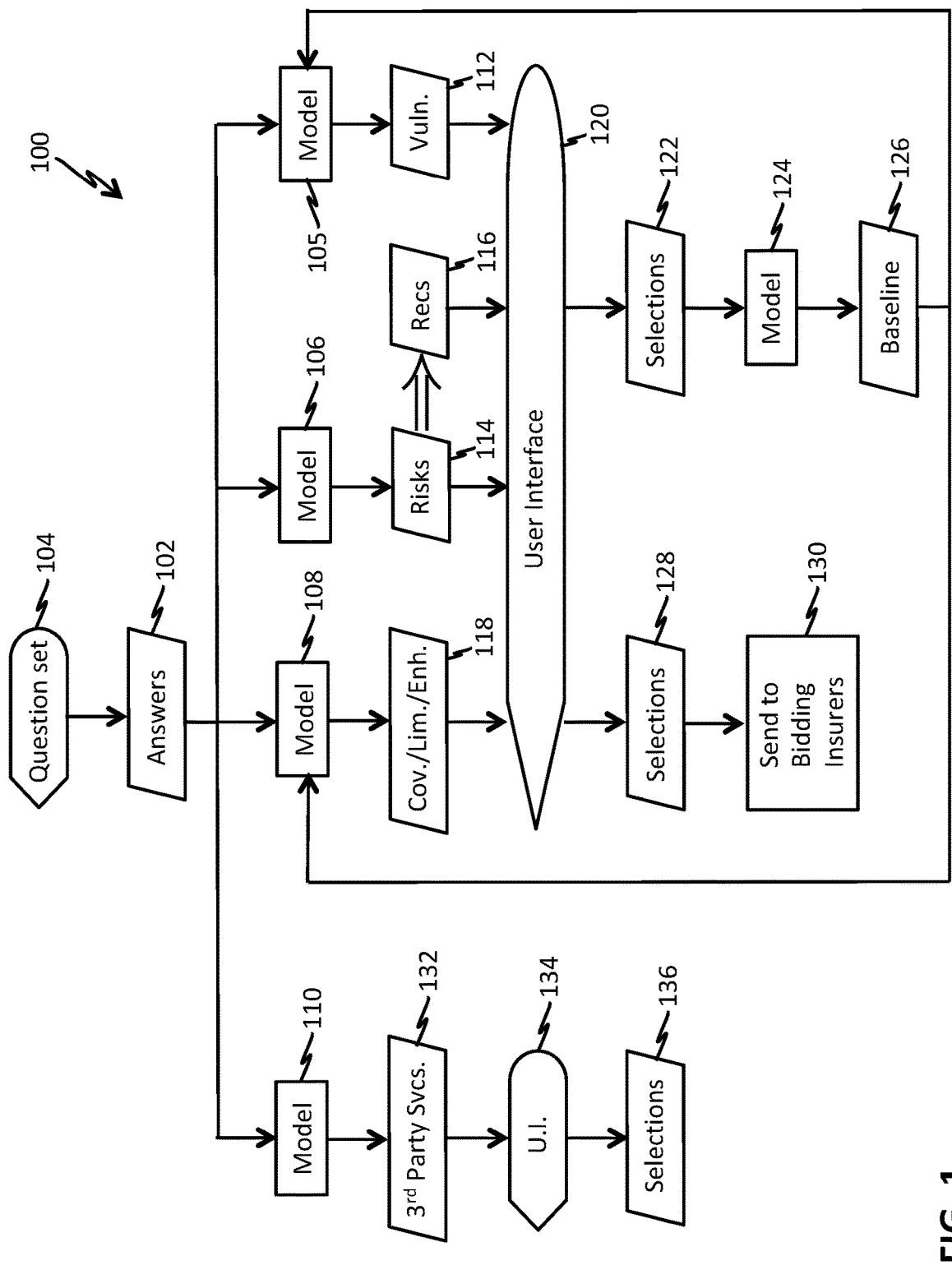
FIG. 1 depicts an operational flow for performing vulnerability assessment of computer, data and network systems.

FIG. 1 depicts an operational flow 100 for performing vulnerability assessment for computer systems and network environments. Such systems and environments may be operated in connection with a business. In an illustrative example, an automotive dealer may have systems and networks for initiating financing in connection with automotive sales, initiating payment transactions such as may be required for down payments, tracking and organizing customer information such as is customary in the context of a customer relationship management system, tracking and organizing automotive inventory, and so on. The operations of the various systems may be coordinated via communication through a local area network at the dealer and may be coordinated with third-party systems via communication conducted through the Internet or some other wide area networking arrangement. Unfortunately, exposure of such systems to the Internet or other network environments invites the potential that these systems may be compromised, resulting potentially in loss of consumer data, fraudulent payment activity, fraudulent financing activity, and/or destruction of data. To reduce the likelihood of compromise, administrators of such systems may make investments in terms of time, effort and money in practices, systems, tools, procedures, hardware and other remedies in order to remediate various vulnerabilities of their systems. The operational flow 100 of FIG. 1 is executed by a computing system and assists administrators in identifying systemic vulnerabilities or risks, associating recommended remedies with the vulnerabilities or risks the remedy is intended to mitigate, and in understanding the impact of potentially implementing one or more remedies, so that the administrator can prioritize investments of money, time and effort. In some examples, the computing system includes one or more network-connected computing devices that perform the processes represented by the operational flow 100 and other processes described further herein.

In some implementations, the operational flow 100 makes use of a set of information 102 pertaining to a particular enterprise's computer facilities, network infrastructure, and more broadly to the enterprise's assets, digital assets, informational assets (customer information, proprietary information, and so on), policies, and/or practices. According to some embodiments, at least a portion of the information 102 is obtained by posing a set of questions 104 to an administrator or security officer in charge of a particular enterprise's various computing, networking, and other facilities via one or more user interface screens. According to other embodiments, at least a portion of the information 102 is obtained by analysts who inspect the various systems, facilities, policies and procedures in place at a particular enterprise to be assessed. In further embodiments, at least a portion of the information 102 is obtained through an automated review of network elements (e.g., hardware and/or software configured to detect and identify different network connections within the enterprise's computing systems). In some examples, the systems and methods described further herein can apply an automated review of the network elements using one or more software-based analysis tools.

In one example, the information 102 can be obtained by posing questions to a system user interacting with the operational flow via a network-connected external device. In some embodiments, the system can generate a series of questions 104 posed to the user via one or more user interface screens. In another embodiment, the questions 104 can be generated and/or posed to the user by a separate system and the information set 102 (e.g., answers to the questions) are received as an input to the computing system upon which the operational flow 100.

In some implementations, the question set 104 may be organized according to component type, location of the component within the network of an enterprise, and/or department within the enterprise so that the answers to the questions can be quantified as scores reflecting the various organizational groupings. In some examples, the score may be calculated to fall in a numerical range extending from a lower bound to an upper bound. In one example, the numerical range can be a scale from one to four, one to five, one to ten, one to one hundred or any other range. The range, in turn, may indicate a propensity of the answer to comport with solid security practices or to yield vulnerabilities. For example, an answer that is evaluated to a score of one may indicate a significant likelihood of yielding a security vulnerability, a score of two may indicate a moderate likelihood of yielding a security vulnerability, a score of three may indicate a moderate agreement of an enterprise's state of affairs with solid security practices, and a score of four may indicate a significant agreement of an enterprise's state of affairs with solid security practices. Thus, according to some embodiments, the information 102 includes a set of answer scores, each of which range from a lower bound to an upper bound, and each of which complies with a convention in which scores nearer to one bound express a tendency toward systemic vulnerability, while scores nearer to the other bound express a tendency toward systemic security. The questions 104 may be structured, for example, to ask a user to select one of four answers as best describing the state of affairs of their enterprise's facilities. One of the answers may be associated with a score of one, while another answer may be associated with a score of two, and so on. Additionally, the question set 104 may include questions structured to ask the user to select each of a set of multiple-choice answers that apply to their enterprise's state of affairs. Selection of a single answer may result in a score of one, while selection of a pair of answers may result in a score of two, and so on, with a selection of all four answers resulting in a score of four. Additionally, the question set 104 may include true/false questions, where selection of one answer is scored as a one, while selection of the other answer is scored as a four. The quantification of information regarding a system's computing systems and network systems into a set of scores is described in greater detail in related provisional patent application Ser. No. 62/624,575 entitled "Systems and Methods for Vulnerability Assessment and Provisioning of Related Services" and filed Jan. 31, 2018, and Ser. No. 62/690,512 entitled "Systems and Methods for Vulnerability Assessment and Provisioning of Related Services" and filed Jun. 27, 2018, the contents of each of which are incorporated by reference herein in their entireties.

Discussion in this document assumes the application of a scoring convention where scores nearer to the lower bound of the numerical range for answer scores express a tendency for systemic vulnerability, and scores near the upper bound of the range for answer scores express a tendency for systemic security. Within the various schemes (e.g., algorithms, software engines, processing flow designs, etc.) presented herein, certain operations, such as various comparisons to thresholds or hypothetical values, assume this convention and therefore are depicted as comparisons to test whether one value is less than another (or greater than another). In some examples, the scoring convention described above could be reversed so that a score of one represents a lowest risk of vulnerability and a score of four represents a highest risk of vulnerability. Moreover, in some embodiments, no such convention pertaining to score and systemic security need be imposed at all.

As a consequence of structuring the questions 104 in such a way that their potential answers yield scores that fall along a numerical range indicating progression toward vulnerability mitigation. In some examples, the various answers (and/or answer scores) 102 to the various questions 104 posed to the user may be summarized by a set of answer data 200, depicted in FIG. 2A. In one example where the question set 104 included five questions, the answer data set 102 may include five scores ranging from a low end of a numerical range (e.g., 1) to a high end of a numerical range (e.g., 4). In some aspects, such an answer set may be constituted as by the following entries: 2, 3, 1, 4, 4. In this example, the items of answer data 200 indicate a score of two was earned on the first question, a score of three was earned on the second question, a score of one was earned on the third question, and so on. In some embodiments, the scores can be arranged in a matrix format as: [2 3 1 4 4]. More generally, in an example where a quantity of n questions 104 are posed to the user, the answer data may be arranged in a matrix as shown in FIG. 2A, where A1 is an answer score value ranging from a low end of a numerical score range to a high end of a numerical score range and indicates the score of the answer associated with the first question, and A2 is an answer score value ranging from the low end of the aforementioned numerical score range to the high end of the numerical score range and indicates the score of the answer associated with the second question, and so on. In some embodiments, scores may be individually maintained as variables, arranged as algorithmic computations, or maintained in a database form.

Returning to FIG. 1, in some implementations, the information (e.g., answers and/or scores) 102 is supplied to various modeling schemes, such as modeling schemes 105, 106, 108 and 110. In some examples, the outputs of each of the modeling schemes 105, 106, 108, and 110 provide users with various information to assist in making choices about how to prioritize investment of time, effort and money to mitigate system vulnerabilities. As seen in FIG. 1, the operational flow 100 includes a modeling scheme 105 that uses the information 102 to generate a vulnerability score 112. The vulnerability score 112, in some examples, provides an indication (e.g., numerical) of a degree to which the system in question is vulnerable to compromise or hardened against such an occurrence. In some embodiments, the vulnerability score 112 can include a number of individual security domain vulnerability scores and a composite score. The modeling scheme 105 and vulnerability scores 112 are discussed in greater detail below.

The operational flow 100 also includes a modeling scheme 106 that uses the information 102 to identify vulnerability risks 114 that are likely to be expressed by the system in question and/or are relevant to the system. The risks 114, in some implementations, may be mitigated by implementation of certain remedies 116 by the enterprise. For example, based upon the risks 114 identified by the modeling scheme 106, the operational flow 100 may produce a set of remedies 116 which are recommended for implementation to the user. The modeling scheme 106, vulnerability risks 114 and recommended remedies 116 are discussed in greater detail below.

The user, in some examples, may address certain risks 114 by securing an insurance policy covering the enterprise in the event that a given risk leads to a loss due to an exploitation of a system vulnerability. To assist the user, in some implementations, the operational flow 100 of the system includes a modeling scheme 108 that identifies particular policies, coverages, limits and enhancements 118 that may be offered to the enterprise in view of the information 102. The modeling scheme 108 and the identified policies, coverages, limits and enhancements 118 are discussed in greater detail below.

In some implementations, the user interacts with a user interface 120 that presents the vulnerability score(s) 112 for the enterprise in question to obtain a succinct and rapid summary of one or more system vulnerabilities. The user interface 120 may also present the risks 114 (for example, "the system is vulnerable to a man-in-the-middle attack" or "the system is vulnerable to a SQL injection attack") as well as, in some embodiments, corresponding recommended remedies (for example, "it is recommended that the system undergo a penetration test") that would mitigate certain risks 114 and thereby improve the vulnerability score 112. According to some embodiments, the recommended remedies 116 can be offered for sale through the operational flow 100. The user interface 120, in some embodiments, permits the user to select one or more services for purchase which are identified in the recommendations 116. In some implementations, selection of one or more services may automatically link the user to one or more third-party portals or websites for obtaining the respective remedy product.

When the user selects a particular recommendation 116 for purchase and/or application to the enterprise, in some implementations, the workflow 100 adds the recommendation 116 to a selections set 122. The selections set 122, in some implementations, may list one or more recommendations 116 identified by the user in response to the system recommendations to improve the vulnerability score(s) 112 of the enterprise.

The entries within the selection set 122, in some embodiments, are delivered to a modeling scheme 124 to create a new baseline set of answer data 126. In some examples, the baseline set of answer data 126 is a set of hypothetical answer data that reflects what the information 102 (e.g., answer scores) would be if one or more recommended remedies 116 are implemented. In some examples, an updated baseline set of answer data 126 can be delivered to the modeling schemes 105 and 108. Upon application of the updated baseline data 126 to the modeling schemes 105, 108, the outputs from the models 105, 108 can be provided to the user-interface instantly e.g., in real time) with revised vulnerability score information 112 and projected insurance policy, coverage, limits and enhancement data 118. This dynamic update of user interface screen with updated model outputs allows the user to understand the impact of having elected to purchase or otherwise apply the recommended remedy(s). The selections set 122, modeling scheme 124, and baseline set of answer data 126 are discussed in greater detail below. In this way, the work flow provides a technical solution to the technical problem of automating the identification and presentation of security vulnerabilities to users in real-time as well as calculating and adjusting, in real-time, the impact of the vulnerabilities based on application of one or more remedies.

The user interface 120, in some implementations, also permits the user to select a desired insurance coverage, limit, and enhancement 118. In the event that the user selects a particular combination of coverage, limit and enhancement for purchase, the combination is added to insurance selections information 128. According to some embodiments, the combination in the insurance selections information 128 is delivered to an administrator of the operational flow 100 (e.g., an insurance broker) for initiation of insurance coverage. According to other embodiments, the combination in the insurance selections information 128 is delivered to one or more third-party insurance providers (see communication module 130) for the initiation of an underwriting and bidding process to determine whether the sought-after insurance coverage is in fact available to the user's enterprise, and if so, at what cost.

In some implementations, the information 102 can also be applied to a modeling scheme 110 that determines one or more third-party services 132 that are relevant to vulnerabilities detected for the enterprise. The identified third-party services 132, in some examples, are presented to the user via a user interface 134. In some embodiments, the user interface 134 can be part of user interface 120. According to other embodiments, the user interface 134 is a separate user interface and is accessed by "linking" the user to another system by providing a hyperlink to a website or web application hosted by a provider of the third-party service in question. In some embodiments, the selected third-party services are accumulated into a third-party selections information 136 and communicated to the one or more corresponding third-party external systems for initiation of the service(s) to the enterprise in question.

In some implementations, the system assigns a vulnerability score to each of a number of security domains and to the enterprise in question as a whole (e.g., a composite vulnerability score is assigned to the enterprise). For example, vulnerabilities may be organized into domains such as: data security, critical data in systems, identity and access management, endpoints and security systems, cloud/network security, physical security, application security, and/or third-party security. In some embodiments, some questions may affect one vulnerability score and/or security domain more than others. In some examples, a particular question may bear heavily on assigning a vulnerability score to one security domain, while having only moderate or no impact on vulnerability score assigned to other domains. For example, the question: "does your enterprise have on-facility security?" may include an answer set of: (a) no; (b) at some facilities but not others; (c) at all facilities; (d) at all facilities during office hours; and (e) at all facilities at all times. In some examples, an answer score of 0 is assigned to a selection of "a" (e.g., "no"), an answer score of 1 is assigned to a selection of "b" (e.g., "at some facilities but not others"), and so on, culminating with an answer score of 4 being assigned to a selection of "e" (e.g., "at all facilities at all times"). An answer score of 4 to this question may have a greatest impact (a greatest weight) on the vulnerability score assigned to the "physical security" domain, moderate impact on the "third-party security" domain (it is helpful but not absolutely necessary to have a security officer to ensure that visiting third-party guests sign in, for example), and no impact on the "endpoints and security systems" domain (because a security officer has no bearing on computing facilities being exposed over a network). To account for this, in some implementations, the operational flow 100 employs security domain sensitivity data, shown in FIG. 2B as a matrix 202.

As can be seen from FIG. 2B, the matrix 202 is arranged to have a quantity of n rows—one for each answer score in the answer data 200—and a quantity of m columns—one for each security domain. Each combination of row and column contains a sensitivity value, $S_{i,j}$, that reflects the sensitivity of the vulnerability of the jth security domain to the ith question. For example, in the previous question pertaining to the presence of a security officer was the 25th question posed to the user (meaning its corresponding answer score was the 25th entry in the answer data matrix 200 of FIG. 2A), the "physical security" domain was the 6th security domain, the "third-party security" domain was the 8th domain, and the "endpoints and security systems" domain was the 4th security domain. Based on these values, the sensitivity value $S_{25,6}$ indicates the sensitivity of the "physical security" domain to the answer score assigned to the question pertaining to the presence of a security officer, while sensitivity value $S_{25,8}$ indicates the sensitivity of the "third-party security" domain to the answer score assigned to that question, and sensitivity value $S_{25,4}$ indicates the sensitivity of the "endpoints and security systems" domain to the answer score assigned to that question.

Figure 3:
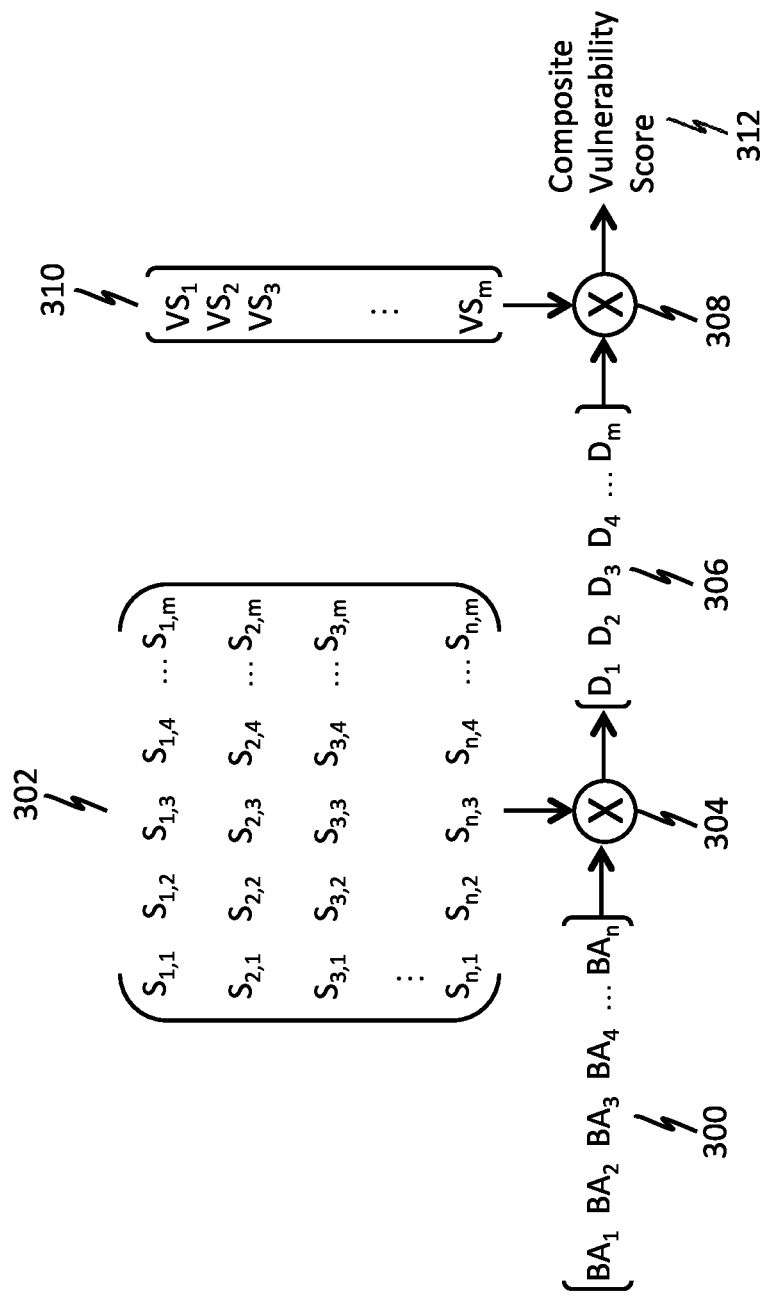
FIG. 3 depicts an embodiment of a scheme for generation of security domain vulnerability scores and a composite vulnerability score.

Turning to FIG. 3, a depiction of an example scheme for the generation of individual security domain vulnerability scores 306 and for the generation of a composite vulnerability score 312 is shown. In some implementations, the scheme of FIG. 3 is an example of the modeling scheme 105 of FIG. 1 used to supply the user interface 120 of FIG. 1 with vulnerability scores 112. The operation of the scheme of FIG. 3, in some examples, begins with generation of a baseline answer data 300 (shown in FIG. 2C). In illustration, baseline answer data 300 can represent the answer scores that would have been assigned to the enterprise in question had the remedies in the selections set 122 been employed. When the user initially arrives at the user interface 120, no remedies have been selected for purchase and/or application, meaning that the selections set 122 is empty, and the baseline answer data 300 is equal to the actual answer data 102 (e.g., answer matrix 200 of FIG. 2A). For ease of discussion, the scheme of FIG. 3 is discussed as though the baseline answer data 300 is equal to the actual answer data 200 (FIG. 2A); however, in some implementations, the baseline answer data 300 may differ from the actual answer data 200.

As shown in FIG. 3, in some implementations, a multiplication module 304 can be used to multiply the baseline answer data matrix 300 by a security domain sensitivity matrix 302 (e.g., sensitivity matrix 202 of FIG. 2B). The output of the multiplication module 304, in some examples, is a security domain scores matrix 306, where the ith entry in the matrix is the vulnerability score assigned to the ith security domain. An example of a security domain scores matrix 206 is depicted in FIG. 2D. Continuing with the example of the presence of a security officer as it relates to the score assigned to the "physical security" domain (assumed to be the 6th security domain), it follows, then, that $D_6$ corresponds to the vulnerability score assigned to the "physical security" domain. By virtue of the operation of matrix multiplication, $D_6 = BA_1 * S_{1,6} + BA_2 * S_{2,6} + \ldots BA_{25} * S_{25,6} + \ldots Ba_n * S_{n,6}$. Therefore, $D_6$ corresponds to the sum of a quantity of n terms—one term for each answer given to each question posed to the user. In some examples, the first term is equal to the first answer score multiplied by a sensitivity value, while the second term is equal to the second answer score multiplied by a sensitivity value, and so on. Carrying on with our example, then, the 25th term is equal to the answer score pertaining to the question about the physical presence of a security officer (recall that we assumed it was the 25th question posed to the user). If the user selected answer "e" (present at all facilities at all times), then $BA_{25}$ is equal to the highest end of the answer range which was assumed to be 4 in the context of the example. Because presence of a security officer bears great weight on the vulnerability score assigned to the "physical security" domain, the value assigned to the security domain's sensitivity to the 25th question, ($S_{25,6}$), can be at the high end of a numeric range of possibilities for sensitivity values. For example, if a given sensitivity value ranges from 0 to 1, with 0 corresponding to the particular answer score having no weight on the vulnerability score assigned to the particular domain, 0.25 corresponding to minimal weight, 0.5 corresponding to moderate weight, 0.75 corresponding to heavy weight, and 1 corresponding to great weight. In such a case $S_{25,6}$ can be assigned a value of 1, meaning that the respective answer accounted for 4 points being added to the vulnerability score assigned to the "physical security" domain. If each security domain has a maximum security score of 50, for example, then the presence of a security officer on all facilities at all times is worth 12.5% of the total points assigned to the "physical security" domain.

The security domain scores matrix 306, in some implementations, is received by multiplication module 308, which multiplies the security domain scores matrix 306 by a composite vulnerability sensitivity matrix 310 (e.g., vulnerability sensitivity matrix 208 of FIG. 2E). The composite vulnerability sensitivity matrix 310 can include a quantity of m sensitivity values—one for each security domain—where $VS_i$ corresponds to the sensitivity of the composite vulnerability score to the vulnerability score assigned to the ith security domain. $VS_i$ may take on values ranging from a low end of a numerical range (indicating that the composite vulnerability score has lesser sensitivity to the vulnerability score assigned to the ith security domain) to a high end of the numerical range (indicating that the composite vulnerability score has greater sensitivity to the vulnerability score assigned to the ith security domain). For example, the numeric range may span from 0 to 1, with meanings as generally outlined above with reference to sensitivity of a security domain to a given answer score. In some examples, the output of the matrix multiplication is a composite vulnerability score, C, equal to: $C = D_1 * VS_1 + D_2 * VS_2 + \ldots D_m * VS_m$. In some implementations, the vulnerability sensitivity scores $VS_1 - VS_m$ can be chosen collectively to permit the composite vulnerability score to range from 0 to a chosen maximum value (e.g., 100).

Figure 4:
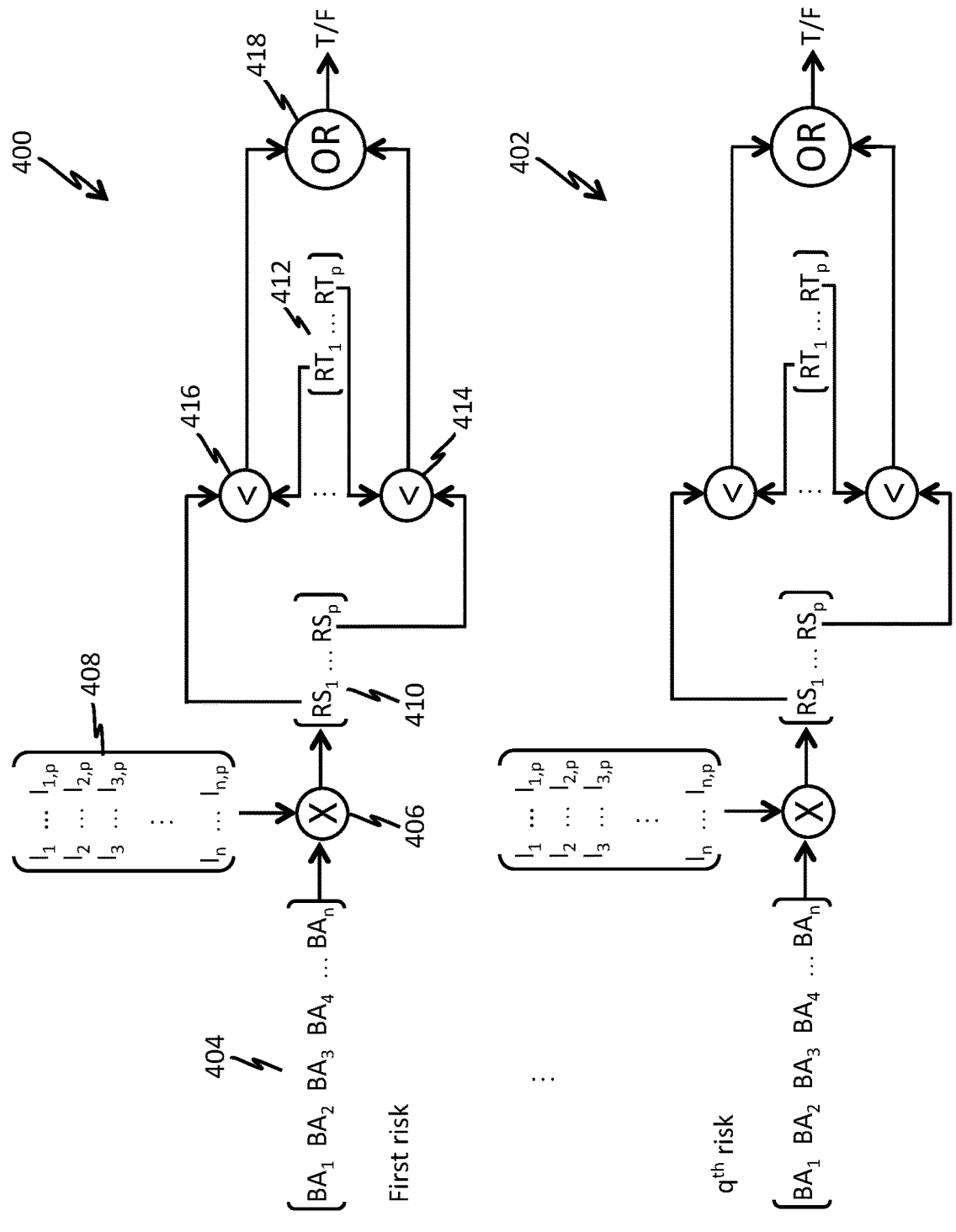
FIG. 4 depicts an embodiment of a scheme for determining whether risks tracked by the various embodiments of the system of FIG. 1 are relevant to a system.

FIG. 4 depicts an example scheme for the generation of applicable risks to the enterprise in question. The scheme of FIG. 4, in some embodiments, is an example of the modeling scheme 106 used to supply the user interface 120 of FIG. 1 with descriptions of applicable risks 114. The scheme can include decision-making modules 400 and 402, for illustration brevity. In some embodiments, a larger number of decision-making modules can be provided—one for each risk 114 that is tracked by the operational flow 100. Further, each decision-making module may or may not be relevant to the enterprise in question and therefore the decision-making module may or may not be executed a respective user and/or enterprise request via user interface 120. In the context of an embodiment of the operational flow 100 that tracks a quantity of p risks 114, decision-making module 400 relates to the first risk 114 tracked by the operational flow 100 and decision-making module 402 relates to the pth risk 114 tracked by the system, with a quantity of p−2 undepicted decision-making modules interposed between modules 400 and 402. According to some embodiments, the output of each decision-making module 400 and 402 is a true/false indicator, which reveals whether the risk associated with the given module 400 and 402 is relevant to the system in question. Thus, if the output of the ith module 400 and 402 is "true" then the ith risk 114 tracked by the system is relevant, and if it is "false" then the ith risk is not relevant.

In some embodiments, each of the modules 400 and 402 can be identical in structure, although the data provided to each such module varies based upon the particular risk being evaluated for relevance. Therefore, the discussion will pertain to the first decision-making module 400, with the understanding that it applies equally to all of the other such modules, e.g. module 402. In other embodiments, the structure of modules 400, 402 may not be identical and may include or exclude certain components based on characteristics of the respective risks, security domains, and/or applied matrices.

The operation of the decision-making module 400, in some implementations, begins with creation of a baseline answer data 404 (such as the answer data 200 of FIG. 2C). As mentioned previously, baseline answer data set 404 represents the answer scores that would have been assigned to the enterprise in question had the remedies in the selections set 122 been employed. This means that when the user initially arrives at the user interface 120, no remedies have been selected yet for purchase or application, and thus the selections set 122 is empty. Therefore, the baseline answer data 404 is equal to the actual answer data 200 (FIG. 2A). For ease of discussion, the scheme of FIG. 4 is discussed as though the baseline answer data 404 is equal to the actual answer data 200 (FIG. 2A).

Figure 5A:
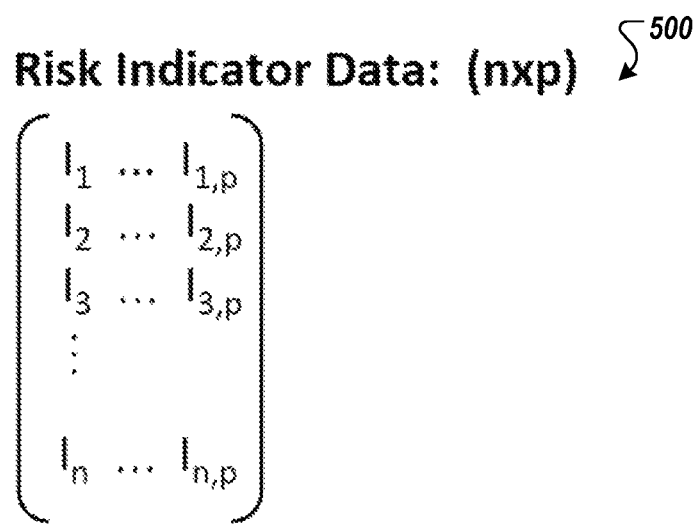
FIG. 5A depicts an embodiment of a risk indicator data set.

The baseline answer data 404, in some implementations, is supplied to a multiplication module 406 that performs a matrix multiplication upon the baseline answer data 404 and a risk indicator data matrix 408 (such as a risk indicator data matrix 500 depicted in FIG. 5A). In some examples, there is one risk indicator matrix 408 for each risk 114 tracked by the operational flow 100.

In some implementations, the operational flow 100 of the vulnerability assessment and mitigation system tracks the risk that sensitive corporate data will be stolen by an employee. In considering whether this risk is applicable to a given organization and its systems, a risk may be relevant if there are a large number of aggrieved employees at the enterprise being assessed. For example, an organization has laid off significant numbers of employees to reduce costs, there might be a reasonable assumption that some of those employees could feel aggrieved and may elect to retaliate by misappropriating corporate data. Separately, a particular organization may be at risk for employee misappropriation of data based on a combination of weak control over data resources combined with a large employee pool. Thus, in this example, there may be at least two independent bases for concluding that the risk of employee misappropriation of corporate data is relevant to an organization (e.g., the motivation of employees to retaliate via misappropriation and the opportunity for misappropriation combined with a large enough employee population that it is reasonable to conclude that someone is likely to have poor character (or be suffering financial distress or have some other aspect of their personal life motivate misappropriation, etc.)). The risk indicator matrix 408, in some embodiments, can have as many columns as there are independent bases for concluding that the risk 114 it is associated with is relevant. In the context of the example of employee misappropriation of corporate data, there may be two bases as discussed above, corresponding to two columns. The risk indicator matrix 408 can have one row for each answer score in the baseline answer score matrix 404. In one example, in the context of a baseline answer score matrix having a quantity of n such scores therein, the risk indicator matrix 408 can have a quantity of n rows.

In some implementations, a given indicator weight $I_{i,j}$ may take on a value ranging from the low end of a numerical range to an upper end of the range, and its value indicates the extent to which the ith answer score in the baseline answer score matrix 404 tends to refute or mitigate the effect of the jth basis for concluding that the particular risk associated with the risk indicator matrix 408 is relevant. In some implementations, a greater value assigned to a particular indictor weight $I_{i,j}$, indicates that an answer score value assigned to the ith entry in the baseline answer score matrix 404 that is nearer the upper end of the numerical range for answer score values tends to more strongly refute or mitigate the effect of the jth basis for assuming relevance of associated risk 114. On the other hand, a lesser value is assigned to a particular indictor weight $I_{i,j}$, indicates that an answer score value assigned to the ith entry in the baseline answer score matrix 404 that is nearer the upper end of the numerical range for answer score values tends to more weakly refute the jth basis for assuming relevance of associated risk 114 (if the indicator weight were to be 0, for example, it means that even if ith answer score value was at the very upper end of the numerical range for answer scores, it would have no tendency to refute the basis for relevance).

Figure 5B:
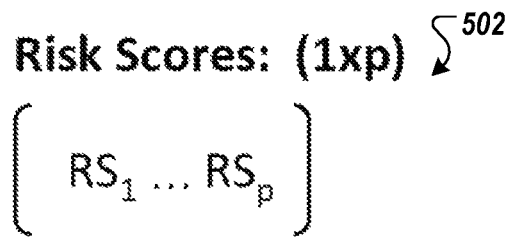
FIG. 5B depicts an embodiment of a risk scores data set.

In some implementations, the result of the matrix multiplication is the production of a risk score matrix 410 (such as a risk score matrix 502 depicted in FIG. 5B). The risk score matrix 410 has a quantity of p risk scores within it, where a given risk score $RS_i$ indicates the cumulative tendency of the various baseline answer scores 404 to refute the ith basis for determining that the risk 114 associated with the decision-making module 400 is relevant. Specifically, $RS_i$ may be the sum of n terms, where n is equal to the number of entries in the baseline answer score matrix 404: $RS_i=BA_1*I_{1,i}+BA_2*I_{2,i} \ldots +BA_n*I_{n,i}$. Thus, the greater a given risk score $RS_i$, the greater its tendency to refute or cause a reduction in relevance of the associated risk and vice versa.

Figure 5C:
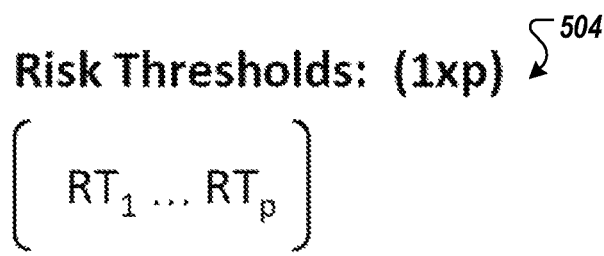
FIG. 5C depicts an embodiment of a risk thresholds data set.

As can be seen from FIG. 4, each module 400 contains a risk threshold matrix 412 (such as the risk threshold matrix 504 depicted in FIG. 5C). The risk threshold matrix 412 contains a quantity of p thresholds, $RT_j$, within it. In some implementations, each risk score $RS_i$ can be delivered to a comparator, such as comparators 414 and 416, for comparison with a corresponding risk threshold $RT_i$ on a piecewise basis. For example, the first entry in the risk score matrix 410 is compared with the first entry in the risk threshold matrix 412, and the second entry in the risk score matrix 410 is compared with the second entry in the risk threshold matrix 412, and so on. In the event that any of risk score $RS_i$ is less than its corresponding risk threshold $RT_i$, then in some examples, the risk associated with the module 400 is determined to be relevant. In other words, each risk threshold $RT_i$ is an expression of how strongly the basis with which it is associated must be refuted in order to conclude that the associated risk is not relevant. If any one basis is not sufficiently refuted, then the associated risk is relevant to the system in question by reason of at least that one particular insufficiently mitigated basis. Therefore, the output of each comparator 414 and 416 is provided to a union operator 418, for determination of whether the associated risk 404 (e.g., the risks 114 of FIG. 1) is relevant.

In some implementations, if the output of one of the modules 400 and 402 indicates that its associated risk 404 is relevant to the enterprise in question, then the risk 404 (e.g., risks 114 of FIG. 1) is presented to the user via the user interface 120. According to some embodiments, the risk can be presented as a title of the risk, a description of the risk, an explanation describing how the risk was determined to be relevant to the enterprise in question in view of the answer data set scores 102 (200 of FIG. 2A), and a list of recommended remedies that could mitigate the particular relevant risk that is being described. An example screen for presenting the risk information is presented herein in FIG. 18.

Figure 6:
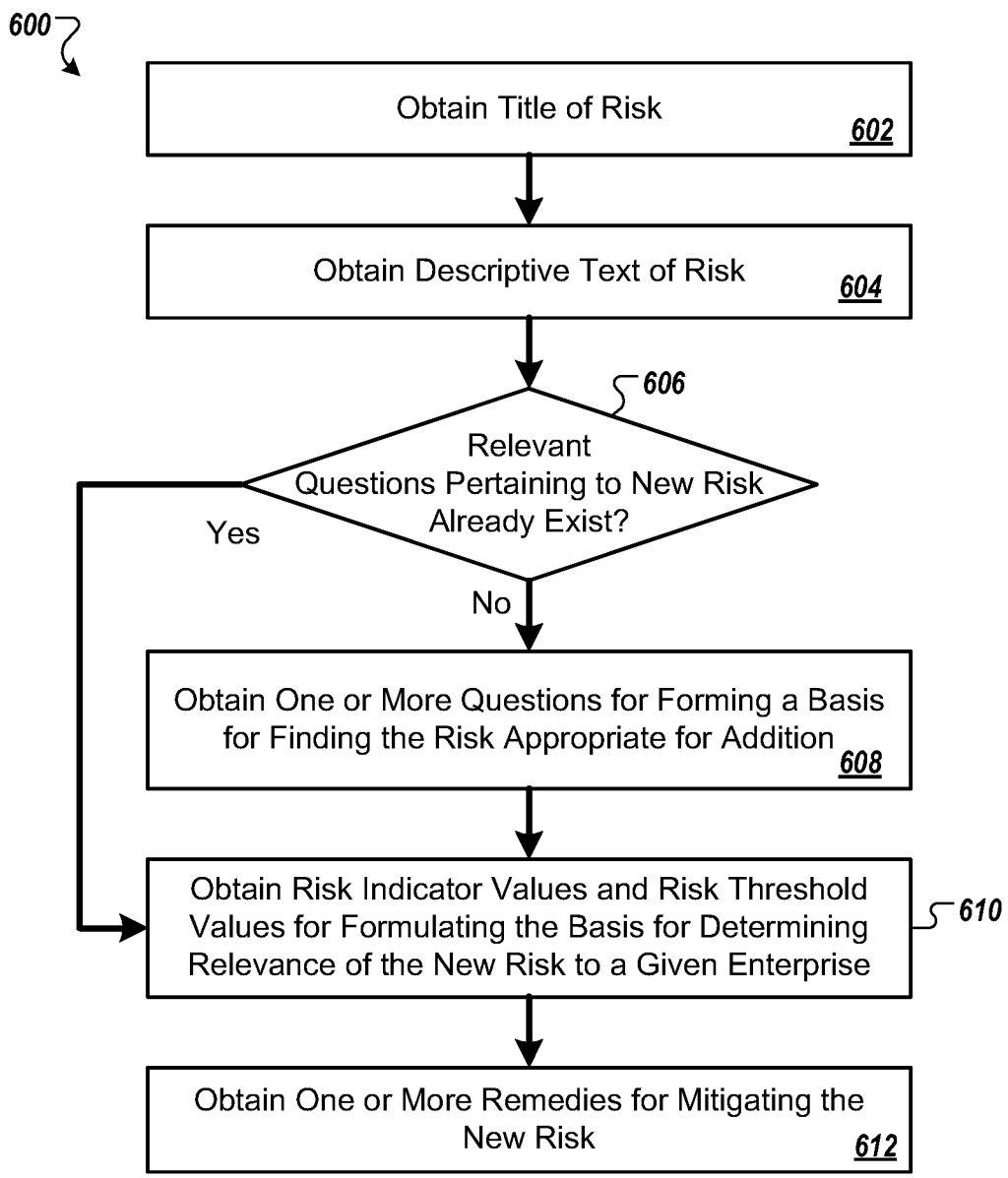
FIG. 6 depicts a flow chart of an example method for onboarding a new risk for tracking by the various embodiments of the system of FIG. 1.

From time to time, new risks present themselves in the landscape of system vulnerability. For example, a particular generation and model of processor may exhibit behavior that permits data compromise. Thus, a new risk of processor-enabled data leakage can be added to the operational flow 100 and tracked for potential relevance to the enterprise in question. In some implementations, the vulnerability detection and remedy system can automatically detect changes in risk for various enterprise system components based on information received from one or more external data sources. When a component risk level is manually or automatically detected, the system can automatically adjust the risk level for the respective components that are affected. Given the data demands for determining the relevance of a given risk to a particular enterprise and the informational demands related to presenting a risk to the user via the user interface, FIG. 6 depicts a flow chart of an example method 600 for onboarding a new risk into a system such as a system executing the operational flow 100 in order that the system might track the risk and determine its potential relevance to the enterprise in question. In some implementations, a portion of the operations of the method 600, for example, may be carried out automatically by one or more computer-implemented processes to allow for simple consolidated entry of information pertaining to a risk. For example, any risk information that is automatically or manually obtained by the system is automatically stored in predetermined portions of data repositories, associated tables and fields of the databases, and/or other data stores, so that the operational flow 100 can properly function and track the newly introduced risk 114. Operations of the method 600 may be executed in part using a graphical user interface with a user, such as the graphical user interface 120 of FIG. 1.

In some implementations, the method 600 for onboarding a new risk 114 into the operational flow 100 begins with obtaining a title for the risk (602). For example, an administrator or operator of the operational flow 100 may be prompted at a graphical user interface for a title of the new risk 114 (e.g., "Man-In-The-Middle Attack"). The title may be associated with the new risk 114 for presentation via the graphical user interface 120 in presenting the risks 114 to a representative of an enterprise.

In some implementations, descriptive text of the new risk is obtained (604). For example, the administrator may be prompted at the graphical user interface for descriptive text of the new risk 114. The descriptive text may involve entry of two or more separate text strings, such as an abbreviated summary text string that articulates the risk in a sentence and consumes little screen space on the user interface 120, and a longer string that articulates the risk 114 in a manner intended to educate the user about the nature of the risk. In some embodiments, the descriptive text can be associated with the new risk 114 such that, during presentation to the user at the graphical user interface 120, the risk 114 may be identified and explained to the user through presentation of the descriptive text.

In some embodiments, initial inquiries made of the enterprise, such as via the question set 104, lack appropriate inquiries from which to form the basis for concluding that the new risk appears relevant to the enterprise in question. Therefore, in some implementations, if relevant questions are missing from the set of questions (606), the administrator or operator is prompted for one or more new questions 104 to add to the question set 104 (as well as, in some embodiments, the corresponding answers for the user to select from) in order to formulate a basis for concluding that the risk may be relevant (608). The questions, for example, may be added to the question set 104 for future assessments of enterprises that may share similar characteristics.

In other embodiments, instead of or in addition to question identification, the administrator or operator may be prompted for identification of one or more system elements (e.g., hardware, software, firmware, and/or human resource policies) associated with the risk. For example, a new risk may be based upon a particular manufacturer or model of portable computing device (hardware), and a human resource policy may allow for employees to connect such a portable computing device to the enterprise network. Other examples of new risks that may arise but not require new questions to be added to the existing question set 104 include situations in which a system under analysis uses a particular encryption scheme or functional element (e.g., database server, web server, etc.) that was once thought to be secure but is later learned to contain a vulnerability. In such instances, it may be the case that the existing question set 104 already contains questions that would generate responses indicating that the system under analysis uses the aforementioned encryption scheme or functional element, but the existing values for risk indicators and risk thresholds were not selected to associate the use of those encryption schemes or functional elements with risk. Thus, the values for risk indicators and risk thresholds would have to be altered in order to associate such use with risk, as discussed immediately below in connection with operation 610.

In some implementations, values for risk indicators (e.g., the matrix 500 of FIG. 5A) and the risk thresholds (e.g., the matrix 502 of FIG. 5B) are obtained from the administrator or operator (610). The risk indicators and risk thresholds, for example, are associated with formulating the basis for concluding that the new risk 114 is relevant to the given enterprise when analyzed by the operational flow 100 of FIG. 1. The administrator or operator may further be prompted for reason information that provides amplifying information for why a particular risk indicator is relevant to the assessment. For example, the administrator or operator may be requested to provide a reason string associated with each risk indicator. The reason string articulates the reason that, in the event that the risk score 410 associated with the particular column falls beneath the risk threshold 412 associated with the particular column, the new risk 114 should be identified as relevant to the enterprise. In an illustrative example, the risk string may explain: "Your enterprise appears to have recently laid off employees as part of a cost cutting measure. Affected employees that are in the terminal part of their employment may seek to misappropriate sensitive corporate data." The reason information may be stored in association with the risk 114. The reason information, for example, may be presented to a representative of the enterprise via the graphical user interface 120 when presenting the risks 114 pertinent to that enterprise.

Figure 7:
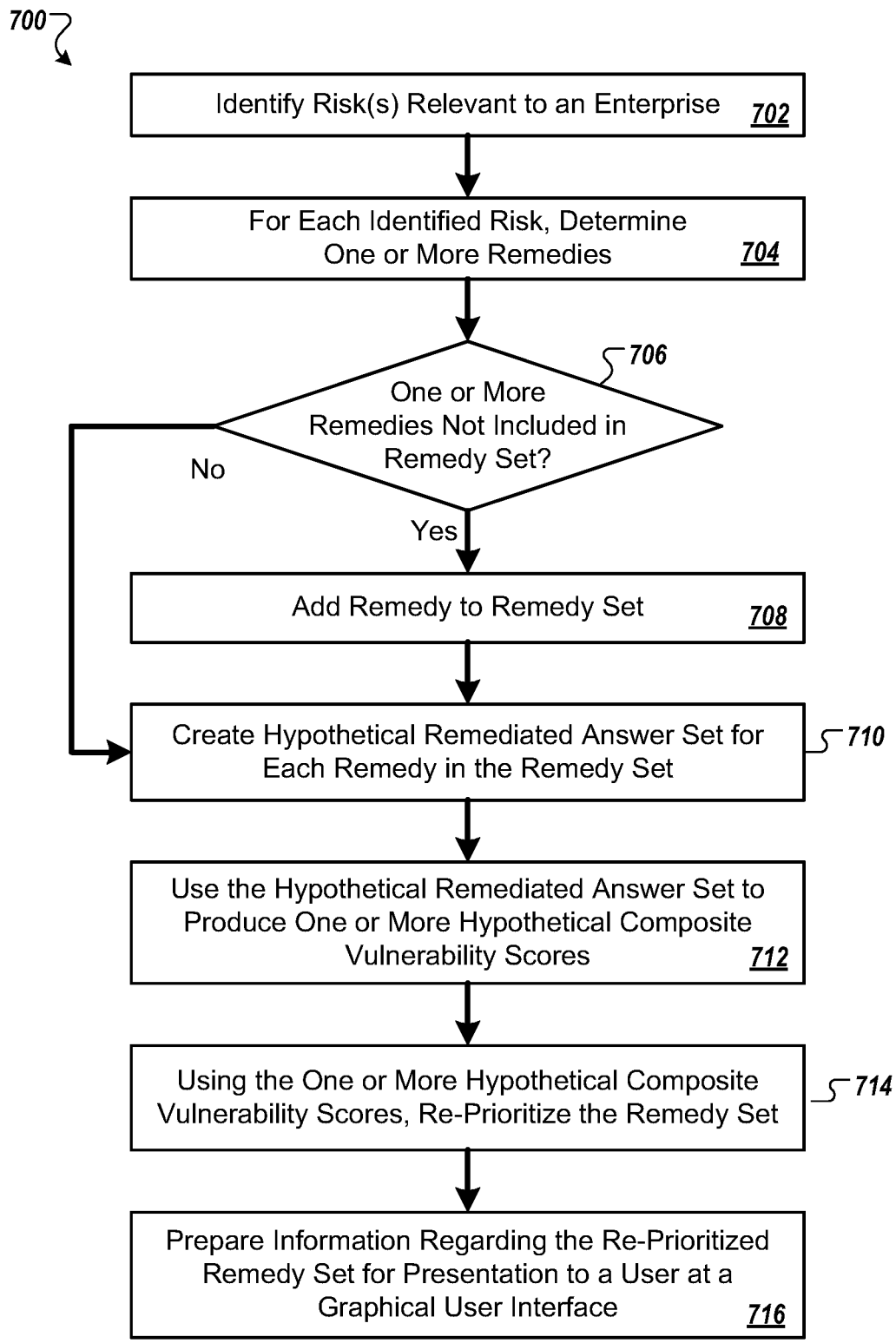
FIG. 7 depicts a flow chart of an example method by which to present recommended remedies via a user interface.

In some implementations, the operator or administrator is prompted to associate the new risk with one or more remedies that could mitigate the risk (612). The remedies, for example, may include products and/or services to decrease vulnerability of one or more systems of the enterprise. For example, the operator or administrator may be presented with a list of the remedies 116 for selection of one or more remedies relevant to the risk. In one example, the remedies are presented by the operational flow 100 of FIG. 1 to the user as recommendations 116 in the user interface 120. If no present remedy is included within the set of remedies 116, in some embodiments, the operator or administrator may be prompted to add a new remedy, as discussed in relation to the method 1100 of FIG. 11. As discussed above in relation to FIG. 4, the user interface 120, in some embodiments, presents recommended remedies 116 in association with the particular risks 114 that they mitigate. This can be accomplished using the association information gathered by the method 600. According to some embodiments, the user interface 120 also presents the recommended remedies on a separate screen organized according to the degree by which their implementation would cause the composite vulnerability score 112 of the system in question to rise (as opposed to be organized by their association with risks). FIG. 7 depicts a flow chart of an example method 700 by which to organize recommended remedies, such as the recommended remedies 116, in such a manner.

Although illustrated in a particular series of events, in other implementations, the steps of the process 600 may be performed in a different order. For example, obtaining a title of the risk (602) may be performed before, after, or simultaneously with obtaining descriptive text of the risk (604). Additionally, in other embodiments, the process may include more or fewer steps while remaining within the scope and spirit of the process 600.

The method 700 of FIG. 7, in some implementations, begins with identifying the relevant risks for the system(s) of the enterprise in question (702). The example scheme 400 for performing this operation 702 has been discussed with reference to FIG. 4. For example, one or more models such as the model 106 of FIG. 1 may identify the risks 114.

In some implementations, for each risk, one or more remedies are identified (704). The remedies may include services and/or products for mitigating the associated risk. The remedies, for example, may be identified as recommendations 116 by the model 106 of the operational flow 100 as described in relation to FIG. 1.

In some implementations, it is determined whether each remedy has already been included in a set of remedies (706). Some remedies may be applicable for multiple risks, such that the same remedy may have already been identified in relation to a previously assessed risk.

If one or more remedies have not yet been included in the remedy set (706), in some implementations, the remedies are added to a set of remedies (708), which avoids duplication. In other embodiments where an enterprise includes multiple systems, the set of remedies may include remedies applicable to each system such that, although a particular remedy was already identified, it was not identified in the context of a particular system of the enterprise. In this situation, the same remedy may be added to the set of remedies under the context of the new system.

Although illustrated in a particular series of events, in other implementations, the steps of the process 700 may be performed in a different order. For example, each remedy can be processed sequentially or simultaneously such that adding one remedy to the remedy set (708) may be performed before, after, or simultaneously with using the hypothetical remediated answer set to produce one or more hypothetical composite vulnerability scores for another remedy (712). Additionally, in other embodiments, the process may include more or fewer steps while remaining within the scope and spirit of the process 700.

Figure 8A:
FIG. 8A depicts an embodiment of a hypothetical answer data set.

In some implementations, a hypothetical answer set (depicted as hypothetical answer set 800 of FIG. 8A) is created for each remedy in the remedy set (710). Each hypothetical answer set may be constructed to contain the answer scores that the user would have provided had the remedy with which it is associated been implemented. For example, if the question set 104 of FIG. 1 posed to the user a question pertaining to security officer presence, and if the user were to answer that the enterprise did not have a security officer at any of their facilities, the answer score related to that particular answer would be at the bottom of the numerical range for answer scores, e.g., 0, indicating no officer presence whatsoever. One remedy within the remedy set 116 may be the purchase of security services for each operated facility. The hypothetical answer set associated with such a remedy would be identical to the answer scores in the actual information 102, with the exception that the aforementioned answer score pertaining to security officer presence would be altered to be at the top of the numerical range for answer scores, e.g., 4, in order to reflect the impact of implementing the remedy. The modeling scheme 124 of FIG. 1, for example, may create a new baseline set of answer data 126 based upon the remedy selections 122.

Figure 8B:
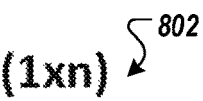
FIG. 8B depicts an embodiment of an influence of remediation data set.
Figure 9:
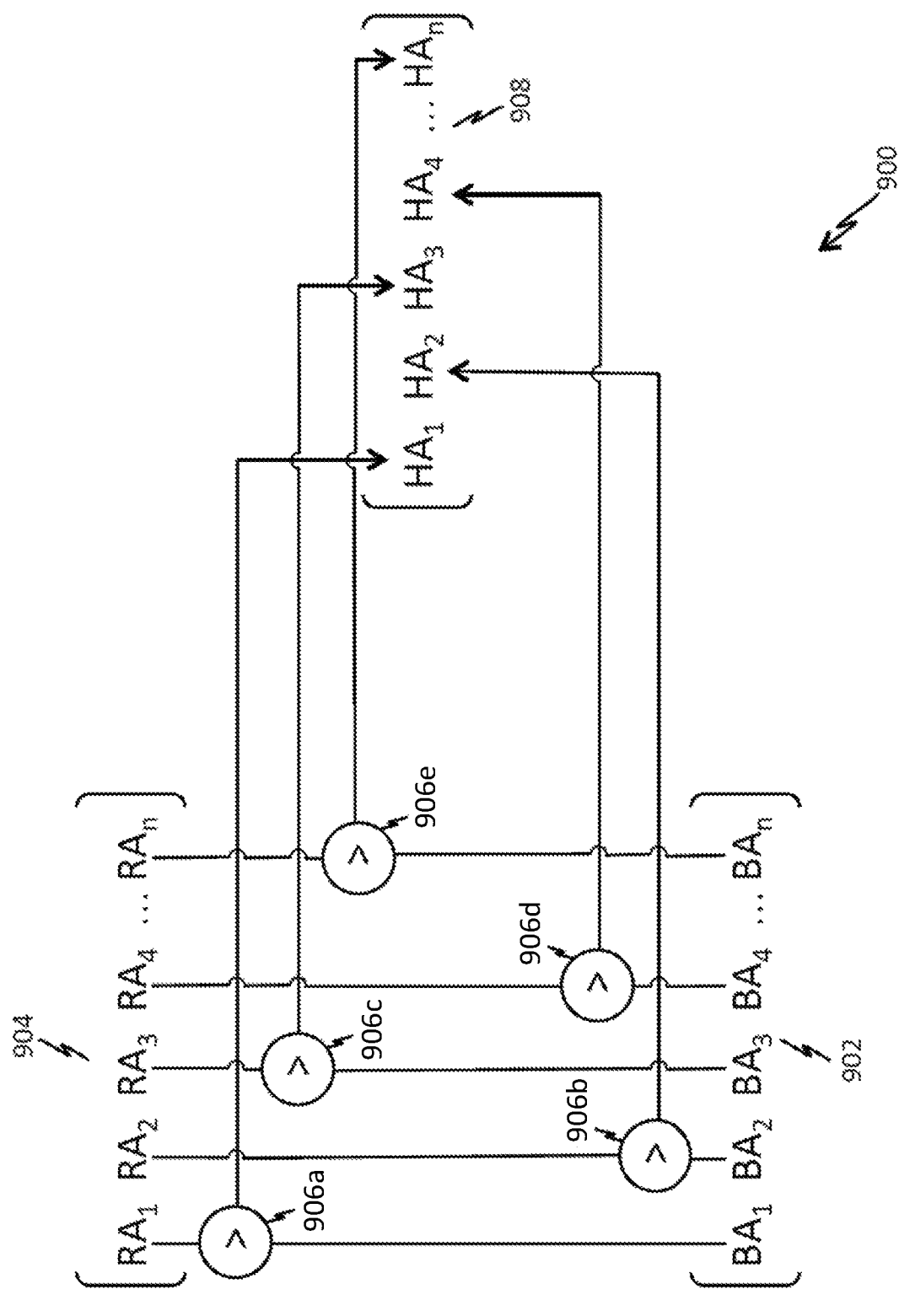
FIG. 9 depicts an embodiment of a scheme for creation of a hypothetical answer data set.

FIG. 9 depicts an example scheme 900 by which to create a hypothetical answer set for each remedy in the remedy set (e.g., remedy set 116 of FIG. 1). The scheme 900, in some implementations, accepts a baseline answer data matrix 902 (such as the baseline answer data matrix 204 of FIG. 2C) and an influence of remediation data matrix 904 (such as an influence of remediation data matrix 802 depicted in FIG. 8B) as inputs. The influence of remediation data matrix 904 is representative of the influence a particular remedy (e.g., to suppress or combat an identified risk) may have had with respect to the answers a user would have provided to the question set 104 of FIG. 1. For example, consider a scenario in which the user had initially provided an answer indicating that the enterprise employed no physical security at all, and further consider that thereafter the user selects a remedy that involves purchasing physical security services. The influence of the selected remedy is that the answer to the question pertaining to physical security would change. For example, assuming implementation of the selected remedy, then the facilities do in fact have security and the user would have provided an answer indicating that. The initially provided answer set, when amended to account for the influence of the various selected remedies (once implemented) thereby becomes the hypothetical answer data 908. There may be a separate influence of remediation data matrix 904 associated with each remedy 116 proposed by the operational flow 100. The structure of the baseline answer data matrix 902 has been discussed previously in relation to answer matrix 204.

The influence of remediation data matrix 904, in some embodiments, contains a quantity of n remediated answer scores, $RA_i$, where n is equal to the number of answers in the baseline answer data matrix 902 (which, in turn, may be equal to the number of questions posed to the user via the question set 104 of FIG. 1 and therefore the number of answer scores in the information 102 as arranged in an answer data matrix). Each remediated answer score $RA_i$ may indicate whether the ith baseline answer score within the baseline answer score data matrix 902 would: (i) change as a result of implementing the remedy with which the matrix 904 is associated; or (ii) not change at all as a result of implementing the aforementioned remedy. If the associated remedy would not change the ith baseline answer score, then $RA_i$ is equal to 0. Otherwise, $RA_i$ is equal to the answer score that the ith entry in the baseline answer data matrix 902 would have been had the associated remedy been implemented.

A quantity of n comparison modules 906 perform a piecewise comparison of baseline answer score $BA_i$ of baseline answer score matrix 902 with corresponding remediated answer score $RA_i$ of remediated answer score matrix 904 and the larger of the two scores is entered into a hypothetical answer score matrix 908 (e.g., such as the hypothetical answer score matrix 800 of FIG. 8A) as the ith entry therein. If the two scores are equal, then the baseline answer score $BA_i$ of the baseline answer score matrix 902 is entered into the hypothetical answer score matrix 908 as the ith entry. The result of this piecewise comparison and replacement scheme is that, for a given remedy, its associated remediated answer matrix data 904 is examined to see whether any of the answer scores in the baseline answer data matrix 902 would be improved, and if so, then the score is improved and entered in the hypothetical answer data matrix 908.

In some implementations, the hypothetical answer data associated with each of the remedies are analyzed to generate a corresponding hypothetical composite vulnerability score (712). The hypothetical composite vulnerability score 908 (1002) is a vulnerability score that would have been assigned to the system in question had its baseline answer data contained the answer scores that resulted from implementation of the remedy associated with the hypothetical vulnerability score. The hypothetical composite vulnerability score, for example, may be produced by the model 105 of FIG. 1 (e.g., as updated vulnerability data 112 using the hypothetical baseline data 126). For example, each of the hypothetical answer data matrices 908 of FIG. 9 associated with each of the remedies (e.g., such as remedies 116 of FIG. 1) may be processed by the scheme 900 to produce the hypothetical composite vulnerability score 908 (e.g., such as a hypothetical composite vulnerability score 1002 of FIG. 10) associated with each remedy.

Figure 10:
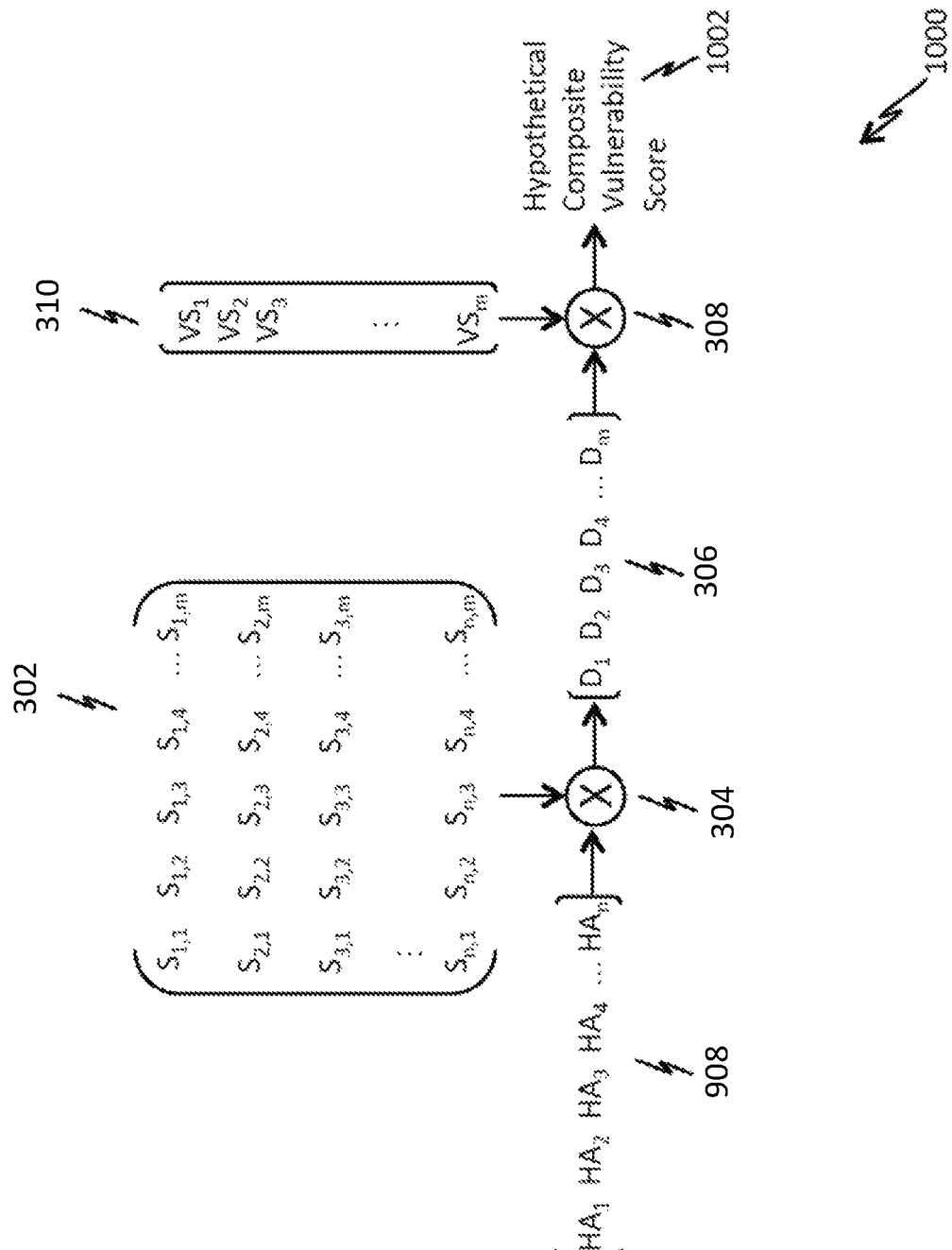
FIG. 10 depicts an embodiment of a scheme for generation of a hypothetical composite vulnerability score.

FIG. 10 depicts an example scheme 1000 for generating a hypothetical vulnerability score 1002. As can be seen from FIG. 10, this scheme 1000 is identical to the scheme of FIG. 3, except that it receives the hypothetical answer score matrix 908 as an input, as opposed to a baseline answer data matrix. As such, the discussion of FIG. 3 describes the functionality of scheme 1000.

After generating the hypothetical composite vulnerability score(s), in some implementations, the remedy set is re-prioritized to promote presentation of those remedies with the greatest hypothetical composite vulnerability score (714). For example, if presented as a list, the remedies with greatest hypothetical composite vulnerability score may be presented at the top of the list with each subsequent entry is in descending priority order. In other embodiments, the remedy set may be re-organized to enable presentation of the remedies corresponding to each risk identified in relation to the enterprise. Further, in some embodiments, remedies may be arranged in priority order based upon greatest hypothetical composite vulnerability score for each risk of the set of risks.

In some implementations, information regarding the re-prioritized remedy set is prepared for presentation to a user at a graphical user interface (716). For example, the remedies 116 of FIG. 1 may be presented to the user via the user interface 120 so that the first remedy 116 the user sees is the one that, if implemented, would cause the composite vulnerability score of the system in question to rise the most. Thus, the user is able to prioritize the deployment of institutional effort, time, and investment in terms of impact. In another example, the information may be presented in an arrangement according to risk mitigated so that the user is able to consider potential remedies associated with each identified risk. According to some embodiments, each remedy is presented as a title of the remedy, a description of the remedy, and information regarding pursuing application of the remedy. For example, the information regarding the remedy may include an articulation of the commercial terms pertaining to purchase of the remedy (e.g., price or subscription fee). An example screen for presenting the remedy information is presented herein, in FIG. 18.

Figure 11:
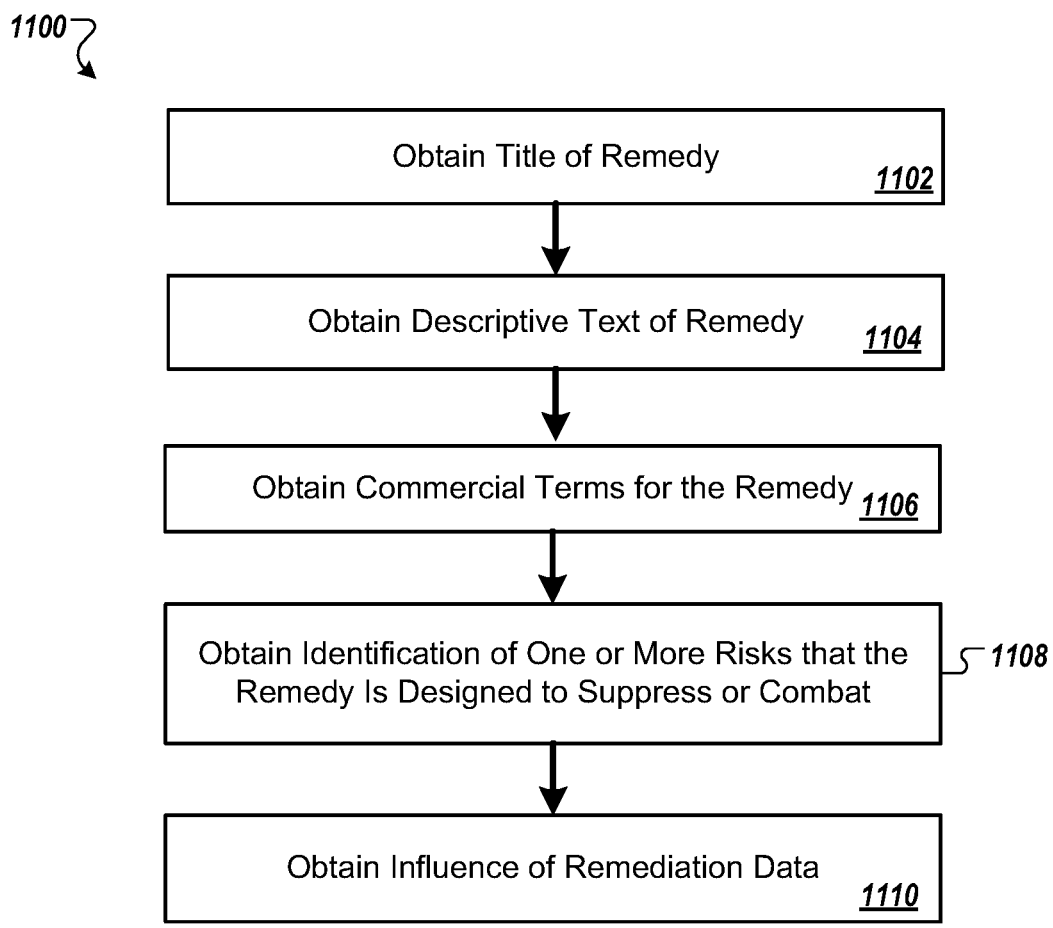
FIG. 11 depicts a flow chart of an example method for onboarding a new remedy for recommendation or sale by the various embodiments of the system of FIG. 1.

Given the data demands for ordering the presentation of the various relevant remedies and the informational demands related to presenting a remedy to the user via the user interface, FIG. 11 depicts a flow chart of an embodiment of a method 1100 for onboarding a new remedy into a system such as the system supporting the operational flow 100 of FIG. 1 in order that the system might track the remedy (e.g., remedies 116 of FIG. 1). The method 1100, in some implementations, is performed by a system performing the operations of the operational flow 100 of FIG. 1. A portion of the operations of the method 1100, for example, may be carried out by a computer-implemented "wizard" to allow for simple consolidated entry of information pertaining to a remedy, and resulting in the information being introduced into the proper databases, associated tables and fields of the databases, and/or other data stores, so that the operational flow 100 can properly function and track the newly introduced remedy 116.

In some implementations, the method 1100 for onboarding a new remedy begins with prompting a user (e.g., an administrator or operator of the operational flow 100) for a title of the new remedy (e.g., "Security Officer Service") (1102). The new remedy, for example, may be added to the set of remedies 116 of FIG. 1. The user may respond to the prompt by entering the title of the new remedy, or in the context of a third-party service that is displayed via user interface 134 of FIG. 1, the operator may provide a reference to an endpoint (e.g., URL), format (e.g., REST, SOAP, etc.), and access other information (e.g., credentials) to permit acquisition of the title of the new remedy from systems operated by or on behalf of the third-party provider. The remedy may be applicable to one or more of the risks 114 analyzed by the operational flow 100 of FIG. 1.

In some implementations, descriptive text of the new remedy is obtained (1104). For example, the administrator or operator may be prompted at the graphical user interface 120 of FIG. 1 for descriptive text to associate with the new remedy 116. The descriptive text may involve entry of two or more separate text strings, such as an abbreviated text string that articulates the remedy 116 in a sentence and consumes little screen space on the user interface 120, and a longer string that articulates the remedy 116 in a manner intended to educate the user about more detailed information pertaining to the remedy 116, in case the user was unaware of the nature of the new remedy 116. The descriptive text, for example, may be presented to the user via the graphical user interface 120 when the remedies 116 are proposed to the user. In the context of a third-party service that is displayed via user interface 134 of FIG. 1, the operator may provide a reference to an endpoint (e.g., URL), format (e.g., REST, SOAP, etc.), and access other information (e.g., credentials) to permit acquisition of the descriptive text from systems operated by or on behalf of the third-party provider.

In some implementations, commercial terms on which the remedy may be purchased or subscribed to are obtained (1106). For example, the operator or administrator may submit, through the graphical user interface 120, a flat price, a subscription fee and time period associated with such fee (monthly, annually, etc.), or a price per other metric (price per security officer per month, etc.). In the context of a third-party service that is displayed via user interface 134 of FIG. 1, the operator may provide a reference to an endpoint (e.g., URL), format (e.g., REST, SOAP, etc.), and access other information (e.g., credentials) to permit acquisition of the commercial terms from systems operated by or on behalf of the third-party provider.

In some implementations, identification of one or more risks that the remedy is designed to suppress or combat is obtained (1108). For example, the administrator or operator may be prompted through the graphical user interface 120 to identify the particular risk or risks that the remedy will suppress. For example, the user may select from names and/or brief descriptors of the risks 114 in providing the identification of the risk(s) so that the information may be used to associate the new remedy 116 with one or more risks 114 in presentation to a user. Further, the information may be used in generating a set of remedies based upon identified risks, for example as discussed in relation to the remedy set 116 of FIG. 1. Additionally, the information may be used for organization of recommended remedies by risk mitigated in presenting remedies to the user, (as opposed to the organization by descending hypothetical composite vulnerability score 1002, as described in relation to operation 714 of FIG. 7).

In some implementations, influence of remediation data is obtained (1110). For example, the administrator or operator may be prompted at the graphical user interface 120 for data to add to the influence of remediation data matrix (e.g., matrix 802 of FIG. 8B), so that a hypothetical answer data matrix (e.g., matrix 800 of FIG. 8A) can be generated for and associated with the new remedy 116, as described in relation to the scheme 900 of FIG. 9. In turn, this would allow for calculation of a hypothetical composite vulnerability score 1002 (as described in relation to FIG. 10) and association with the remedy 116 upon recommendation. As mentioned above, according to some embodiments, the user interface 120 presents the recommended remedies 116 in descending order of hypothetical composite vulnerability score 1002 (e.g., vulnerability data 112), so that a user may rapidly determine which remedies 116 would likely have the biggest impact in addressing system vulnerabilities.

Although illustrated in a particular series of events, in other implementations, the steps of the process 1100 may be performed in a different order. For example, obtaining descriptive text of a remedy (1104) may be performed before, after, or simultaneously with obtaining commercial terms for the remedy (1106). Additionally, in other embodiments, the process may include more or fewer steps while remaining within the scope and spirit of the process 700.

As mentioned previously, the operational flow 100, in some implementations, also includes the capability of informing its user of insurance policies, such as cyber insurance policies, that are projected to be available to the enterprise in question, given the answer data set 102. This is significant because such projections assist the user in prioritizing the enterprise's time, efforts and investments in order to secure desired insurance coverage, and to effectively transfer risks arising out of vulnerabilities it cannot completely suppress or satisfactorily mitigate. Such projections permit the user to understand his enterprise's risk posture from the vantage of available coverages without requiring the user to leave the website presented via the graphical user interface 120 (in the case of embodiments where the capabilities of operational flow 100 are made available as a website) to navigate to another website (e.g., via the user interface 134 of FIG. 1) or a succession of websites operated by various insurance carriers (e.g., third-party services 132), in order to piece together an understanding of where the enterprise in question stands in the insurance marketplace.

According to some embodiments, the operator of the system upon which the operational flow 100 executes is an insurance broker or an insurance exchange platform involving multiple insurance brokers, and the models 108 are proprietary models used by the various insurance companies with whom the operator regularly brokers policies. Stated another way, the various insurance companies may simply provide the operator of the system 100 with their decisioning models, and the operational flow 100 may use those models as the modeling scheme 108 to project the response of a given insurer as to whether that insurer will offer a given coverage or limit or enhancement to a particular enterprise based upon the answer data set 102.

Figure 12:
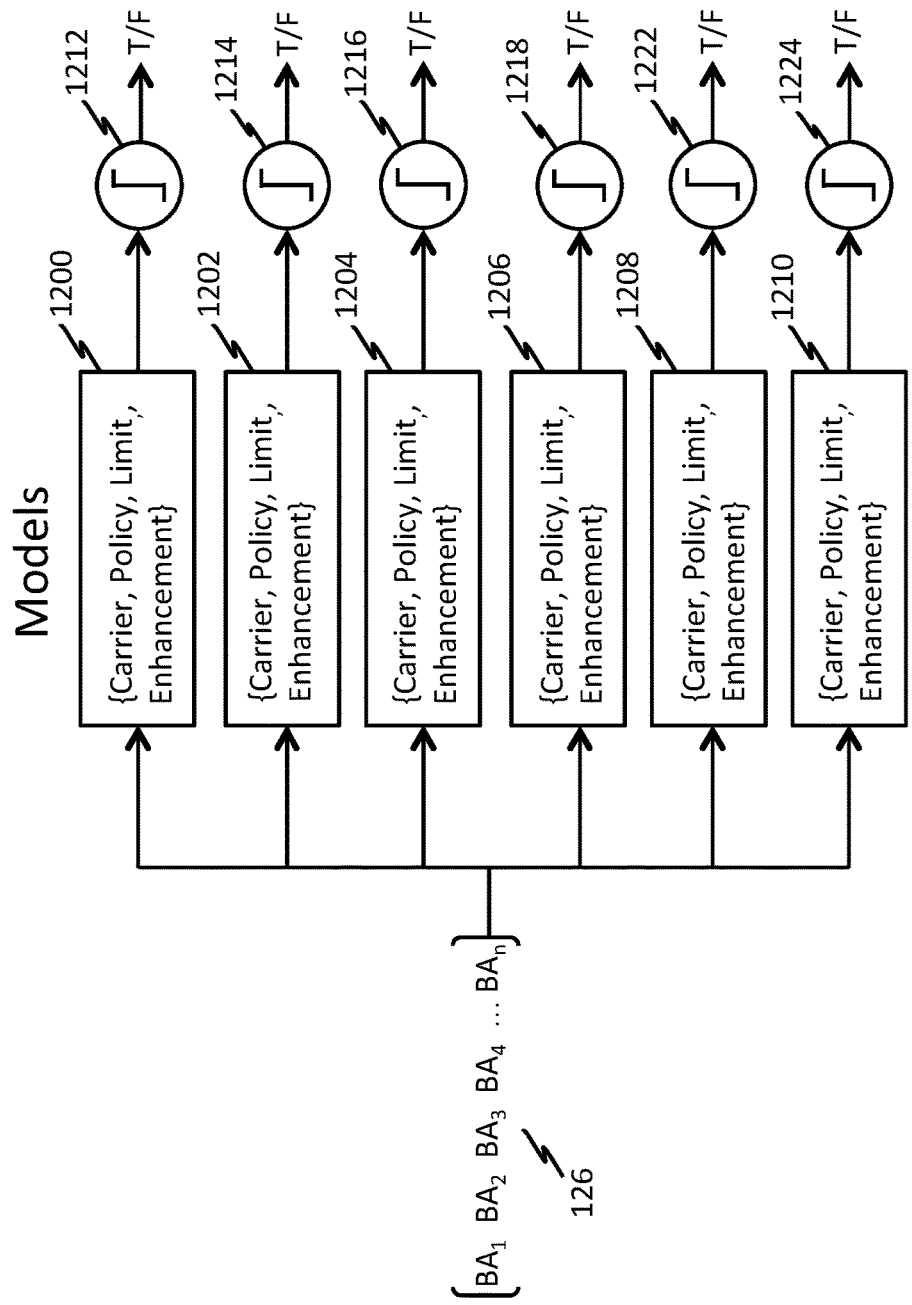
FIG. 12 depicts an embodiment of a scheme for modeling the response of an insurance marketplace to an application for a combination of policy, limit and enhancement.

According to some embodiments, the modeling scheme 108 is based upon observation of past insurance market responses, as opposed to being based upon particular insurance companies sharing their proprietary decisioning models with the operator of the system upon which the operational flow 100 operates. Turning to FIG. 12, one may consider the decision of whether to offer a given combination of coverage, limit, and enhancement as binary—either a given carrier will extend the given party a particular combination of coverage, limit and enhancement, or it will not. Thus, the operational flow 100 may contain a separate model, such as models 1200 through 1210 for each combination of coverage, limit, and enhancement, for each carrier, to estimate whether the carrier will extend a policy including such a combination to a particular enterprise, given the baseline answer data 126 associated with the enterprise (e.g., the current status of the system(s) of the enterprise in relation to cyber security vulnerabilities).

The output of each model 1200-1210, in some embodiments, is an estimated probability that the corresponding combination of carrier, coverage, limit and enhancement will be positive (e.g., likely to be extended to the enterprise). For example, if a model 1200 corresponds to a first insurance carrier offering a first policy with a first coverage limit as augmented by a first enhancement, then if it were to produce an output of 0.78, this would represent that the model 1200 projects that there is a 78% probability that the aforementioned first carrier will offer the enterprise in question the aforementioned first insurance policy with the first coverage limit and further offer to augment the policy with the first enhancement, given the baseline answer data 126 pertaining to the enterprise. For example, the output of each model 1200-1210 is provided to a comparator module 1212-1222, and if the output exceeds a threshold, then the operational flow 100 will project that a particular combination of carrier, coverage, limit and enhancement will be offered to the enterprise in question, and the combination will be presented on the user interface 120. For example, the threshold may be set at 0.5, so that the operational flow 100 will project that a policy will be offered in the event that one of the corresponding models 1200-1210 predicts that it is more likely than not, or a threshold may be set at 0.8, so that the operational flow 100 produces "false" projections a smaller percentage of the time, and so on.

In other implementations, the output of the models 1200-1210 includes one of a set of values indicating a relative likelihood for presentation to the user. For example, the set of values may include five values corresponding to the following relative likelihoods: very likely, reasonably likely, somewhat likely, or not likely. The user interface, for example, may present the relative likelihood to the user in text format. In another example, the user interface may present the relative likelihood in graphic format, such as a color coding (e.g., green for likely, yellow for uncertain, red for unlikely).

Figure 13:
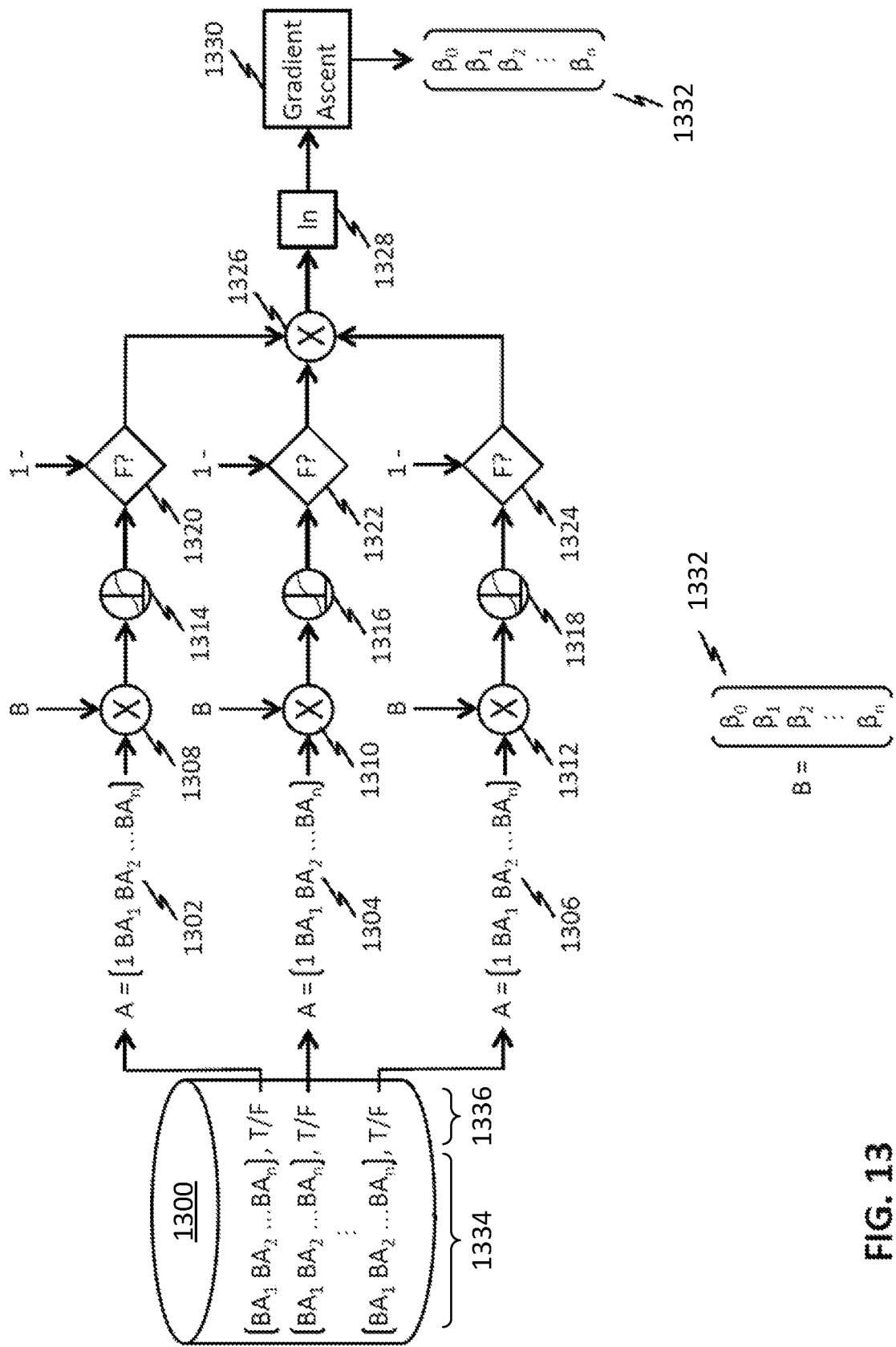
FIG. 13 depicts an embodiment of a scheme for modeling the outcome of a given application for a combination of a given policy, limit and enhancement from a given carrier.

FIG. 13 depicts an embodiment of a scheme for determining seed values for outcome analysis using the modeling schemes 1200-1210 of FIG. 12. A data store 1300 contains historical baseline answer data 1334 that was used in connection with previous applications for a particular combination of carrier, coverage, limit and enhancement, and also contains a respective outcome 1336 of each decision (e.g., whether or not the particular carrier elected to offer the particular policy with the given limit with an offered enhancement). Stated another way, data store 1300 contains information that reveals that a previous applicant (enterprise) applied for a particular combination of coverage, limit and enhancement from a given carrier, the answer data 1334 used by that applicant in connection with evaluating risks and vulnerabilities using the operational flow 100, and the decision 1336 generated by the carrier (granted or denied) regarding the insurance policy application. The data store 1300 may contain this information for multiple enterprises and their various applications for coverage.

One premise of the modeling scheme of FIG. 13 is that a probability function, p(x), may be constructed whereby (i) p(x): tends toward 0 as x approaches negative infinity, (ii) tends toward 1 as x approaches infinity; (iii) is equal to ½ when x=0; (iv) is continuous, smooth and differentiable everywhere; and (v) exhibits symmetry in its approaches to output values 1 and 0. According to some embodiments, p(x) is a sigmoid function, as follows:

$$p(x) = \frac{1}{1+e^{-x}}.$$

Thus, for any real number input, x, p(x) will produce a result ranging from 0 to 1. The output represents the probability that a given carrier will offer a given policy at a given limit while offering to augment the coverage with a given enhancement.

Another premise of the modeling scheme of FIG. 13 is that the independent variable, x, has linear relationship with the explanatory variables, e.g., the baseline answer data 1334 (e.g., answers to questions and/or vulnerability scores): $x=\beta_0+\beta_1 BA_1+\beta_2 BA_2+ \ldots \beta_n BA_n$.

Therefore, the modeling scheme of FIG. 13 may be parameterized by $\beta_0, \beta_1, \beta_2 \ldots \beta_n$, which are a set of weights 1332 applied to each of the baseline answer scores $BA_i$ 1334. The scheme functions, in some embodiments, to select values for $\beta_0, \beta_1, \beta_2 \ldots \beta_n$, to maximize the probability that when provided with the input values from the data store 1300, enables the model to produce an accurate prediction of the response of the insurance carrier. As a first step in accomplishing this, in some implementations, the baseline answer data set 1334 used in connection with each past observed application for a given combination of carrier, coverage, limit and enhancement is drawn from the data store 1300 and assembled into a matrix with a leading "1" as shown in matrices 1302-1306. The data store, for example, may be included in a system executing the operational flow 100 of FIG. 1.

Next, in some implementations, each matrix 1302-1306 is provided as an input to a corresponding multiplier 1308-1312 along with a matrix containing the unknown parameters $\beta_0, \beta_1, \beta_2 \ldots \beta_n$, to produce an output that is equal to: $\beta_0+\beta_1 BA_1+\beta_2 BA_2+ \ldots \beta_n BA_n$, which is, in turn, equal to the independent variable x. Therefore, the output of multiplier 1308 is $\beta_0+\beta_1 BA_1+\beta_2 BA_2+ \ldots \beta_n BA_n$, where $BA_1, BA_2, \ldots BA_n$ take on the baseline answer scores associated with the first past observed application, and the output of multiplier 1310 is $\beta_0+\beta_1 BA_1+\beta_2 BA_2+ \ldots \beta_n BA_n$, where $BA_1, BA_2, \ldots BA_n$ take on the baseline answer scores associated with the second past observed application, and so on.

The output of each multiplier 1308-1312, in some implementations, is provided as an input to a corresponding probability function 1314-1318, to produce an expression describing the probability that the particular combination of carrier, coverage, limit and enhancement was offered by the carrier (e.g., the probability that the application was approved for coverage):

$$\frac{1}{1+e^{-(\beta_0+\beta_1 BA_1+\beta_2 BA_2+\ldots \beta_n BA_n)}}.$$

In some implementations, each expression is provided to a corresponding conditional operator 1320-1324, where, in the event that the observed past application was denied, the expression is modified so to as to be subtracted from 1, such that the modified expression is:

$$1 - \frac{1}{1+e^{-(\beta_0+\beta_1 BA_1+\beta_2 BA_2+\ldots \beta_n BA_n)}}.$$

The modified expression articulates the probability that the modeling scheme would project that the past observed application would be denied for coverage. If on the other hand, the observed past application was not denied, the expression is not modified.

The outputs of each conditional operator 1320-1324, in some implementations, are expressions that articulate the probability, in terms of unknowns $\beta_0, \beta_1, \beta_2 \ldots \beta_n$, 1332 that the scheme assigns to allowance of an application that was observed in the past to be allowed, and to denial of an application that was observed to be denied. Each of these expressions, in some embodiments, are multiplied together by a multiplier 1326 to create an expression representing the probability in terms of unknowns $\beta_0, \beta_1, \beta_2 \ldots \beta_n$ 1332 that the scheme correctly projects the outcomes of all of the past observed applications.

The output of the multiplier 1326, in some implementations, is provided to a log operator 1328 that takes the natural logarithm of the expression resulting from the multiplier 1326, to allow for easier differentiation of the expression. Although the log operator 1328 of the scheme of FIG. 13 uses Euler's constant as its base, according to other embodiments other bases are used (base 10, for example).

In some implementations, the output of the log operator 1328 is then provided to a gradient ascent system 1330 to determine the set of values to assign to $\beta_0, \beta_1, \beta_2 \ldots \beta_n$ in order to maximize the probability that the scheme would correctly project the outcomes of all of the past observed applications. These values 1332 are then used to parameterize each of the models used to estimate the probability of outcome of a new application (e.g., for a given combination of carrier, coverage, limit and enhancement), such as the models 1200-1210 of FIG. 12. Thus, for each model 1200-1210 (corresponding to each combination of carrier, coverage, limit and enhancement), the scheme of FIG. 13 determines a set of values for $\beta_0, \beta_1, \beta_2 \ldots \beta_n$ 1332 in order to parameterize each model 1200-1210.

Figure 14:
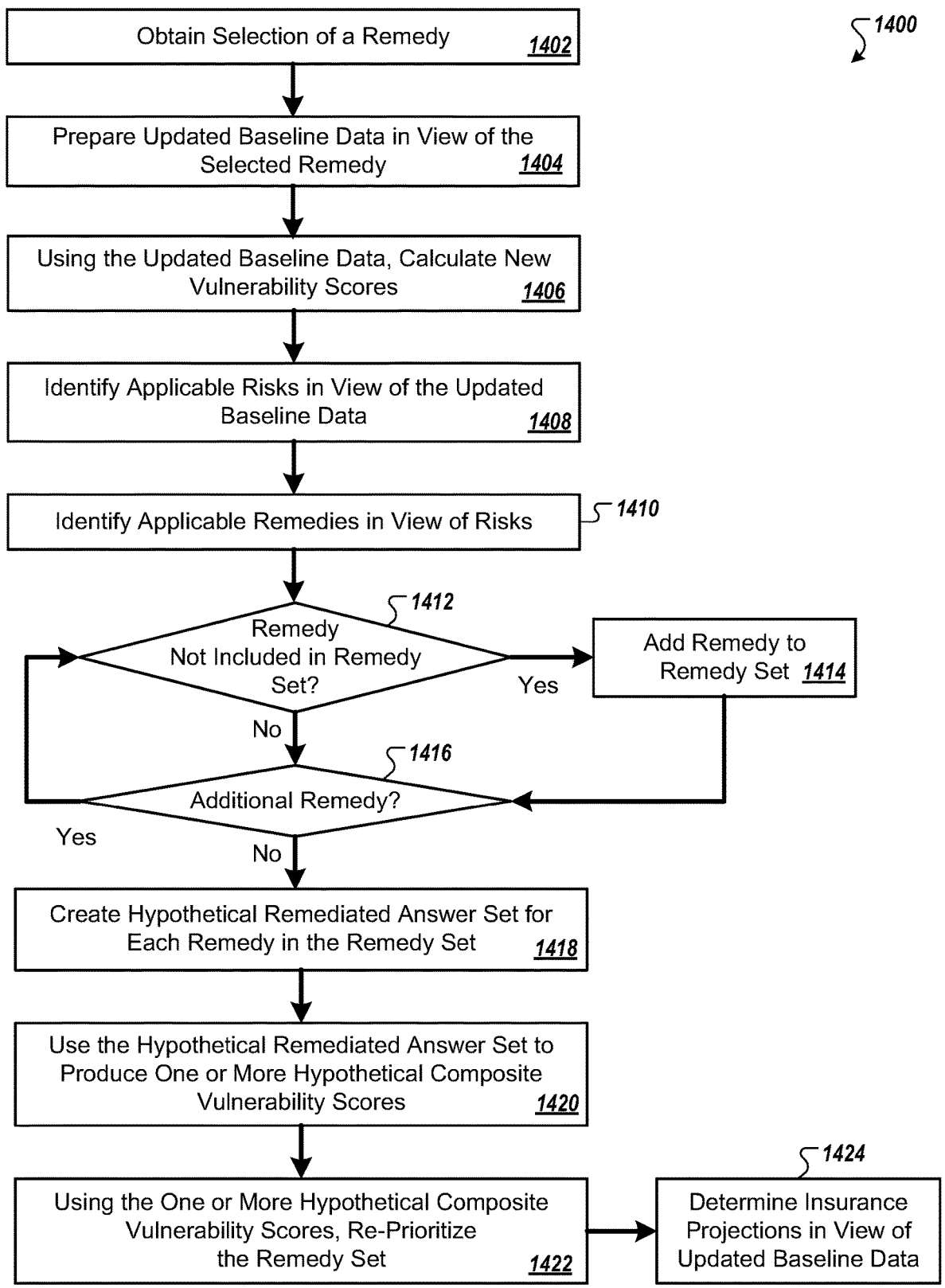
FIG. 14 depicts a flow chart of an example method for generating insurance offering projections based on selections of one or more recommended remedies.

Returning to a discussion of FIG. 1 as background for discussion of FIG. 14, which presents an example method 1400 for determining insurance projections in view of selection of a remedy for purchase. The method 1400 may be performed as part of the operational flow 100. For example, aspects of the method 1400 may be performed by the model 108. A user may interact in supplying information to the method 1400 via the graphical user interface 120 of FIG. 1.

In some implementations, the method 1400 begins with obtaining selection of a remedy to a cyber security risk (1402). The user interface 120 of FIG. 1, for example, may present the user with recommended remedies 116. The user may select one or more of the remedies 116 for purchase or application, further to the example, whereupon it is added to the selections set 122.

In some implementations, updated baseline data associated with the enterprise represented by the user is prepared in view of the selected remedy. For example, an updated baseline answer data set 126 may be created by the model 124 based upon selection of one or more of the remedies 116. To accomplish this, in some embodiments, the scheme of FIG. 9 is executed on the existing (e.g., original or previously updated) baseline answer data set for the enterprise. The existing baseline answer data set, for example, is identical to the answer data set 102 of FIG. 1 in the event that no remedy 116 has been previously selected for purchase or application. The influence of remediation data set 904 corresponding to the selected remedy is provided to the scheme, and the output is the hypothetical answer data set 908, as described previously with respect to FIG. 9. The updated baseline answer data set 126, in some implementations, is set equal to the hypothetical answer data set 908. The updated baseline answer data set 126 represents the answer data set 102 that would be in place had the selected remedy 116 been implemented.

Subsequently, in some implementations, the updated baseline answer data set is used to calculate new, updated vulnerability scores (1406). Model 105 of FIG. 1, for example, may calculate the new vulnerability scores 112. For example, the new baseline answer data set 126 may be provided to the scheme of FIG. 3 (discussed above), in order to produce new vulnerability scores 112 in the manner described previously. The new vulnerability scores, in some embodiments, are then presented to the user. For example, new vulnerability scores 112 may be presented via the user interface 120 of FIG. 1.

In some implementations, the updated baseline answer data set is used to identify a revised set of applicable risks (1408). The model 106 of FIG. 1 may identify a revised set of applicable risks 114. For example, by providing the new baseline answer data set 126 to the scheme of FIG. 4 (discussed above), a revised set of applicable risks 114 may be produced in the manner described previously. The revised set of applicable risks, in some embodiments, is then presented to the user. For example, the revised set of applicable risks 114 may be presented to the user via the user interface 120 of FIG. 1.

In some implementations, each remedy that is associated with each relevant risk is identified (1410). The remedies, for example, may be the remedies 116 described in relation to FIG. 1.

In some implementation, if a particular remedy is determined to not be included in the remedy set (1412), the remedy is added to the remedy set (1414). This adding operation 1408 may be performed so that the remedy list does not include duplicate remedy entries. Thus, at the conclusion where no additional identified remedies exist (1416), the remedy list contains a single reference to each remedy that was related to any risk that was identified as being relevant to the enterprise in question.

In some implementations, a hypothetical answer set is created for each remedy in the remedy set (1418). For example, the hypothetical answer set may be created by the model 124 of FIG. 1 as the updated baseline answer set 126. Each hypothetical answer set is constructed to contain the answer scores that the user would have provided had the remedy with which it is associated been implemented. This operation, for example, may be performed via the scheme described above with respect to FIG. 9.

In some implementations, the hypothetical answer set is used to produce one or more hypothetical composite vulnerability scores (1420). The model 105 of FIG. 1 may be used to generate updated vulnerability scores 112 using the updated baseline data 126. For example, each of the hypothetical answer data matrices 908 of FIG. 9 associated with each of the remedies 116 may be processed to produce a respective hypothetical composite vulnerability score 1002 (FIG. 10) associated with each remedy 116. A hypothetical composite vulnerability score is a vulnerability score that would have been assigned to the system in question had its baseline answer data set contained the answer scores that resulted from implementation of the remedy associated with the hypothetical vulnerability score.

In other implementations, rather than create a hypothetical answer set and generating vulnerability scores based on the hypothetical answer set, one or more prior composite vulnerability scores may be adjusted by applying influence of remediation data to the original composite vulnerability score corresponding to the respective remedy. Influence of remediation data, for example, is described in relation to operation 1110 of FIG. 11. Consider, for example, a scenario in which a single remedy was selected by the user. Additionally, that implementation of the selected remedy can result in a single changed answer. According to some implementations, the effect of the new answer (e.g., that would arise out of implementation of the selected remedy) is calculated. In other words, the effect of the new answer to raise or lower a vulnerability score assigned to a domain is calculated. In an illustrative example, it may be determined that the new answer would raise the vulnerability score of a particular domain by 0.2, or the composite vulnerability score by 0.1, and the new scores could be presented by virtue of using the prior vulnerability scores and adjusting them pursuant the calculated effects. By way of further explanation and example, suppose implementation of the selected remedy would raise the score of the jth answer from an old value to a new value. Then, with reference to FIG. 3, a data set can be constructed wherein the jth element is equal to the difference between the new answer value and the old answer value, e.g., $BA_j=(BA_{j,new}-BA_{j,old})$, while every other element was set equal to zero. Further, this newly constructed data set can be applied as an input to matrix multiplier 304 instead of baseline answer matrix 300. The resulting matrix 306, in one example, can indicate the influence of the remediation on the vulnerability scores assigned to a given domain: if $D_i$=0.2. For example, this score may indicate that the vulnerability score assigned to the ith domain should be increased by 0.2.

In some implementations, the remedy set applicable to the system(s) of the present enterprise is re-prioritized based on the updated vulnerability score(s) (1422). For example, the relevant remedies may be organized in descending order based upon their associated hypothetical vulnerability scores for display to the user, such that the user swiftly identifies the remedy projected to have the greatest impact on the enterprise's identified risks. In another example, the remedy set may be re-prioritized to display remedies grouped by associated risk.

In some implementations, the updated baseline answer data set used to revise the projection of available insurance coverages (1424). For example, the model 108 may generate revised insurance offerings 118 based on the updated baseline answer data 126. The model 108 may apply one or more of the models of FIG. 12 for generating the revised projection of available insurance coverages. The revised insurance offerings 118, in turn, may be presented to the user in the user interface 120 of FIG. 1.

Although illustrated in a particular series of events, in other implementations, the steps of the process 1400 may be performed in a different order. For example, each remedy can be processed sequentially or simultaneously such that preparing updated baseline data for one remedy (1404) may be performed before, after, or simultaneously with identifying applicable risks in view of the updated baseline data for another remedy (1408). Additionally, in other embodiments, the process may include more or fewer steps while remaining within the scope and spirit of the process 1400.

Figure 15:
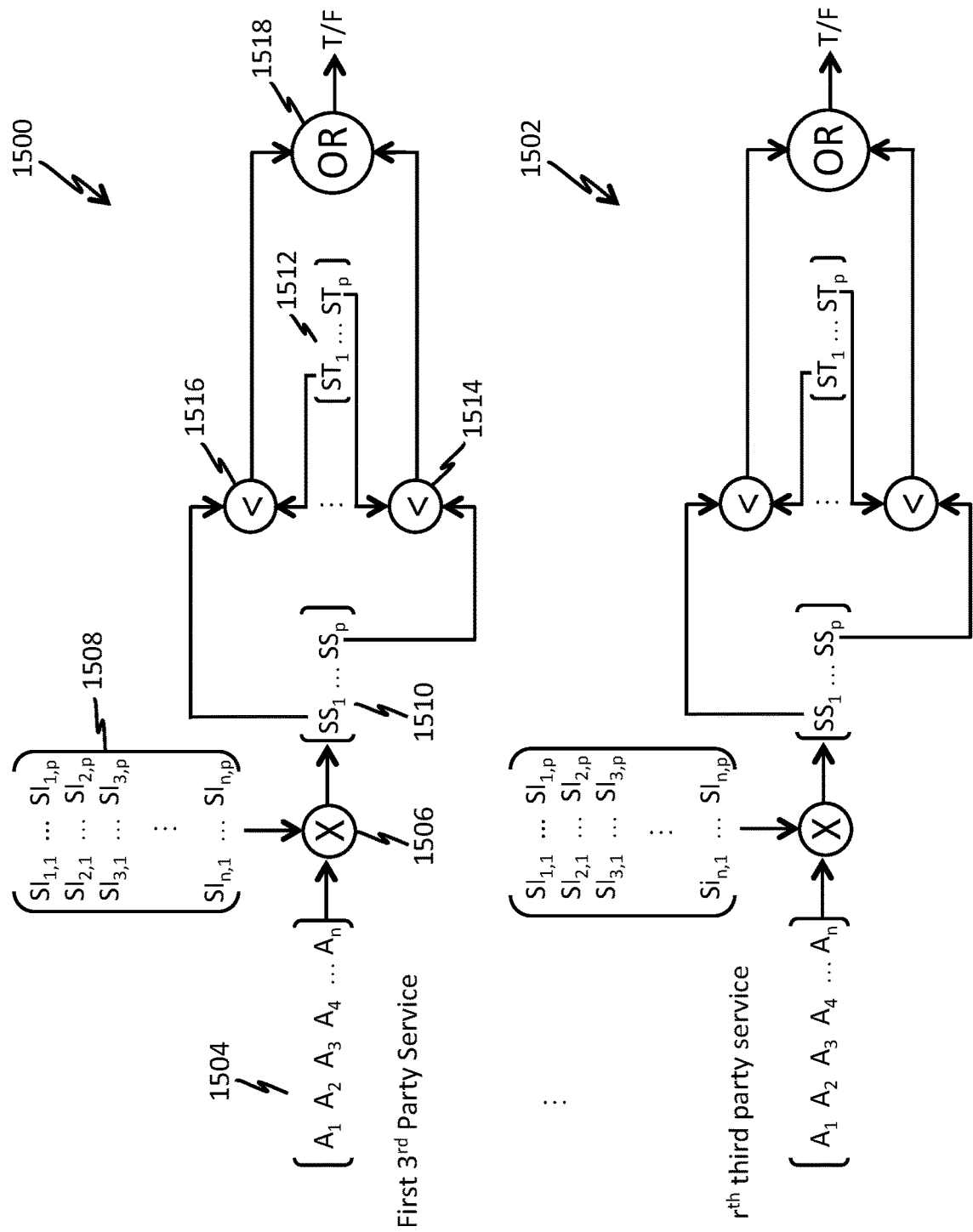
FIG. 15 depicts a scheme for determining which of a set of third-party services are suited to the needs of the system in question.

FIG. 15 depicts an example scheme for recommending third-party services that provide benefits that are useful to the enterprise in question. The scheme of FIG. 15 is an example of a modeling scheme 110 used to supply the user interface 134 of FIG. 1 with descriptions of applicable third-party services 132. The scheme can include multiple decision-making modules, such as decision-making modules 1500 and 1502—one for each third-party service 114 that is offered by the operational flow 100. Any given decision-making module of the scheme of FIG. 15 may or may not be particularly useful or relevant to the enterprise in question and therefore the output of certain decision-making modules may or may not need to be presented to the user via the user interface 134. In the context of an embodiment of the operational flow 100 that offers a quantity of p third-party services 132, decision-making module 1500 relates to the first third-party service 132 offered by the operational flow 100 and decision-making module 1502 relates to the pth third-party service 132 offered by the operational flow 100, with a quantity of p−2 undepicted decision-making modules interposed between modules 1500 and 1502. The output of each module 1500 and 1502, in some embodiments, is a true/false indicator, which reveals whether the third-party service associated with the module 1500 and 1502 is relevant to the enterprise in question. Thus, if the output of the ith module 1500 and 1502 is "true" then the ith third-party service 132 offered by the enterprise is relevant, and if it is "false" then the ith third-party service is not relevant.

Each of the modules 1500 and 1502, in some implementations, is identical in structure (although the data provided to each such module varies based upon the particular third-party service being evaluated for relevance). Therefore, the discussion will pertain to the first decision-making module 1500, with the understanding that it applies equally to all of the other such modules 1500 and 1502.

In some implementations, the operation of the decision-making module 1500 begins with receiving an answer data set 1504 (such as the answer data set 200 shown in FIG. 2A). The answer data set, for example, may be the answer data set 102 or updated baseline answer data set 126 of FIG. 1. The answer data set may include raw answers and/or scores calculated based upon answers. Further, in some embodiments, the answer data set includes a collection of features, characteristics, and remedies applied to systems of an enterprise as discovered automatically or semi-automatically during a cyber security audit of the enterprise.

Figure 16A:
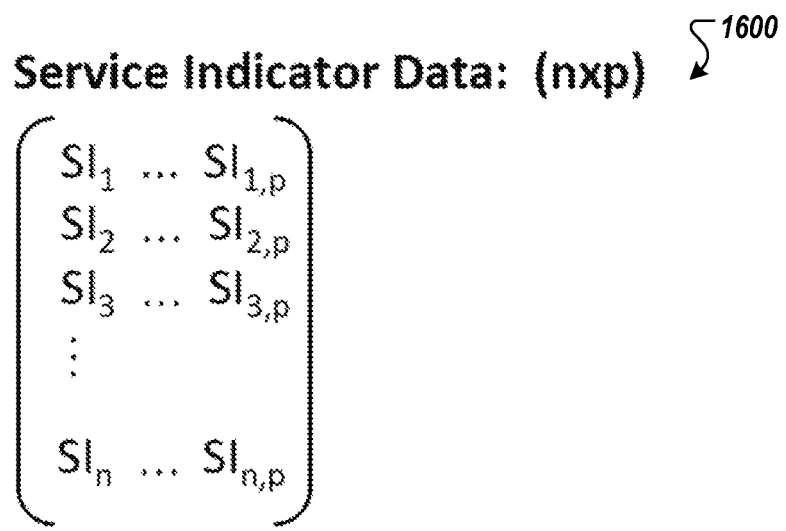
FIG. 16A depicts an embodiment of a service indicator data set.

The answer data set 1504, in some implementations, is supplied to a multiplication module 1506 that performs a matrix multiplication upon the answer data set 1504 and a risk service indicator matrix 1508 (e.g., a risk service indicator matrix 1600 depicted in FIG. 16A). There is one service indicator matrix 1508 for each third-party service 132 offered by the system.

A service indicator matrix 1508, in some embodiments, is structurally similar to a risk indicator matrix (e.g., the risk indicator matrix 500 FIG. 5A). As illustrated, the service indicator matrix 1508 has as many columns as there are independent bases for concluding that the third-party service 132 it is associated with is relevant. The service indicator matrix 1508 may include one row for each answer score in the answer data set matrix 1504. For example, in the context of an answer data set matrix having a quantity of n such scores therein, the service indicator matrix 1508 would have a quantity of n rows.

In some embodiments, a given indicator weight $SI_{i,j}$ may take on a value ranging from the low end of a numerical range to an upper end of the range, its value indicating the extent to which the ith answer score in the answer data set matrix 1504 tends to refute or neutralize the jth basis for concluding that the particular third-party service associated with the service indicator matrix 1508 is relevant. Where a greater value is assigned to a particular indictor weight $SI_{i,j}$, this may indicate that an answer score value assigned to the ith entry in the answer data set matrix 1504 that is nearer the upper end of the numerical range for answer score values tends to more strongly refute or neutralize the jth basis for assuming relevance of associated third-party service 132. On the other hand, where a lesser value is assigned to a particular indictor weight $SI_{i,j}$, this may indicate that an answer score value assigned to the ith entry in the answer data set matrix 1504 that is nearer the upper end of the numerical range for answer score values tends to more weakly refute or have a smaller impact on reducing the jth basis for assuming relevance of associated third-party service 132. For example, if the indicator weight was 0, for example, it would mean that even if ith answer score value was at the very upper end of the numerical range for answer scores, it would have no tendency to refute the basis for relevance.

Figure 16B:
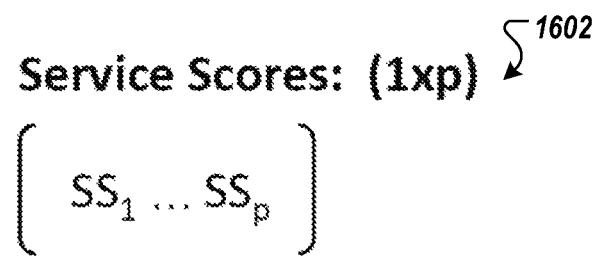
FIG. 16B depicts an embodiment of a service scores data set.

In some implementations, the result of the matrix multiplication by the multiplication module 1506 is the production of a service score matrix 1510 (such as a service score matrix 1602 depicted in FIG. 16B). The service score matrix 1510, as illustrated, has a quantity of p service scores within it, where a given service score $SS_i$ indicates the cumulative tendency of the various answer scores 1504 to refute the ith basis for determining that the third-party service 132 associated with the decision-making module 1500 is relevant. Thus, the greater a given service score $SS_i$, the greater its tendency to refute relevance of the associated third-party service, and vice versa.

Figure 16C:
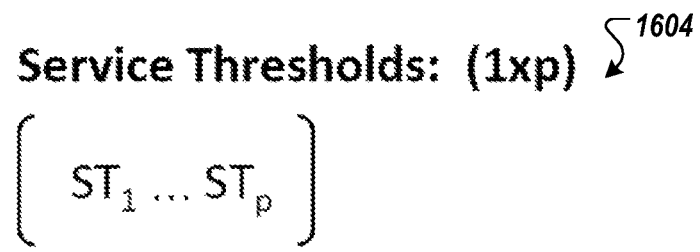
FIG. 16C depicts an embodiment of a service threshold data set.

As can be seen from FIG. 15, each module 1500, 1502 contains a service threshold matrix 1512 (e.g., such as a service threshold matrix 1504 depicted in FIG. 16C). The service threshold matrix 1512, in some embodiments, contains a quantity of p thresholds, $ST_i$, within it. Each service score $SS_i$ 1510 may be delivered to a comparator 1514, 1516 for comparison with a corresponding service threshold $ST_i$ 1512 on a piecewise basis. Thus, the first entry in the service score matrix 1510 can be compared with the first entry in the service threshold matrix 1512, and the second entry in the service score matrix 1510 can be compared with the second entry in the service threshold matrix 1512, and so on. In the event that any of service score $SS_i$ is less than its corresponding service threshold $ST_i$, then the third-party service associated with the module 1500, 1502 is determined to be relevant or useful to the enterprise in question.

In some implementations, the output of each comparator 1514 and 1516 is provided to a union operator 1518 for determination of whether the associated third-party service 132 is relevant. As long as one of the comparators 1514, 1516 outputs a value associated with relevance, for example, the third-party service 132 is designated as relevant. In other implementations, rather than using the union operator 1518, the outputs of the comparators 1514, 1516 are combined to identify a relative degree of relevance of the third-party service to the enterprise. The degree of relevance, for example, may be used in prioritizing the presentation of third-party services to the end user (e.g., enterprise representative).

In some implementations, in the event that a module 1500 and 1502 determines that its associated third-party service 132 is relevant to the system in question, then the third-party service is presented to the user via the user interface 134 of FIG. 1. According to some embodiments, the third-party service can be presented with a title of the service, a description of the service, and an explanation describing how the service was determined to be relevant to the system in question in view of the answer data set 102 (or, in some embodiments, the updated answer data set 126).

Figure 17:
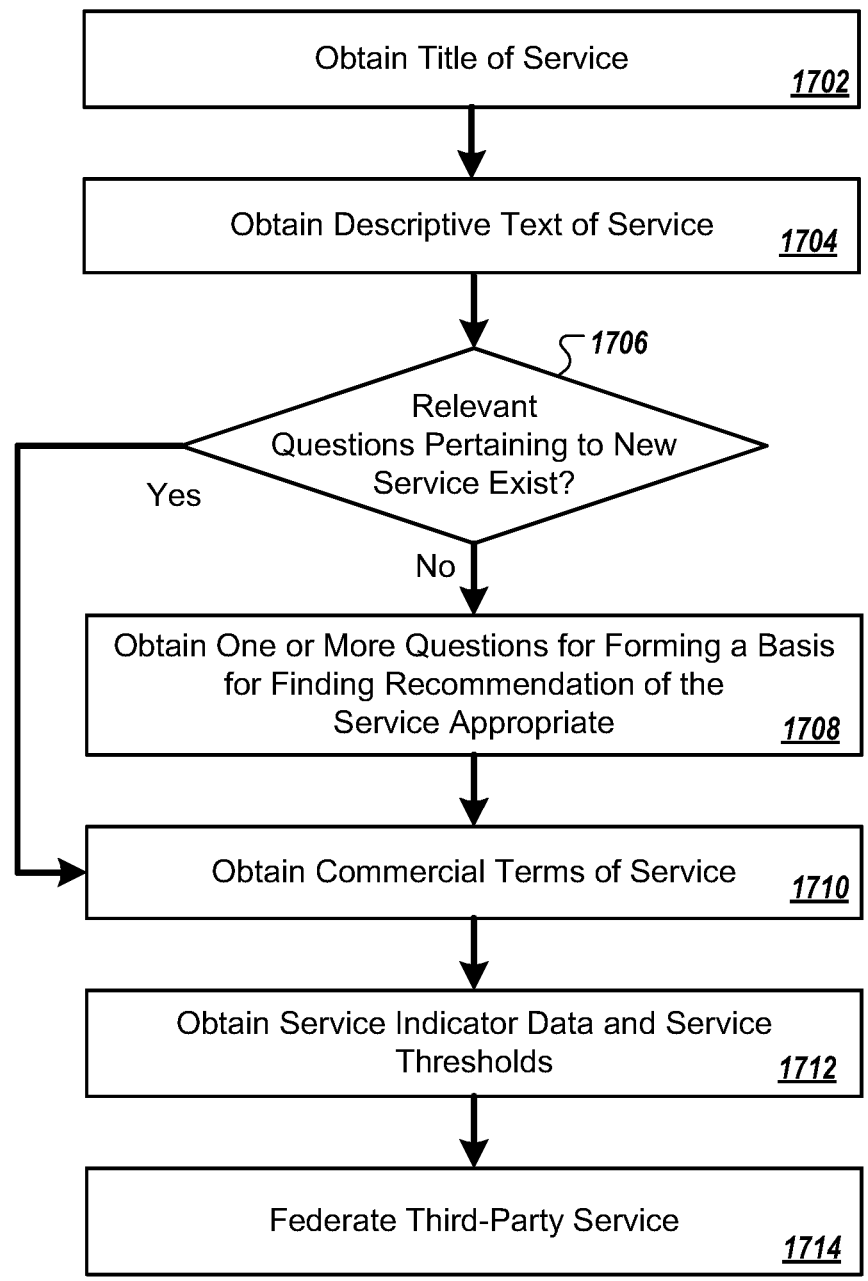
FIG. 17 depicts a flow chart of an example method for onboarding a new third-party service for recommendation or sale by the various embodiments of the system of FIG. 1.

Given the data demands for determining the relevance of a given third-party service to a particular system and the informational demands related to presenting a third-party service to the user via an externally-provided user interface such as the user interface 134 of FIG. 1, FIG. 17 depicts an embodiment of an example method 1700 for onboarding a new third-party service into a system for identifying cyber security risks and proposing solutions for improving vulnerabilities to such risks. The method 1700, for example, may be executed for onboarding a new third-party service 132 into the operational flow 100 in order that the operational flow 100 might determine the usefulness or relevance of the service 132 and present it for purchase by the user. A portion of the operations of the method 1700, for example, may be carried out by a computer-implemented "wizard" to allow for simple consolidated entry of information pertaining to a service, and resulting in the information being introduced into the proper databases, associated tables and fields of the databases, and/or other data stores, so that the operational flow 100 can properly function and track the newly introduced risk 114. Operations of the method 600 may be executed in part using a graphical user interface with a user, such as the graphical user interface 120 of FIG. 1.

In some implementations, the method 1700 third-party begins with obtaining from a user, such as an administrator or operator of the system upon which the operational flow 100 executes, a title of the new service (1702). For example, the user may be prompted for a title of a new third-party service 132 (e.g., "Network Event Logging Subscription") at the graphical user interface 120. The title may be associated with the new service 132 for presentation via the graphical user interface 120 in presenting available services 132 to a representative of an enterprise.

In some implementations, descriptive text of the new service is obtained (1704). For example, the administrator may be prompted at the graphical user interface 120 for descriptive text of the new service 132. The descriptive text may involve entry of two or more separate text strings, such as an abbreviated text string that articulates the service 132 in a sentence and consumes little screen space on the user interface 134, and a longer string that articulates the service 132 in a manner intended to educate the user about the nature of the service 132, in case the user was unaware of the nature of the new service 132. The descriptive text may be associated with the new service 132 such that, during presentation to the user at the graphical user interface 120, the service 132 may be identified and explained to the user through presentation of the descriptive text.

In some embodiments, initial inquiries made of the enterprise, such as via the question set 104, lack appropriate information from which to form the basis for concluding that the new service 132 appears relevant to the enterprise in question. Therefore, in some implementations, if relevant questions are missing from the set of questions (1706), the administrator or operator may be prompted for one or more new questions 104 to add to the question set 104 (as well as, in some embodiments, the corresponding answers for the user to select from amongst) in order to formulate the basis to conclude that the service may be relevant are entered (1708). The questions, for example, may be added to the question set 104 for future assessments of enterprises. In other embodiments, rather or in addition to a question for users, the administrator or operator may be prompted for identification of one or more system elements (e.g., hardware, software, firmware, and/or human resource policies) associated with the new service 132. For example, a new service may be applied to systems including a particular type of network router or gateway connection for enabling communications between the internal enterprise network and external networks such as the Internet. Other examples of new risks that may arise but may not require new questions to be added to the existing question set 104 include situations in which a system under analysis uses a particular encryption scheme or functional element (database server, web server, etc.) that was once thought to be secure but is later learned to contain a vulnerability. In such instances, it may be the case that the existing question set 104 already contains questions that can generate responses indicating that the system under analysis uses the aforementioned encryption scheme or functional element, but the existing values for risk indicators and risk thresholds were not selected to associate the use of those encryption schemes or functional elements with risk. Thus, the values for risk indicators and risk thresholds may have to be altered in order to associate such use with the new third-party service, as discussed below.

In some implementations, commercial terms of service are obtained (1710). For example, the administrator may be prompted at the graphical user interface 120 of FIG. 1 to supply the commercial terms on which the service 132 may be purchased or subscribed to. For example, the graphical user interface 120 may present information entry controls for the insertion of a flat price, a subscription fee and time period associated with such fee (monthly, annually, etc.). In another example, the graphical user interface 120 may present one or more information entry controls for insertion of a price per other metric (e.g., price per security officer per month, etc.). The commercial terms of service, for example, may be presented to the user in the graphical user interface 120 of FIG. 1 when presenting recommendations 116 of third-party services. In one example, upon selecting a particular service of a number of recommended services, detailed information regarding the commercial terms may be presented. In other implementations, rather than entering commercial terms, since prices can fluctuate and adjust through time, the administrator may be prompted to enter a location for obtaining terms of service information (e.g., a network storage region containing the relevant variables or a link to the data). The terms of service information, for example, may be stored in a region accessible to the third-party service provider for updating purposes.

In some implementations, service indicator data (e.g., service indicator matrix 1600 of FIG. 16A) and service thresholds (e.g., the service threshold matrix 1602 of FIG. 16B) pertaining to the new service are obtained (1712). The administrator, for example, may be prompted to enter the information for the service indicator matrix 1600 and the service threshold matrix 1602 at the graphical user interface 120 of FIG. 1. The service indicator data and service threshold data, in some implementations, can be associated with formulating the basis for concluding that the new service is relevant to a given enterprise. Further, in some embodiments, the user may be prompted to provide a reason string associated with each service indicator. The reason string articulates the reason that, in the event that the service is determined to be applicable to the enterprise, the new service should be considered as relevant to the enterprise by a representative of the enterprise. The service may be determined to be applicable, for example, by the scheme of FIG. 15 in determining that the service score 1510 associated with a particular column falls beneath the service threshold 1512 associated with the particular column. In an illustrative example, a reason string may read as follows: "Your enterprise appears to have no capacity to track unusual network activity. A subscription to a network event logging service would alert you to unusual network activity, such as abnormal volumes of outbound data (suggesting data theft)."

In some implementations, the third-party service can be federated into the system for consideration as a recommended service to reduce or suppress one or more vulnerabilities of an enterprise related to cyber security risk(s) (1714). For example, the third-party service may be federated into the operational flow 100 as a new service 132. To federate a platform with a third-party system, the credential management system of the platform, in some implementations, is harmonized with that of the third-party system. For example, according to some embodiments where one particular set of credentials identifies a given user in the context of the platform and a different set of credentials identify the same user on the third-party system, a correspondence between the two sets of credentials is stored. Moreover, a relationship between elements on the user interfaces 120 and 132 of the platform executing the operational flow of FIG. 1 and API's extended by the third-party system are established. When, for example, a user "clicks" on an element in the user interface 120 and 132 that pertains to a third-party service or enters data into a data field that pertains to a third-party service, the corresponding API extended by the third party-system may be called using credentials recognized by the third-party system. The result is that the user is able to consume (e.g., purchase, install, and/or register for) the services offered by the third-party system while operating within the platform, e.g., the user is not required to navigate out of the platform to consume the services of the federated third-party system. In some embodiments, because consumption of the third-party services is originated from within the platform, the data sets maintained by the platform are updated to reflect the consumption of the third-party service, so that, for example, a vulnerability score may reflect consumption of the service in a manner parallel to that described with consumption of remedies herein.

Although illustrated in a particular series of events, in other implementations, the steps of the process 1700 may be performed in a different order. For example, obtaining service indicator data and service thresholds (1712) may be performed before, after, or simultaneously with obtaining descriptive text for the service (1704). Additionally, in other embodiments, the process may include more or fewer steps while remaining within the scope and spirit of the process 1700.

Figure 18:
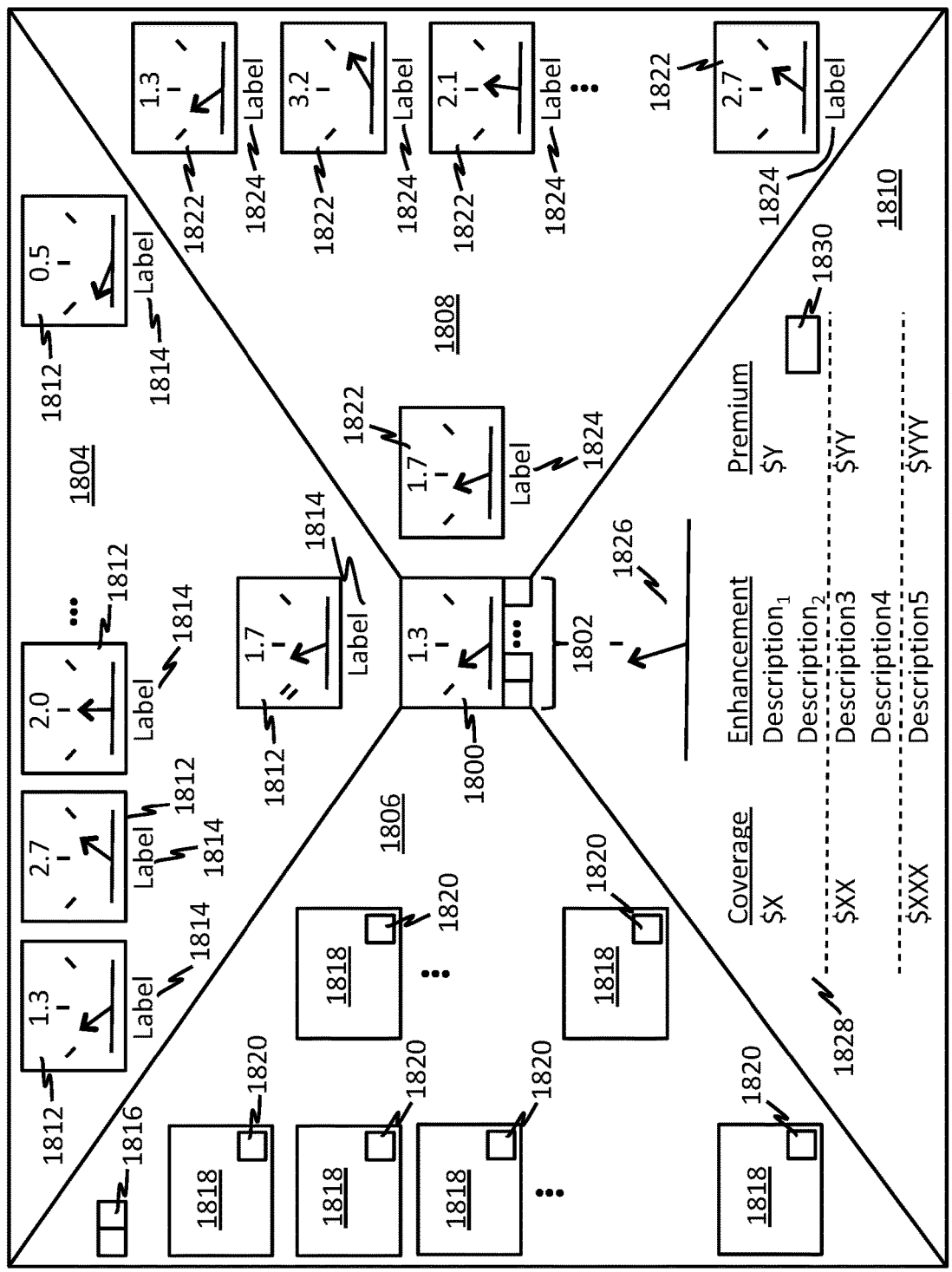
FIG. 18 depicts an embodiment of a user interface for use in connection with the system of FIG. 1.

FIG. 18 depicts an example layout of a user interface, such as user interface 120 of FIG. 1, for presentation of vulnerability scores, vulnerability risks deemed to be relevant to the enterprise in question, particular insurance policies projected to be available to cover losses arising from exploitation of digital vulnerabilities within the enterprise in question, and remedies 116 such as products and/or third-party services 132 that may mitigate risks associated with vulnerabilities within the enterprise in question. The user interface of FIG. 18, for example, may be presented to the representative of an enterprise upon completion of initial analysis of the answers 102 by models 105, 106, and 108 of the operational flow 100 of FIG. 1. Further, after selections 122 have been entered by the user and processed by the model 124 as well as by one or more of the models 105, 106, and 108, the user interface of FIG. 18 may represent an updated analysis based upon selection of one or more of the recommendations 116.

As can be seen from FIG. 18, the user interface depicted therein includes a graphical indicator 1800 of one or more vulnerability scores, such as the vulnerability score 112, that can prominently and centrally displayed according to one example. In the example user interface depicted in FIG. 18, the graphical indicator 1800 is a gauge. The graphical indicator 1800, in other embodiments, can be a pie chart, a bar chart, a radar chart, a radial bar chart, or a spider graph. For example, although the illustrated gauge represents a single vulnerability score, such as an enterprise-wide composite vulnerability score, the graphical indicator 1800 may represent vulnerability scores over a number of security domains. Further, the graphical indicator 1800 may represent both a vulnerability score, as well as comparator scores, such as a prior vulnerability score (e.g., determined in a past review of the enterprise or a baseline prior to selection of one or more remedies, as discussed above) or a target vulnerability score (e.g., peer average, industry average, etc.).

In some implementations, a set of radio buttons 1802 are located beneath the gauge 1800. There may be one radio button corresponding to each security domain, and one additional button corresponding to the enterprise-under-examination as a whole. The radio buttons 1802 may control the particular datum presented by gauge 1800. In the event the radio button corresponding to the enterprise as a whole is selected, for example, then the gauge 1800 presents the composite vulnerability score 112 for the enterprise in question. In the event that the radio button 1802 corresponding to a particular security domain is selected, in some embodiments, the gauge 1800 presents the respective vulnerability score 112 pertaining to the particular security domain.

In some implementations, the user interface shown in FIG. 18 can be divided into four sections 1804, 1806, 1808 and 1810. The focus of the data presented in section 1804, in some implementations, is controlled by the set of radio buttons 1802. Section 1804, in some examples, includes a set of graphical indicators 1812 and associated labels 1814. In an example where the radio button 1802 corresponding to the enterprise as a whole is selected, then a quantity of graphical indicators 1812 equal to the quantity of security domains will be presented in section 1804. Each graphical indicator 1812, in some embodiments, presents the vulnerability score 112 associated with a particular security domain, so that as a whole, the set of graphical indicators 1812 present the vulnerability scores 112 associated with all of the various security domains relevant to the enterprise.

If the radio button 1802 corresponding to a particular security domain is selected, in some implementations, a quantity of graphical indicators 1812 equal to the quantity of categories making up the particular security domain can be presented in section 1804. Each graphical indicator 1812 may present the vulnerability score 112 associated with a particular category within the particular security domain, so that as a whole, the set of graphical indicators 1812 present the vulnerability scores 112 associated with all of the categories making up the selected security domain and relevant to the enterprise.

Section 1806, in some implementations, includes a pair of radio buttons 1816. The radio buttons 1816, in some examples, control the content of data presented in section 1806. The radio buttons 1816 may include one button corresponding to risks (such as the risks 114 of FIG. 1) and one button corresponding to recommended remedies (such as the recommendations 116 of FIG. 1). In the event that the radio button corresponding to risks is selected, then section 1806 will present a quantity of boxes 1818 equal to the quantity of risks 114 identified as being applicable to the enterprise under examination. The risks, for example, may be the risks 114 identified by the model 108 of FIG. 1. Each box 1818, in some embodiments, presents a brief cursory articulation of the corresponding risks. For example, the abbreviated text string portion of the descriptive text corresponding to the risk, as described in relation to operation 604 of the method 600 of FIG. 6, may be presented in each box 1818. Each box 1818 may include a button 1820 that the user can select to cause presentation of an articulation of the corresponding risk in expanded form. In one example, the button 1820 may be labeled as "more information." For example, the box 1818 may expand upon selection of the button 1820 and articulate the risk in expanded form. In another example, the button 1820 may launch a pop-up window presenting expanded information regarding the corresponding risk. Upon presentation, for example, the longer string articulating the risk in a manner intended to educate the user about the nature of the risk, as discussed in relation to operation 604 of the method 600 of FIG. 6, may be presented for user review.

In the event that the radio button 1816 corresponding to recommended remedies is selected, in some implementations, section 1806 causes presentation of a quantity of boxes 1818 equal to the quantity of recommended remedies identified as being applicable to the identified risks pertaining to the enterprise under examination. Each box 1818, for example, may contain an articulation of a remedial service that would mitigate one or more risks existing within the system under examination. For example, the abbreviated text string portion of the descriptive text corresponding to the remedy, as described in relation to operation 1104 of the method 1100 of FIG. 11, may be presented in each box 1818. In another example, the longer string articulating the remedy in a manner intended to educate the user about more detailed information pertaining to the remedy, as discussed in relation to operation 1104 of the method 1100 of FIG. 11, may be presented for user review here or upon selection of another control for presenting additional information.

Each box 1818, in some implementations, also includes a button 1820 that the user may select to request purchase of the particular remedy associated with a given box 1818. Upon selection of the button 1820, for example, the corresponding remedy may to be entered into the selections set 122 of FIG. 1. As described previously, the consequence of adding a particular remedy 116 to the selections set 122, in some embodiments, is that model 124 of FIG. 1 constructs a hypothetical set of answers 126 that the user would have entered, had the selected remedy 116 already been applied to one or more systems of the enterprise at the time when the question set 104 was originally posed to the user. The hypothetical answer set 126, in some embodiments, is applied to model 105 to create a set of hypothetical vulnerability scores 112, so that the user may understand the effect of electing to undertake a particular remedial action(s) identified in the selections 122.

Section 1808, in some implementations, presents the hypothetical vulnerability scores to the user generated through selection of one or more remedies through interaction with the buttons 1820 of section 1806. The focus of section 1808 may be determined by the particular radio button selected from the set 1802 under the central graphical indicator 1800. Section 1808 includes a set of graphical indicators 1822 and associated labels 1824.

In the event the radio button 1802 corresponding to the enterprise as a whole is selected, then a quantity of graphical indicators 1822 equal to the quantity of security domains relevant to the enterprise is presented in section 1808. Each graphical indicator 1822, for example, presents the hypothetical vulnerability score associated with a particular security domain, so that as a whole, the set of graphical indicators 1822 present the hypothetical vulnerability scores associated with all of the various security domains. Each label 1824 may identify the particular domain or category to which the hypothetical score pertains. Thus, the user can see the effect a given remedy has on the vulnerability score associated with each domain. The section 1808, when presenting information regarding the enterprise as a whole, may also include a first graphical indicator 1822 that displays a hypothetical composite vulnerability score determined from the hypothetical vulnerability scores assigned to each security domain.

In the event the radio button 1802 corresponding to a particular security domain is selected, then, rather than demonstrating scores related to security domains, a quantity of graphical indicators 1822 equal to the quantity of categories making up the particular security domain selected via the radio button 1802 may be presented in section 1808. Each graphical indicator 1822 presents the hypothetical vulnerability score associated with a particular category within the particular security domain, so that as a whole, the set of graphical indicators 1822 present the hypothetical vulnerability scores associated with all of categories making up the selected security domain and relevant to the enterprise. Thus, the user can see the effect a given remedy has on the vulnerability score associated with each category within a given security domain. Further, the section 1808 may also include a first graphical indicator 1822 that displays the hypothetical vulnerability score pertaining to the particular domain corresponding to the selected radio button from the set 1802 under the central graphical indicatory 1800.

Section 1810, in some implementations, presents information pertaining to availability of insurance coverage to the enterprise for insuring against risks identified in section 1806. Section 1810 may be organized around the premise that tiers of insurance may be available within a marketplace of insurance. For example, a first tier of insurance may offer a relatively low coverage limit, have a modest set of policy enhancements, and have a relatively high potential range of prices when considered relative to the coverage limit and enhancements. A second tier may offer a relative moderate coverage limit, have an intermediate set of policy enhancements, and have a relatively intermediate potential range of prices when considered relative to the coverage limit and enhancements. Finally, a third tier may offer a relative high coverage limit, have a robust set of policy enhancements, and have a relatively low potential range of prices when considered relative to the coverage limit and enhancements. Thus, as an organization qualifies for higher tiers of coverage, the coverage becomes more attractive from the perspective of the varieties of losses covered, the limits of the coverage, and the premium paid in exchange for such coverages. Section 1810 may include a graphical element 1826 that presents the standing of the enterprise in question with respect to qualifying for a given tier of coverage. According to some embodiments, graphical element 1826 presents a hypothetical composite vulnerability score (e.g., score 112 derived from the updated baseline data 126 as described in relation to FIG. 1) or a quantity derived from that score, and further includes a projection of required relative change (e.g., how much higher or lower the score would need to be) of the hypothetical composite vulnerability score for the enterprise in question to qualify for a next tier of coverage. In some implementations, the determination of relative change, in some embodiments, is made based upon historical application data. In an illustrative example, an interquartile range of the vulnerability scores of the historically successful applications for coverage in the aforementioned next tier of insurance may be determined and applied to projecting the required level of change. Further to the example, using the interquartile range of vulnerability scores, a target vulnerability score may be calculated from the range of values. In some examples, the target vulnerability score may be set to an average score, a median score, or a 75th percentile score of derived from the interquartile range of vulnerability scores.

Section 1810, in some implementations, also includes a description 1828 of the various tiers of coverage available in the marketplace. According to some embodiments, the description is organized as a table. For each tier, the description may include a range of anticipated coverage limits, a set of anticipated enhancements, and a range of anticipated premiums. The description, for example, may detail information regarding the coverages, limits, and enhancements 118 generated by the model 108 of FIG. 1. In further illustration, the information in each tier may describe, in some examples, varieties of losses covered, the limits of the coverage, and the premium paid in exchange for such coverages. Actual marketplace insurance offerings (or anticipated marketplace insurance offerings determined, for example, by the scheme of FIG. 12) falling within the ranges of a given tier are classified as being within that given tier.

According to some embodiments, as a user makes selections of recommended remedies 116, graphical element 1826 of section 1810 depicts the hypothetical standing of the enterprise in question with respect to tiers of marketplace insurance availability. However, a button 1830 may be presented only in association with those tiers of coverage that the organization in question is projected as qualifying for (such as via the scheme depicted in connection with FIG. 13). Selection of button 1830 may cause insurance policies classified as belonging to the tier corresponding to the button 1830 to be added to the insurance selections set 128 of FIG. 1, and therefore cause the bidding process 130 to be initiated as described previously.

Figure 19:
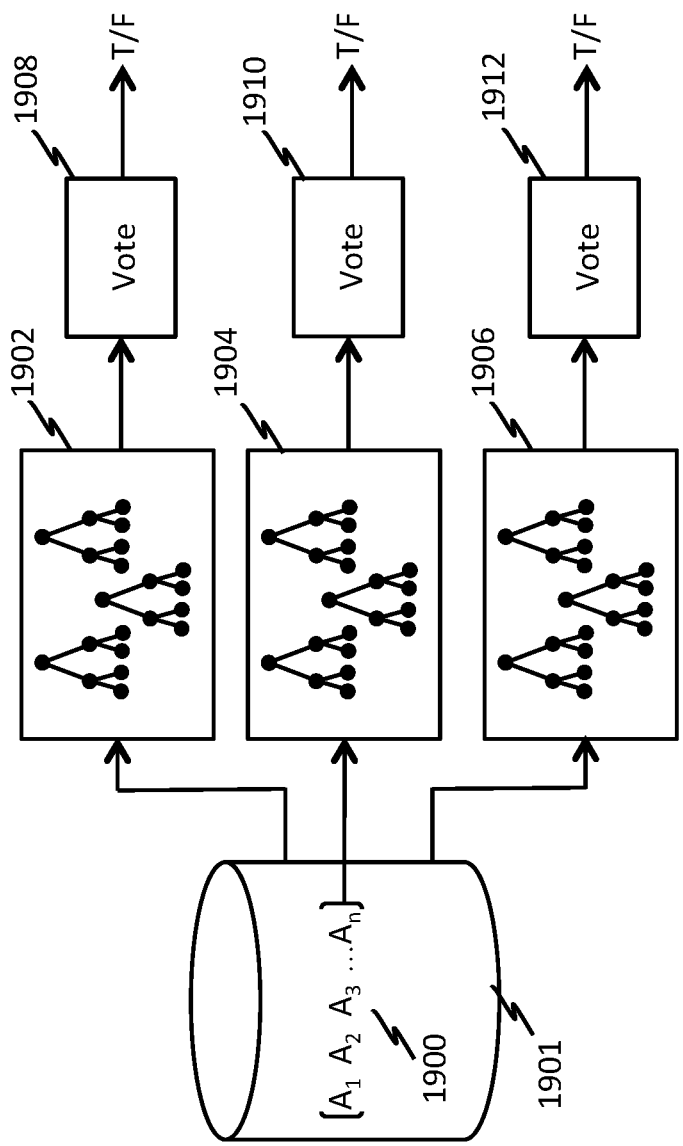
FIG. 19 depicts an embodiment of a scheme for determining whether a system is likely to be offered various tiers of insurance policies.

FIG. 19 depicts another example scheme for projecting available insurance coverages, according to some embodiments. The scheme of FIG. 19 includes ensembles 1902, 1904 and 1906 of decision trees. There may be one ensemble 1902, 1904 and 1906 for each tier of insurance. Thus, although the embodiment depicted in FIG. 19 illustrates three ensembles 1902, 1904 and 1906, in a generalized case with a quantity of c tiers of coverages, there may be a quantity of c ensembles such as ensembles 1902, 1904 and 1906.

Figure 20:
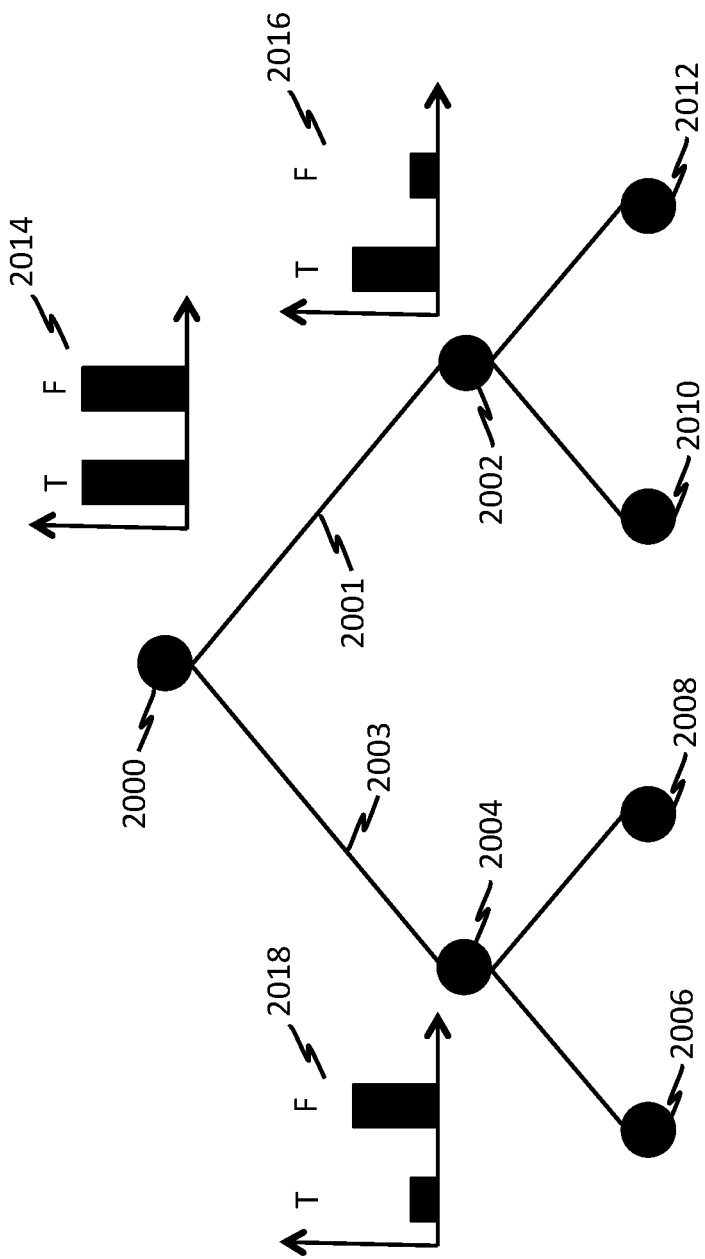
FIG. 20 depicts an embodiment of a decision tree.

An example of a decision tree is depicted in FIG. 20. The decision tree of FIG. 20 has three nodes 2000, 2002 and 2004 and four leaves 2006, 2008, 2010 and 2012. At each node, 2000, 2002, and 2004, a population of data is subdivided into subpopulations. These subdivisions may be created by dividing the population via the use of a chosen feature and split-point, as explained below. In one example, the population of data is answer data such as the answer data 102 of FIG. 1, associated with each applicant for a given tier of insurance coverage (e.g., such as baseline answer data 1334 of FIG. 13). Thus, similar to the inputs of the scheme of FIG. 13, the population of data includes the answer data for a first applicant for the first tier of insurance and an indication of whether or not the applicant was extended coverage under a policy categorized within the tier (e.g., such as the outcome data 1336 of FIG. 13), answer data for a second applicant for the first tier of insurance and an indication of whether or not the second applicant was extended coverage under a policy categorized within the tier, and so on. For illustrative purposes, assume that within the question set 104 of FIG. 1, was a qth question that read: "Does your organization regularly apply security patches to its software components?" Its corresponding answer set was: "(a) never; (b) sporadically; (c) regularly by human effort; (d) regularly by an automated process," with a score of 1 being associated with an answer of "a," a score of 2 being associated with "b," a score of 3 being associated with an answer of "c" and a score of 4 being associated with an answer of "d." The first node 2000, in some implementations, can divide the initial population of applicant data thusly: if an individual applicant within the population scored a 3 or greater, the individual applicant is placed in a first subpopulation, while all others are placed in the second population.

The initial population of applicant data is represented by a histogram 2014. In the example under consideration, one-half of the applicants were extended coverage by a policy categorized within the first tier, and one-half were not. Hence, histogram 2014 depicts bars of equal height for TRUE (representing applicants that were extended coverage) and FALSE (representing applicants that were not extended coverage). Two edges 2001 and 2003 extend from the first node 2000 to a pair of daughter nodes 2002 and 2004. The first subpopulation of applicant data (the subpopulation where the score associated with the qth question was 3 or 4), further to the example, is delivered to the first daughter node 2002, while the second subpopulation of applicant data (the subpopulation where the score associated with the qth question was 1 or 2) is delivered to the second daughter node 2004. Thus, the union of the subpopulations of data at the various daughter nodes of a given parent node is equal to the population of data at the parent node. In the context of the example depicted in FIG. 20, each parent node has two daughter nodes, but this need not be the case. A parent node may have more than two daughter nodes. Because the qth answer within the answer set 102 was used to divide the initial population 2014 into subpopulations 2016 and 2018, the qth answer is regarded as a feature. Because the population was split among those applicants scoring three or greater to the qth question and those scoring less than three on that question, three is regarded as the split-point. Thus, the first node 2000 divided the initial population 2014 into two subpopulations represented by a first subpopulation histogram 2016 and a second subpopulation histogram 2018 by applying a split-point of three on the chosen feature (e.g., the qth answer) to the initial population 2013.

Continuing the example, as can be seen in FIG. 20, histogram 2016 reveals that the first subpopulation of applicant data contains a greater proportion of entries that were offered coverage under policies classified within the first tier, while the second subpopulation contains a greater proportion of entries that were denied coverage. This comports with intuition, as a subpopulation of applicants that regularly applied security patches, whether manually or with the aid of a tool, are generally a more attractive candidate for insurance coverage, while a subpopulation that either never applies such patches or does so only sporadically is generally less attractive.

The subpopulations represented by histograms 2016 and 2018 located at first and second daughter nodes 2002 and 2004, respectively, may be divided into still further subpopulations by selection of a new feature and split-point to be applied to the subpopulations at each node 2002 and 2004. These new subpopulations would be delivered to the respective daughter nodes of nodes 2002 and 2004 (e.g., leaves 2006, 2008, 2010 and 2012). A subpopulation of data that is not further subdivided by a feature/split-point combination is said to be contained at a leaf as opposed to a node. The exemplary decision tree of FIG. 20 has four leaves 2006, 2008, 2010 and 2012. If the leaves 2006, 2008, 2010 and 2012 applied a feature/split-point combination to subdivide their respective subpopulation into still further subpopulations, they would be nodes—not leaves.

The decision tree of FIG. 20 contains two layers of nodes 2000, 2002 and 2004. The first layer contains a single node, node 2000. The second layer contains two nodes 2002 and 2004 (each of which are a daughter of the node 2000 in the first layer). In general, a decision tree may contain any number of layers and any number of nodes. Moreover, a node may have any number of daughter of nodes, not exclusively two.

The subpopulation of data contained at a leaf reveals the probability that an applicant meeting the combinations of features/split-points requirements applied at its various parent nodes will ultimately be offered coverage under a policy. For example, consider that the decision tree of FIG. 20 conforms to a convention where a subpopulation that meets a feature/split-point test is distributed to the daughter node located on the right, while a subpopulation not meeting a feature/split-point test is distributed to the daughter node located to the left. For example, node 2000 imposes the feature/split-point test: "was a given applicant's answer to the qth question greater than or equal to 3?" If a given applicant's data met the feature/split-point test, it became part of the subpopulation delivered to node 2002, whereas if it did not, it became part of the subpopulation delivered to node 2004. Consider leaf 2012. Pursuant to such a convention, its subpopulation includes applicant data that met the feature/split-point requirements imposed by its parent nodes 2002 and 2000. Thus, if leaf 2012 included a quantity of 50 applicants, 43 of which were offered coverage and 7 of which that were not, then an applicant meeting the requirements imposed by the feature/split-point combinations of the leaf's various parent nodes 2002 and 2000 would have an 86% chance of being extended coverage. Leaf 2010 would reveal the probability of an applicant being extended coverage under a policy classified within the first tier in the event the applicant met the feature split-point test imposed by node 2000 but failed the feature/split-point test imposed by node 2002.

Returning to FIG. 19, each ensemble 1902, 1904 and 1906 contains a set of decision trees. According to some embodiments, each decision tree within a given ensemble 1902, 1904 and 1906 employs different combinations of features and split-points. Each ensemble 1902, 1904 and 1906 contains decision trees constructed to yield projections as to whether or not a given applicant will be offered a tier of coverage corresponding to the particular ensemble 1902, 1904 and 1906. Thus, for example, the decision trees of ensemble 1902 may all be constructed to determine whether a given applicant will be offered coverage under policies categorized as falling within a first tier of coverage. Meanwhile, the decision trees of ensemble 1904 may all be constructed to determine whether a given applicant will be offered coverage under policies categorized as falling within a second tier of coverage. Finally, the decision trees of ensemble 1906 would all be constructed to determine whether a given applicant will be offered coverage under policies categorized as falling within a third tier of coverage. An example scheme for constructing the trees within a given ensemble 1902, 1904 and 1906 is described below with reference to FIGS. 21 and 22. However, the decision trees may be constructed in manners beyond the example of FIGS. 21 and 22.

The answer data 1900 pertaining to a particular enterprise is delivered to each ensemble 1902, 1904, and 1906. The decision trees within each ensemble 1902, 1904 and 1906 independently calculate the probability that the applicant will be offered coverage under a policy categorized as falling within the tier associated with the ensemble 1902, 1904 or 1906. The output of each tree within each ensemble 1902, 1904 and 1906 is delivered to a corresponding voting module 1908, 1910 or 1912. According to some embodiments, trees within an ensemble 1902, 1904 or 1906 projecting that the applicant will be offered coverage with a probability exceeding a threshold (example: 50%) are counted as a vote for TRUE, while trees failing to project a successful application with a probability meeting the threshold are counted as a vote for FALSE. The output of the voting module 1908, 1910 or 1912 is determined by whether TRUE or FALSE receives the majority vote. According to other embodiments, the voting modules 1908, 1910 and 1912 use the probability of a successful application generated by each decision tree within the corresponding ensemble 1902, 1904 or 1906 to calculate a composite probability of a successful application. The composite probability is compared to a threshold (example: 50%) and if it exceeds the threshold, the output of the module 1908, 1910 or 1912 is TRUE, otherwise it is false. According to some embodiments, one or more of the voting modules 1908, 1910 or 1912 calculate the composite probability of a successful application by averaging the probability of a successful application output by each decision tree within the corresponding ensemble 1902, 1904 or 1906. According to some embodiments, one or more of the voting modules 1908, 1910 or 1912 calculate the composite probability of a successful application by weighted-averaging the probability of a successful application output by each decision tree within the corresponding ensemble 1902, 1904 or 1906. In still further embodiments, one or more of the voting modules 1908, 1910 or 1912 calculate the composite probability of a successful application by identifying a median probability of a successful application output by each decision tree.

In some implementations, the output from only a subset of the decision trees of one or more of the voting modules 1908, 1910, and 1912 are used by the voting modules 1908, 1910, and 1912 for determining probable outcome. For example, some feature/split point combinations may not be applicable to a given enterprise, based upon its industry, system configuration, and/or other characteristics of the organization.

Figure 21:
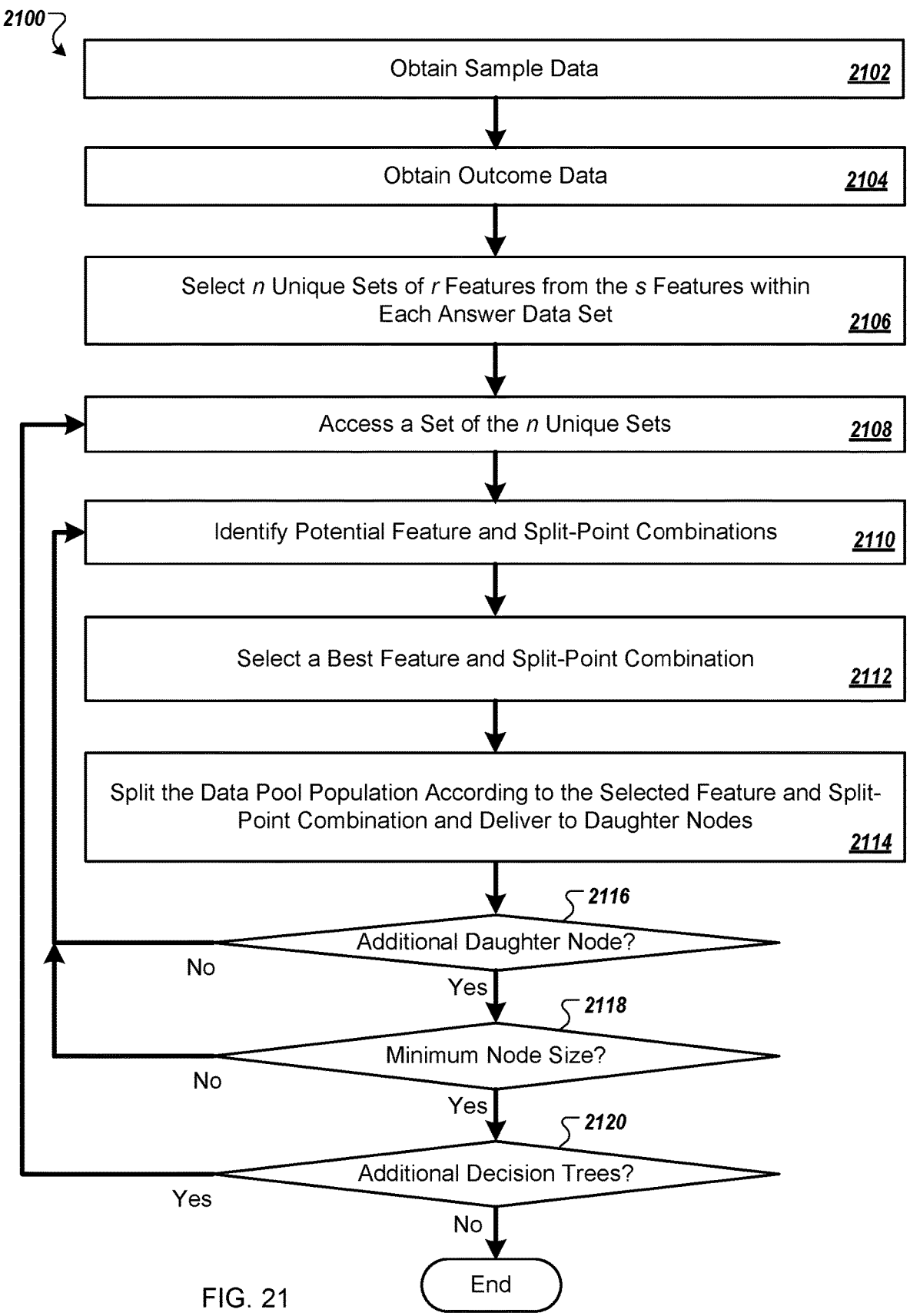
FIG. 21 depicts an embodiment of a method for constructing ensembles of decision trees.
Figure 22:
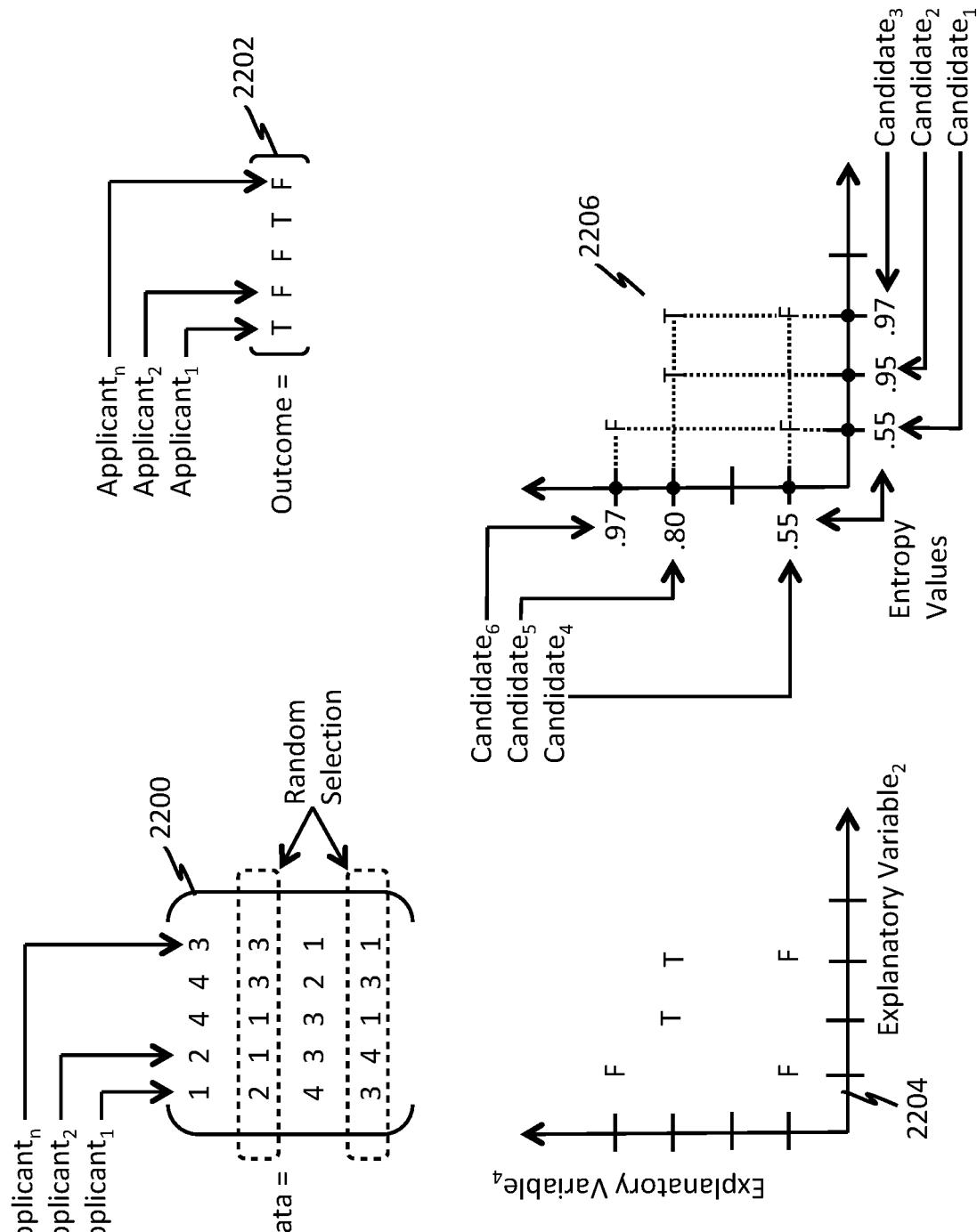
FIG. 22 depicts an embodiment of exemplary historical applicant data used in connection with construction of a decision tree in connection with the method depicted in FIG. 21.

FIGS. 21 and 22 depict explanatory material for discussion pertaining to a scheme for constructing decisions trees making up the ensembles 1902, 1904 and 1906 of FIG. 19. Turning to FIG. 21, a flow chart illustrates an example method 2100 for developing a decision tree ensemble, such as the decision trees of each ensemble 1902, 1904 and 1906. Thus, the operations of method 2100 are designed to create decision trees that operate together to make projections pertaining to the availability of insurance coverage within a given tier of insurance. For example, the method 2100 may be repeated for each ensemble to develop decision trees designed to operate together to make projections pertaining to the availability of coverage within a first tier of insurance, a second tier of insurance, and so on. In some implementations, the process of constructing a decision tree includes selecting the combinations of features and split-points to apply at each node. FIGS. 21 and 22 illustrate a method and overall scheme for managing this process. The discussion focuses on just one tier of insurance (e.g., the first tier) for the sake of illustration, although the following description is applicable to any given tier of insurance coverage.

In some implementations, the method 2100 begins with obtaining at least one pool of sample data including historic answer data regarding system organization and cyber security measures and/or identification of computing system components of a population of enterprises (2102). For example, a sample data pool may be drawn from a data store 1901 of FIG. 19 that contains historical answer data 1900 (e.g., answer data 102 of FIG. 1, answer data 1300 of FIG. 13) for past applicants that applied for policies. The sample data pool may be drawn from applicants of the target tier of insurance, for example policies categorized in the first tier of insurance. In some embodiments, constructing a sample data pool includes selecting a first set of answer data 1900 from the data store 1901 at random, and then copying into the sample data pool a second set of answer data 1900 selected at random (without regard to whether or not the set had previously been selected) along with its corresponding indication of whether or not a policy was offered, and repeating this random selection operation n number of times. Thus, the sample data set will include the same number of entries as the data set from which it was drawn, although by virtue of its construction from random selection without regard to whether an entry had previously been selected, the sample pool may include duplicate entries from the original data set and omit other entries from the original data set. In this way, an original data set can be accessed to draw many different data sets (sample data pools), all of which represent the original data set, but which differ from one another.

In some implementations, outcome data regarding the approval or denial of insurance coverage associated with the population of enterprises is obtained (2104). The outcome data, for example, may represent an answer from one or more insurance carriers responsive to the insurance carriers reviewing at least a portion of the corresponding answer data to each enterprise in determining whether to offer one or more policies to the respective enterprise. The outcome data, for example, may be the outcome data 1336 of FIG. 13. The outcome data, similarly, may be obtained from the data store 1901. In illustration, where the data store 1901 contains historical answer data 1900 for a quantity of n applicants, along with an indication (TRUE or FALSE) of whether the applicant was offered a first tier policy, a sample data pool may be constructed by copying into the sample pool answer data and corresponding indication of offer decision for at least a portion of the population of enterprises during operation 2102. In other embodiments, a separate database may be cross-referenced to identify the outcome for each enterprise in each sample data pool.

In some implementations, to construct a number n decision trees, n unique sets of a quantity of r features are selected from the s features available in the historic answer data sets (2106). In illustration, assume the historical answer data included a quantity of s answers. Thus, for a first historical applicant, the applicant's answer data includes a quantity of s answers, and for a second historical applicant, the applicant's answer data includes a quantity of s answers, and so on. In some embodiments, a quantity of r answers is chosen as potential features for use in constructing a decision tree (r<s). The quantity of r answers, in some embodiments, is selected randomly. In other embodiments, the quantity of r answers is selected in a targeted fashion. For example, where the s answers of the answer set are broken into a number of security domains and categories within the security domains, questions may be selected at random within security domains and/or categories. In a first illustration, the quantity of r answers may be selected to be evenly distributed across security domains. In a second illustration, the quantity of r answers may be selected to be clustered within a particular one or more security domains while distributed across security domain categories. Other targeted but automated selection strategies may be applied. In some embodiments, a variety of selection strategies are applied to develop a variety of decision trees. The features assigned to nodes in each constructed decision tree, in some embodiments, can be chosen from among this randomly selected quantity of r features. In this sense, these randomly selected features are candidate features.

In illustration, FIG. 22 depicts an example of a historical answer data set 2200 for applicants that previously applied for policies categorized within the first tier of insurance. Each column of data in set 2200 pertains to a given applicant. Thus, the first column pertains to applicant #1, while the second column refers to applicant #2. In the example depicted in FIG. 22, it is assumed that only five applicants previously applied for coverage under policies categorized in the first tier. Of course, actual historical data sets may include data from many more applicants.

Each row contains a score assigned to an answer provided by the applicant. Thus, looking at the first column (which pertains to applicant #1), applicant #1 provided an answer to question #1 that yielded a score of 1, provided an answer to question #2 that yielded a score of 2, provided an answer to question #3 that yielded a score of 4, and provided an answer to question #4 that yielded a score of 3. Applicant #2 provided an answer to question #1 that yielded a score of 2, provided an answer to question #2 that yielded a score of 1, provided an answer to question #3 that yielded a score of 3, and provided an answer to question #4 that yielded a score of 4. In the example depicted in FIG. 22, it is assumed that only four questions were posed to the users and that the answers were scored on a scale of 1-4. Of course, an actual answer set may include many more answer scores (e.g., at least 25, around 50, or at least 100 answer scores or more), meaning an actual historical answer data set would contain many more rows. FIG. 22 also depicts the outcome data 2202 corresponding to each of the five applicants. As can be seen, the first and fourth applicants were offered a first-tier policy, while the second, third and fifth applicants were not.

Further to the example, within the answer sets of the outcome data 2202, each answer score can be considered a possible feature to be selected at random. Because each historical applicant's answer data set contains four answer scores, there are a total of four possible features. In other words, in the depicted example, s=4. In the depicted example, r is chosen to be 2. According to some embodiments, r is selected as a function of s (e.g., r=int[s/2], or r=int[s/10]). Because r is chosen to be equal to 2, in the illustrated example, two of the four features are chosen for consideration as possible use in construction of the decision tree. In an actual scenario, the quantity s would be much larger, and r may be, in some examples, at least 10, at least 20, or up to 50. As a result of randomly selecting a quantity of r features for consideration, the data set for a particular decision tree may be thought of as including only those selected features. In the depicted example, the second and fourth features were randomly selected in operation 2102. Therefore, in the depicted example, each historical applicant can be thought of as having answered only two questions—the second and fourth questions. Consequently, the first historical applicant can be thought of as having a set of answer data equal to (2, 3), while the second historical applicant can be thought of as having answer data equal to (1, 4), and so on.

Returning to FIG. 21, in a generalized sense where a quantity of r features is chosen, a historical applicant may be thought of as having had only those r questions posed to him or her and as having only answered those r questions. Thus, in some embodiments, the goal for the method 2100 is to select a proper feature and split-point combination from among the r selected features and then to assign the combination to a node. In this example, it is determined whether to select the answer to the second question or fourth question as the feature to be employed by the first node of the decision tree and to assign a split-point to the selected feature. In some implementations, a set of the n unique sets of r features is accessed (2108). The method 2100, for example, may methodically step through the sets of features developing multiple decision trees.

In some implementations, potential feature and split-point combinations for the present node of the decision tree are identified (2110). Turning to FIG. 22, an illustration provides an explanation regarding the identification potential feature/split point combinations using the randomly selected data features of the sample data 2200 and the outcome data 2202.

The outcome data 2202 of FIG. 22 can be plotted on coordinate axis defined by the selected features, as shown in graph 2204. Because historical applicant #1 has an answer data set equal to (2, 3) and because that applicant was offered coverage, a "T" (indicating that a policy was offered) may be plotted at coordinate (2,3). Because historical applicant #2 has an answer data set equal to (1, 4), and because that applicant was not offered a policy, an "F" may be plotted at coordinate (1, 4). The resulting graph 2204 plots outcome of insurance applications for the five historical applicants as a function of the features selected in operation 2102, where the answer to the second question in the data set 2200 is measured along the x-axis and the answer to the fourth question in the data set 2200 is measured along the y-axis.

As shown in graph 2206, each plotted data point ("T" or "F") may be projected on to each of the two axes. Although not labeled, the answer to the second question in the data set 2200 continues to be measured along the x-axis of graph 2206 and the fourth question in the data set 2200 continues to be measured along the y-axis of graph 2206. The projection of each data point onto each axis defines a candidate feature/split-point combination. The projections of each data point onto the axes are depicted via the dotted lines in graph 2206. Therefore, the graph 2206 defines six potential feature/split-point pairs. The first node of the decision tree to be constructed could potentially split the initial population of historical applicants based on whether the answer score assigned to answer to question #2 was less than or equal to 1 (candidate feature/split-point pair #1), or less than or equal to 2 (candidate feature/split-point pair #2), or less than or equal to 3 (candidate feature/split-point pair #3), or whether the answer score assigned to answer to question #4 was less than or equal to 1 (candidate feature/split-point pair #4), or less than or equal to 3 (candidate feature/split-point pair #5), or less than or equal to 4 (candidate feature/split-point pair #6).

In some implementations, the best feature/split-point combination is selected from among the potential feature and split-point combinations (2112). The best feature/split-point combination, for example, may be considered the feature/split-point which carves the population into the most evenly distributed sub-populations (e.g., as close to being split in half as possible in the circumstance where the feature/split-point combination is designed to split the population in two). If two feature/split-point combinations provide a same distribution, in some embodiments, the feature/split-point combination for the first node is randomly selected from the equally positioned candidates. In other embodiments, if any feature weighting has been provided (e.g., a preference for a particular security domain or an identification of relative importance of any particular answers within the answer data set, etc.), then the feature/split-point combination involving the highest priority feature may be selected.

In illustration, the best feature/split point combination may be selected from the above-mentioned six candidates. To identify the best feature/split-point combination, in some implementations, the entropy of the data set contained at a node is compared to the weighted average entropy of the data sets that would result if the node were to employ each of the candidate feature/split-point pairs to subdivide the data set into subsets. The candidate feature/split-point pair that would result in the greatest drop in entropy is considered the best, further to the example. In the context of a data set presenting two outcomes (TRUE or FALSE), its entropy may be calculated as: Entropy=$-[P_{TRUE}*\log 2(P_{TRUE})+ P_{FALSE}*\log 2(P_{FALSE})]$, where $P_{TRUE}$ represents the proportion of true outcomes in the data set and $P_{FALSE}$ represents the proportion of false outcomes in the data set. Therefore, pursuant to the example, because the first node of the decision tree receives the full set of historical applicant data, and because the full data set contains 2 TRUE outcomes out of a total of 5 outcomes and 3 FALSE outcomes out of a total of 5 outcomes, the entropy of the data set at the first node is equal to (rounded to two decimal places):

Entropy=$-[2/5*\log 2(2/5)+3/5*\log 2(3/5)]=-[(-0.53)+(-0.44)]=0.97$.

Therefore, the candidate feature/split-point pair that results in the greatest reduction from 0.97 bits (data entropy is measured in bits) is chosen as the best or optimal feature/split-point pair. Consider the entropy that would result from employing a feature/split-point pair where the feature is the answer to the second question and the split-point is 1. (This was the first candidate feature/split-point identified above.) This would mean that the first node in the decision tree would divide the total population of historical applicant data into two sub-populations: (1) those that had an answer to the second question that resulted in an answer score that was less than or equal to 1 (the "first sub-population"); and (2) those that had an answer to the second question that resulted in an answer score that was greater than 1. (the "second sub-population").

Consider the entropy in the first sub-population, which would include 2 FALSE outcomes and 0 TRUE outcomes:

Entropy=$-[0/2*\log 2(0/2)+2/2*\log 2(2/2)]=-[0+0]=0$.

Now consider the entropy in the second sub-population, which would include 2 TRUE outcomes and 1 FALSE outcome (rounded to two decimal places):

Entropy=$-[2/3*\log 2(2/3)+1/3*\log 2(1/3)]=-[(-0.39)+(-0.53)]=0.92$

In one example, the entropy resulting from selection of such a candidate feature/split-point pair can correspond to a weighted average of the entropy of the first sub-population and second sub-population:

Entropy=$2/5*0+3/5*0.92=0.55$ (rounded to two decimal places).

Therefore, if the first candidate feature/split-point pair were to be employed at the first node, entropy would be reduced from 0.97 bits to 0.55 bits. The entropies resulting from employment of the candidate feature/split-point pairs are presented on graph 2206 of FIG. 22. As can be seen, and as was just discussed, candidate #1 would result in an entropy of 0.55 bits, candidate #2 would result in an entropy of 0.95 bits, candidate #3 would result in an entropy of 0.97 bits, candidate #4 would result in an entropy of 0.55 bits, candidate #5 would result in an entropy of 0.8 bits, and candidate #6 would result in an entropy of 0.97 bits. Therefore candidate #1 and candidate #4 result in the same entropy reduction, e.g., a reduction of 0.42 bits (0.97−0.55=0.42). Feature/split-point candidates #1 and #4 may both be considered the best feature/split-point pursuant. In such an instance, a random selection is made between candidate #1 and candidate #4.

In some implementations, the population of the present node is split into sub-populations pursuant to the previously selected feature/split-point pair, and each sub-population of data is delivered to a respective daughter node of the present node (2114). For example, the sample data pool may be filtered by the split-point into the two separate data pools for populating the daughter nodes of the first data node. According to the example followed above, assuming that candidate #1 was randomly selected, the sample data pool may be filtered to separate the applicant data sets into the sub-populations of (1) those that had an answer to the second question that resulted in an answer score that was less than or equal to 1, and (2) those that had an answer to the second question that resulted in an answer score that was greater than 1.

In some implementations, it is determined whether an additional daughter node exists (2116). For example, once the parent node has been split into two additional nodes, each daughter node must receive a feature and split-point combination to determine the leaves of that daughter node. Thus, if operations 2110 through 2114 were exercised for node 2002 of FIG. 20, the same operations must also be exercised for node 2004.

In some implementations, it is determined whether the tree under construction has reached a chosen minimum node size (2118). For example, in the context of a tree that employs nodes that exclusively subdivide populations into two subpopulations, it may be desired that a given tree have three layers, implying a minimum node size of seven (one node in the first layer, two in the second layer and four in the third layer). The minimum node size, for example, may be selected to balance processing requirements against prediction improvements. In this way, the system and work flow provides a technical solution to a technical problem by being able to adjust the number of nodes/layers on the fly to improve based on processing speeds based on changing availability of processing resources. If the minimum node size has not been reached, in some embodiments, then the method 2100 returns to identifying potential features and split-point combinations for the present node (2110). The new feature/split-point pair, for example, may be determined for the next node using the principles explained above.

If, instead, the minimum node size has been reached (2118), in some embodiments, it is determined whether the desired decision tree count has been reached for the ensemble (2120). For example, it may be desired that the ensemble 1902, 1904 or 1906 be constituted of ten decision trees. If the desired quantity of trees has not been constructed (2120), then the method 2100, in some implementations, the method 2100 returns to access another set of features. If the desired quantity of trees has been constructed, in some implementations, the method 2100 concludes.

Although described in a particular series of operations, in other implementations, the method 2100 may include more or fewer operations. For example, according to some embodiments, when developing additional nodes of a decision tree, a new selection of candidate features may be made (2108), from which the feature/split-point is selected for the next node (e.g., daughter node layer) of the present decision tree. For example, moving to a different feature set within the layers of the decision tree may reduce effects of noise within the training data set. Further, in some embodiments, a new minimum node size may be selected based upon the use of the new feature set for the daughter node layer. The minimum node size may be selected based upon a desired level of predictive success.

Further, in some implementations, certain operations of the method 2100, in other embodiments, may be performed in a different order and/or in parallel. For example, obtaining the pool of sample data (2102) and obtaining the outcome data (2104) may be performed simultaneously where combined data records exist. In another example, the unique sets of features may be selected (2106) prior to obtaining sample data (2102). Additionally, a separate pool of sample data (2102), decision data (2104), and set of features (2106) may be obtained after each round of decision tree development. In the event that a change in feature set occurs in the middle of developing a decision tree, as described above, in some embodiments the next feature set may be determined prior to continuing with developing the decision tree (e.g., continuing with operations 2110, 2112, and 2114). Other modifications of the method 2100 are possible while remaining within the scope and spirit of the method 2100.

Figure 23:
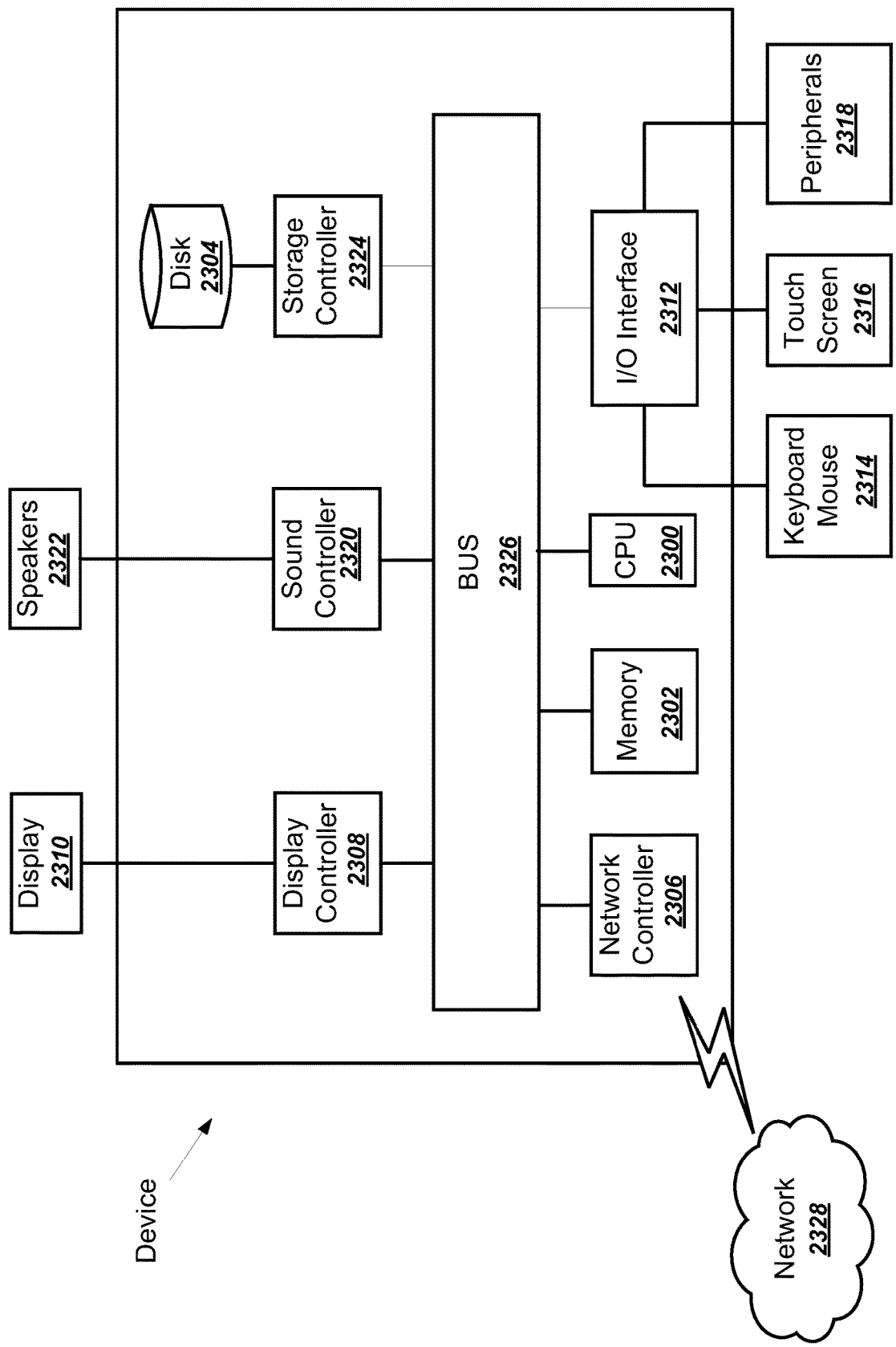
FIG. 23 and FIG. 24 illustrate example computing systems on which the processes described herein can be implemented.
Figure 24:
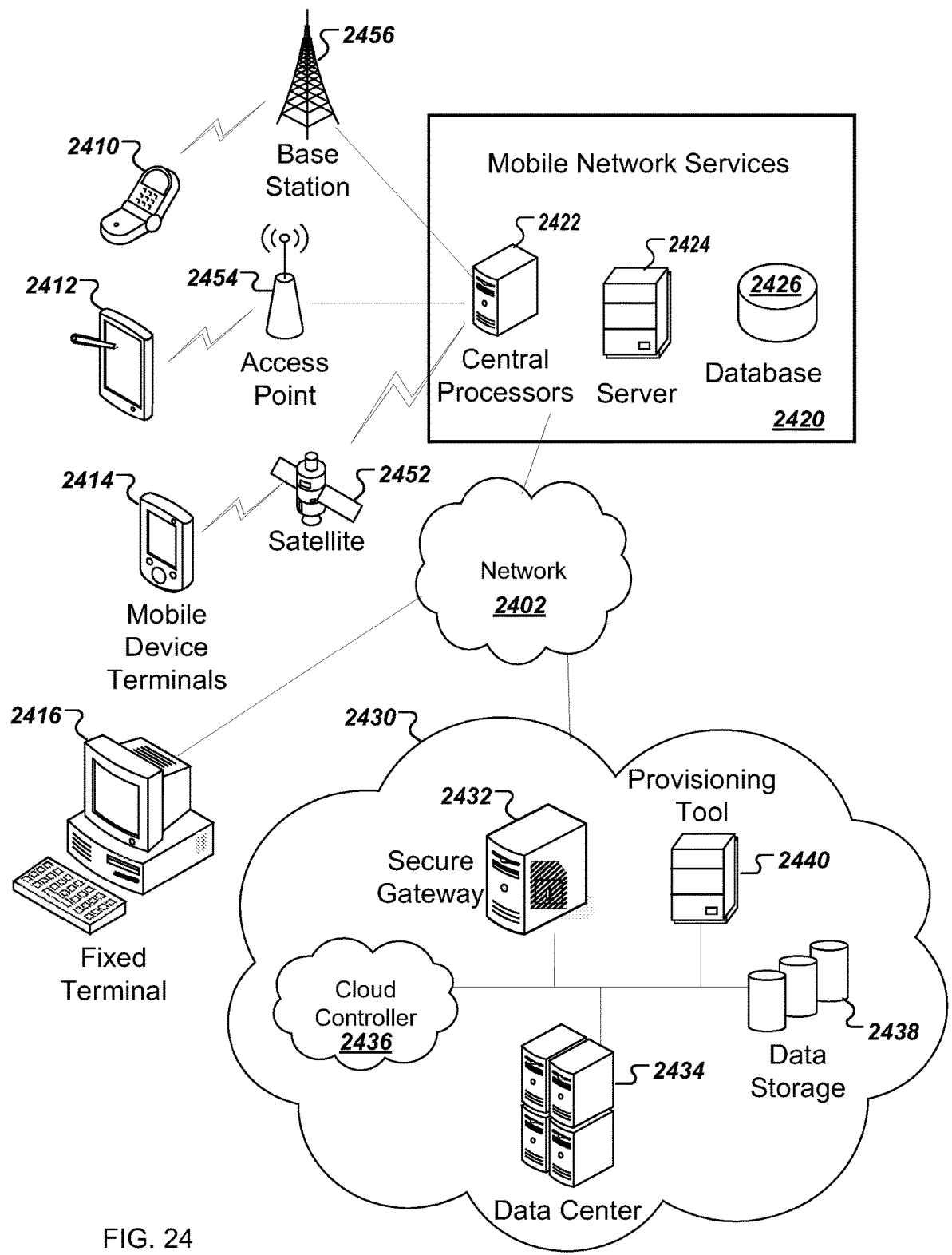

Next, a hardware description of the computing device, mobile computing device, or server according to exemplary embodiments is described with reference to FIG. 23. The computing device, for example, may represent a computing system or platform, such as an insurance exchange platform, for performing the various methods, process flows, and/or schemes described herein. Further, the computing device may represent an end user device, such as a mobile device or personal computer, for interfacing with the computing system or platform. In FIG. 23, the computing device, mobile computing device, or server includes a CPU 2300 which performs the processes described above. The process data and instructions may be stored in memory 2302. The processing circuitry and stored instructions may enable the computing device to perform, in some examples, the operational flow 100 of FIG. 1, the scheme 300 of FIG. 3, the scheme 400 of FIG. 4, the method 600 of FIG. 6, the method 700 of FIG. 7, the scheme 900 of FIG. 9, the scheme 1000 of FIG. 10, the method 1100 of FIG. 11, the scheme 1200 of FIG. 12, the scheme 1300 of FIG. 13, the method 1400 of FIG. 14, the scheme 1500 of FIG. 15, the method 1700 of FIG. 7, the scheme 1900 of FIG. 19, and/or the method 2100 of FIG. 21. These processes and instructions may also be stored on a storage medium disk 2304 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device, mobile computing device, or server communicates, such as a server or computer. The storage medium disk 2304, in some examples, may store the contents of the question set 104 of FIG. 1, the matrices of FIGS. 2A-E, the matrices of FIGS. 5A-C, the matrices of FIGS. 8A-B, the data store 1300 of FIG. 13, the matrices of FIGS. 16A-C, and/or the data store 1901 of FIG. 19.

Further, a portion of the claimed advancements may be provided as a utility application, background daemon, or component of an operating system, or combination thereof, executing in conjunction with CPU 2300 and an operating system such as Microsoft Windows 9, UNIX, Solaris, LINUX, Apple MAC-OS and other systems known to those skilled in the art.

CPU 2300 may be a Xenon or Core processor from Intel of America or an Opteron processor from AMD of America, or may be other processor types that would be recognized by one of ordinary skill in the art. Alternatively, the CPU 2300 may be implemented on an FPGA, ASIC, PLD or using discrete logic circuits, as one of ordinary skill in the art would recognize. Further, CPU 2300 may be implemented as multiple processors cooperatively working in parallel to perform the instructions of the inventive processes described above.

The computing device, mobile computing device, or server in FIG. 23 also includes a network controller 2306, such as an Intel Ethernet PRO network interface card from Intel Corporation of America, for interfacing with network 2328. As can be appreciated, the network 2328 can be a public network, such as the Internet, or a private network such as an LAN or WAN network, or any combination thereof and can also include PSTN or ISDN sub-networks. The network 2328 can also be wired, such as an Ethernet network, or can be wireless such as a cellular network including EDGE, 3G, 4G, and 5G wireless cellular systems. The wireless network can also be Wi-Fi, Bluetooth, or any other wireless form of communication that is known. The network 2328, for example, may support communications between elements of the network infrastructure supporting the operational flow 100 of FIG. 1, such as the connection to the third-party services 132.

The computing device, mobile computing device, or server further includes a display controller 2308, such as a NVIDIA GeForce GTX or Quadro graphics adaptor from NVIDIA Corporation of America for interfacing with display 2310, such as a Hewlett Packard HPL2445w LCD monitor. A general purpose I/O interface 2312 interfaces with a keyboard and/or mouse 2314 as well as a touch screen panel 2316 on or separate from display 2310. General purpose I/O interface also connects to a variety of peripherals 2318 including printers and scanners, such as an OfficeJet or DeskJet from Hewlett Packard. The display controller 2308 and display 2310 may enable presentation of the user interface illustrated in FIG. 18.

A sound controller 2320 is also provided in the computing device, mobile computing device, or server, such as Sound Blaster X-Fi Titanium from Creative, to interface with speakers/microphone 2322 thereby providing sounds and/or music.

The general-purpose storage controller 2324 connects the storage medium disk 2304 with communication bus 2326, which may be an ISA, EISA, VESA, PCI, or similar, for interconnecting all of the components of the computing device, mobile computing device, or server. A description of the general features and functionality of the display 2310, keyboard and/or mouse 2314, as well as the display controller 2308, storage controller 2324, network controller 2306, sound controller 2320, and general purpose I/O interface 2312 is omitted herein for brevity as these features are known.

One or more processors can be utilized to implement various functions and/or algorithms described herein, unless explicitly stated otherwise. Additionally, any functions and/or algorithms described herein, unless explicitly stated otherwise, can be performed upon one or more virtual processors, for example on one or more physical computing systems such as a computer farm or a cloud drive.

Reference has been made to flowchart illustrations and block diagrams of methods, systems and computer program products according to implementations of this disclosure. Aspects thereof are implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

The functions and features described herein may also be executed by various distributed components of a system. For example, one or more processors may execute these system functions, wherein the processors are distributed across multiple components communicating in a network. The distributed components may include one or more client and server machines, which may share processing, as shown on FIG. 17, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

In some implementations, the described herein may interface with a cloud computing environment 2430, such as Google Cloud Platform™ to perform at least portions of methods or algorithms detailed above. The processes associated with the methods described herein can be executed on a computation processor, such as the Google Compute Engine by data center 2434. The data center 2434, for example, can also include an application processor, such as the Google App Engine, that can be used as the interface with the systems described herein to receive data and output corresponding information. The cloud computing environment 2430 may also include one or more databases 2438 or other data storage, such as cloud storage and a query database. In some implementations, the cloud storage database 2438, such as the Google Cloud Storage, may store processed and unprocessed data supplied by systems described herein. For example, the question set 104 of FIG. 1, the matrices of FIGS. 2A-E, the matrices of FIGS. 5A-C, the matrices of FIGS. 8A-B, the contents of the data store 1300 of FIG. 13, the matrices of FIGS. 16A-C, and/or the contents of the data store 1901 of FIG. 19 may be maintained in a database structure such as the databases 2438.

The systems described herein may communicate with the cloud computing environment 2430 through a secure gateway 2432. In some implementations, the secure gateway 2432 includes a database querying interface, such as the Google BigQuery platform. The data querying interface, for example, may support access by the method 2100 to historic answer data 1900 in the data store 1901.

The cloud computing environment 2430 may include a provisioning tool 2440 for resource management. The provisioning tool 2440 may be connected to the computing devices of a data center 2434 to facilitate the provision of computing resources of the data center 2434. The provisioning tool 2440 may receive a request for a computing resource via the secure gateway 2432 or a cloud controller 2436. The provisioning tool 2440 may facilitate a connection to a particular computing device of the data center 2434.

A network 2402 represents one or more networks, such as the Internet, connecting the cloud environment 2430 to a number of client devices such as, in some examples, a cellular telephone 2410, a tablet computer 2412, a mobile computing device 2414, and a desktop computing device 2416. The network 2402 can also communicate via wireless networks using a variety of mobile network services 2420 such as Wi-Fi, Bluetooth, cellular networks including EDGE, 3G, 4G, and 5G wireless cellular systems, or any other wireless form of communication that is known. In some examples, the wireless network services 2420 may include central processors 2422, servers 2424, and databases 2426. In some embodiments, the network 2402 is agnostic to local interfaces and networks associated with the client devices to allow for integration of the local interfaces and networks configured to perform the processes described herein. Additionally, external devices such as the cellular telephone 2410, tablet computer 2412, and mobile computing device 2414 may communicate with the mobile network services 2420 via a base station 2456, access point 2454, and/or satellite 2452.

While certain embodiments have been described, these embodiments have been presented by way of example only and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "about," "proximate," "minor variation," and similar terms generally refer to ranges that include the identified value within a margin of 20%, 10% or preferably 5% in certain embodiments, and any values therebetween.

All of the functionalities described in connection with one embodiment are intended to be applicable to the additional embodiments described below except where expressly stated or where the feature or function is incompatible with the additional embodiments. For example, where a given feature or function is expressly described in connection with one embodiment but not expressly mentioned in connection with an alternative embodiment, it should be understood that the inventors intend that that feature or function may be deployed, utilized or implemented in connection with the alternative embodiment unless the feature or function is incompatible with the alternative embodiment.

While certain embodiments have been described, these embodiments have been presented by way of example only and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:
1. A system comprising:
processing circuitry;
a non-transitory data storage comprising
a plurality of sets of questionnaire answers, each set corresponding to respective one of a plurality of enterprises, and
a plurality of indications of insurance application outcome comprising, for each enterprise of the plurality of enterprises, at least one respective indication of insurance application outcome, wherein
each indication of insurance application outcome identifies a respective insurance product of one or more insurance products, a respective tier of a plurality of tiers of the respective insurance product, and a result, wherein the result is one of approval or denial; and a non-transitory computer-readable medium storing instructions thereon, wherein the instructions, when executed on the processing circuitry, cause the processing circuitry to
receive, from a remote computing device via a network, responses to a plurality of questions in a questionnaire, the responses describing a plurality of features of a computing infrastructure of an organization,
identify, based on the responses, one or more vulnerabilities associated with the plurality of features of the computing infrastructure,
for each respective feature of one or more features of the plurality of features,
calculate, based on application of a risk model for a respective vulnerability to the respective feature, an amount of risk to the respective feature associated with the respective vulnerability, and
determine, based on the amount of risk to the respective feature, one or more remedies for mitigating an impact of the respective vulnerability,
wherein, for at least one feature of the one or more features of the plurality of features,
the one or more remedies include purchase of an insurance product of a plurality of insurance products for covering the amount of risk to the at least one feature, wherein the insurance product includes one or more coverage tiers,
generate, based on the plurality of sets of questionnaire answers and a portion of the plurality of indications of insurance application outcome related to a given insurance product of the one or more insurance products, at least one decision tree configured to indicate, based on answers selected from the plurality of sets of questionnaire answers to correspond to each given feature of at least a portion of the plurality of features, a likelihood that the given feature is eligible for coverage by the one or more coverage tiers of the given insurance product, wherein generating the at least one decision tree comprises, for each respective decision tree,
determining a total number of nodes of the respective decision tree based at least in part on one or more of i) available processing resources or ii) processing speed, and
dividing enterprises selected from the plurality of enterprises into respective sub-populations according to respective answers corresponding to the at least one feature of the plurality of features and further according to the at least one respective indication of insurance application outcome for each enterprise of the plurality of enterprises, such that the respective decision tree comprises a plurality of nodes, each node corresponding to a different feature of the at least one feature, wherein
each node of the plurality of nodes comprises a plurality of leaves that each indicate a respective probability that an applicant having a particular pattern of questionnaire responses has historically been offered coverage for the given insurance product, and
dividing comprises splitting the respective sub-populations according to each feature of the at least one feature to produce the respective decision tree having the total number of nodes,
calculate in real-time, responsive to determining that the one or more remedies comprises purchase of the given insurance product and based on applying at least a portion of the responses to one or more decision trees of the at least one decision tree, a probability of the organization obtaining approval to be extended coverage for at least one tier of the one or more coverage tiers of the given insurance product, and present, to the remote computing device via a user interface, one or more recommended remedies selected from the one or more remedies, wherein presenting the purchase of the given insurance product as one of the one or more recommended remedies is conditionally based on the probability of the organization obtaining approval to be extended coverage for the at least one tier of the given insurance product.

2. The system of claim 1, wherein the computing infrastructure includes two or more of hardware assets, software assets, informational assets, policies, or practices of the organization.

3. The system of claim 1, wherein the one or more vulnerabilities include cyber security vulnerabilities to the computing infrastructure.

4. The system of claim 1, wherein each of the plurality of features is associated with a security domain of a plurality of security domains.

5. The system of claim 4, wherein the plurality of security domains include two or more of a data security domain, a critical data in systems domain, an identity and access management domain, an endpoints and security systems domain, a cloud/network security domain, a physical security domain, an application security domain, or a third-party security domain.

6. The system of claim 4, wherein identifying the one or more vulnerabilities comprises calculating, for each of the plurality of security domains based on the amount of risk calculated for each of the plurality of features, a vulnerability score for a respective security domain, wherein the vulnerability score reflects a degree to which one or more components of the respective security domain are susceptible to compromise from the respective vulnerability.

7. The system of claim 6, wherein determining the one or more remedies for the respective vulnerability includes calculating an improvement in a respective vulnerability score for the respective security domain upon implementation of each of the one or more remedies for the computing infrastructure.

8. The system of claim 7, wherein determining the one or more remedies for the respective vulnerability comprises identifying a first number of the one or more remedies that, upon the implementation, cause a greatest improvement in the respective vulnerability score for the respective security domain compared to other remedies of the one or more remedies.

9. The system of claim 8, wherein presenting the one or more recommended remedies comprises presenting the first number of the one or more remedies that cause the greatest improvement in the respective vulnerability score for the respective security domain.

10. The system of claim 9, wherein presenting the first number of the one or more remedies via the user interface comprises demonstrating, within the user-interface, an impact of implementing the first number of the one or more remedies on the respective vulnerability score for the respective security domain.

11. The system of claim 1, wherein the amount of risk to the respective feature of the computing infrastructure corresponds to an amount of loss to the organization from compromise of the respective feature to the respective vulnerability.

12. The system of claim 1, wherein the one or more remedies include at least one of products or services to mitigate the impact of the respective vulnerability on the respective feature of the computing infrastructure.

13. The system of claim 1, wherein a respective response to each of the plurality of questions in the questionnaire is one option of a plurality of response options to a respective question.

14. The system of claim 13, wherein generating the at least one decision tree for the given feature comprises identifying one or more nodes of the plurality of nodes for the respective decision tree, wherein each of the one or more nodes is associated with one of the plurality of response options to at least one question of the questions in the questionnaire.

15. The system of claim 14, wherein identifying the one or more nodes for the respective decision tree includes grouping answers from the sets of questionnaire answers according to a provided response option of the plurality of response options to a given question of the at least one question, and identifying a respective response option of the plurality of response options to the given question that divides the answers from the plurality of sets of questionnaire answers into substantially even groupings as one of the one or more nodes for the decision tree.

16. The system of claim 15, wherein each respective node of the one or more nodes in the respective decision tree includes a histogram representing proportions of a feature of the at least one feature corresponding to the respective node at a plurality of computing infrastructures of a portion of the plurality of enterprises that were granted coverage at a respective coverage tier of the given insurance product.

17. A method comprising:

storing, within a non-transitory data storage, a plurality of sets of questionnaire answers, each set corresponding to respective one of a plurality of enterprises, and a plurality of indications of insurance application outcome comprising, for each enterprise of the plurality of enterprises, at least one respective indication of insurance application outcome, wherein each indication of insurance application outcome identifies a respective insurance product of one or more insurance products, a respective tier of a plurality of tiers of the respective insurance product, and a result, wherein the result is one of approval or denial;

receiving, by processing circuitry from a remote computing device via a network, responses to a plurality of questions in a questionnaire, the responses describing a plurality of features of a computing infrastructure of an organization;

identifying, by the processing circuitry based on the responses, one or more vulnerabilities associated with the plurality of features of the computing infrastructure, wherein each of the plurality of features is associated with a respective security domain of a plurality of security domains;

for each respective security domain of the plurality of security domains, calculating, by the processing circuitry based on amounts of risk from the one or more vulnerabilities to features associated with each respective security domain, a vulnerability score for the respective security domain, wherein the vulnerability score reflects a degree to which one or more components of the respective security domain are susceptible to compromise from the one or more vulnerabilities, and determining, by the processing circuitry based on the amounts of risk from the one or more vulnerabilities to the features, one or more remedies for mitigating an impact of at least one vulnerability of the one or more vulnerabilities, wherein the one or more remedies include purchase of an insurance product of a plurality of insurance products for covering the amounts of risk from the one or more vulnerabilities to the features, wherein the insurance product includes one or more coverage tiers;

generating, by the processing circuitry based on the plurality of sets of questionnaire answers and a portion of the plurality of indications of insurance application outcome related to a given insurance product of the one or more insurance products, at least one decision tree configured to indicate, based on answers selected from the plurality of sets of questionnaire answers to correspond to each given feature of at least a portion of the plurality of features, a likelihood that a given security domain is eligible for coverage by the one or more coverage tiers of the given insurance product, wherein generating the at least one decision tree comprises, for each respective decision tree, determining a total number of nodes of the respective decision tree based at least in part on one or more of i) available processing resources or ii) processing speed, and dividing enterprises selected from the plurality of enterprises into respective sub-populations according to respective answers corresponding to at least one feature of the plurality of features and further according to the at least one respective indication of insurance application outcome for each enterprise of the plurality of enterprises, such that the respective decision tree comprises a plurality of nodes, each node corresponding to a different feature of the at least one feature, wherein each node of the plurality of nodes comprises a plurality of leaves that each indicate a respective probability that an applicant having a particular pattern of questionnaire responses has historically been offered coverage for the given insurance product, and dividing comprises splitting the respective sub-populations according to each feature of the at least one feature to produce the respective decision tree having the total number of nodes;

calculating in real-time, by the processing circuitry responsive to determining that the one or more remedies comprises purchase of the given insurance product and based on applying at least a portion of the responses to one or more decision trees of the at least one decision tree, a probability of the organization obtaining approval to be extended coverage for at least one tier of the one or more coverage tiers of the given insurance product; and presenting, by the processing circuitry to the remote computing device via a user interface, one or more recommended remedies selected from the one or more remedies, wherein presenting the purchase of the given insurance product as one of the one or more recommended remedies is conditionally based on the probability of the organization obtaining approval to be extended coverage for the at least one tier of the given insurance product.

18. The method of claim 17, wherein the plurality of security domains include two or more of a data security domain, a critical data in systems domain, an identity and access management domain, an endpoints and security systems domain, a cloud/network security domain, a physical security domain, an application security domain, or a third-party security domain.

19. The method of claim 17, wherein a respective response to each of the plurality of questions in the questionnaire is one option of a plurality of response options to a respective question.

20. The method of claim 19, wherein generating the at least one decision tree includes identifying one or more nodes of the plurality of nodes for the respective decision tree, wherein each of the one or more nodes is associated with one of the plurality of response options to at least one question of the questions in the questionnaire.

21. The method of claim 20, wherein identifying the one or more nodes for the respective decision tree comprises:

grouping answers from the sets of questionnaire answers according to a provided response option of the plurality of response options to a given question; and identifying a respective response option of the plurality of response options that divides the answers from the plurality of sets of questionnaire answers into substantially even groupings as one of the one or more nodes for the decision tree.

22. The method of claim 21, wherein each respective node of the one or more nodes in the respective decision tree comprises a histogram representing proportions of a feature of the at least one feature corresponding to the respective node of a plurality of computing infrastructures of a portion of the plurality of enterprises that were granted coverage at a respective coverage tier of the given insurance product.

* * * * *